United States Patent
Watano et al.

(10) Patent No.: US 12,360,210 B2
(45) Date of Patent: Jul. 15, 2025

(54) VEHICLE SENSOR DEVICE

(71) Applicant: KOITO MANUFACTURING CO., LTD., Tokyo (JP)

(72) Inventors: Yuichi Watano, Shizuoka (JP); Osamu Kuboyama, Shizuoka (JP); Yoshihiro Katsurada, Shizuoka (JP); Daigo Yamamoto, Shizuoka (JP); Kosei Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 136 days.

(21) Appl. No.: 18/189,333

(22) Filed: Mar. 24, 2023

(65) Prior Publication Data

US 2023/0228847 A1 Jul. 20, 2023

Related U.S. Application Data

(63) Continuation of application No. PCT/JP2021/035675, filed on Sep. 28, 2021.

(30) Foreign Application Priority Data

Sep. 30, 2020 (JP) .................. 2020-165962
Sep. 30, 2020 (JP) .................. 2020-165963
(Continued)

(51) Int. Cl.
*G01S 7/40* (2006.01)
*B60Q 1/00* (2006.01)
(Continued)

(52) U.S. Cl.
CPC .......... *G01S 7/4047* (2021.05); *B60Q 1/0023* (2013.01); *B60S 1/026* (2013.01);
(Continued)

(58) Field of Classification Search
CPC .......... G01S 7/4047; G01S 7/028; G01S 7/40; G01S 13/931; G01S 2013/9323;
(Continued)

(56) References Cited

U.S. PATENT DOCUMENTS 7,342,532 B1 * 3/2008 Matsuoka ............. G01S 7/4004
342/174
2004/0095269 A1 5/2004 Uehara et al.
(Continued)

FOREIGN PATENT DOCUMENTS

CN 107092011 A 8/2019
CN 110562160 A 12/2019
(Continued)

OTHER PUBLICATIONS

International Search Report of PCT/JP2021/035675 dated Nov. 30, 2021 [PCT/ISA/210].
(Continued)

*Primary Examiner* — Bernarr E Gregory
*Assistant Examiner* — Juliana Cross
(74) *Attorney, Agent, or Firm* — Sughrue Mion, PLLC

(57) ABSTRACT

A vehicle sensor device (1) includes an outer cover (12), a sensor unit (20) that transmits and receives an electromagnetic wave through the outer cover (12) and outputs a signal related to the electromagnetic wave incident on an inner side of the outer cover (12), a heater (30) that is provided in the outer cover (12) and heats a transmission region (AR) of the outer cover (12) through which the electromagnetic wave emitted from the sensor unit (20) passes, and a control unit (CO). The control unit (CO) outputs a detection signal of an object located outside the outer cover (12) based on the signal from the sensor unit (20) in at least a part of a period
(Continued)

in which the heater (30) is OFF, and stops outputting of the detection signal in at least a part of a period in which the heater (30) is ON.

5 Claims, 17 Drawing Sheets

(30) Foreign Application Priority Data

Sep. 30, 2020 (JP) .................................. 2020-165964
Sep. 30, 2020 (JP) .................................. 2020-165967
Sep. 21, 2021 (JP) .................................. 2021-153313

(51) Int. Cl.
*B60S 1/02* (2006.01)
*B60S 1/56* (2006.01)
*G01S 7/02* (2006.01)
*G01S 13/93* (2020.01)
*G01S 13/931* (2020.01)

(52) U.S. Cl.
CPC ................ *B60S 1/56* (2013.01); *G01S 7/028* (2021.05); *G01S 7/40* (2013.01); *G01S 13/931* (2013.01); *G01S 2013/9323* (2020.01); *G01S 2013/93277* (2020.01)

(58) Field of Classification Search
CPC ... G01S 2013/93277; G01S 2007/4975; G01S 2007/4977; G01S 7/4813; G01S 17/931; B60Q 1/0023; B60Q 1/0005; B60S 1/026; B60S 1/56; B60S 1/603; H05B 2203/013; H05B 1/0236; H05B 3/84; H05B 2203/014; F21Y 2115/10; F21S 45/60

USPC .................................................. 343/872–873
See application file for complete search history.

(56) References Cited

U.S. PATENT DOCUMENTS

| | | |
|---|---|---|
| 2017/0242098 A1 | 8/2017 | Bodereau et al. |
| 2019/0351464 A1 | 11/2019 | Kim et al. |
| 2019/0377064 A1 | 12/2019 | Scheske et al. |
| 2020/0088857 A1 | 3/2020 | Goldberg |
| 2020/0101889 A1 | 4/2020 | Iwai et al. |
| 2021/0116544 A1* | 4/2021 | Yamamoto ............ G01S 13/931 |
| 2021/0402960 A1 | 12/2021 | Inoue |
| 2022/0003848 A1 | 1/2022 | Yamamoto |
| 2022/0206110 A1* | 6/2022 | Goda .................... G01S 15/931 |

FOREIGN PATENT DOCUMENTS

| | | | |
|---|---|---|---|
| CN | 111175311 A | 5/2020 | |
| DE | 102017221589 A1 * | 6/2019 | ............ B60R 11/00 |
| JP | 05-157830 A | 6/1993 | |
| JP | 10-56309 A | 2/1998 | |
| JP | 2012-37548 A | 2/2012 | |
| JP | 2020-003455 A | 1/2020 | |
| JP | 2020-050271 A | 4/2020 | |
| JP | 2020-153924 A | 9/2020 | |
| JP | 2020-153927 A | 9/2020 | |

OTHER PUBLICATIONS

Communication issued Apr. 21, 2025 in Chinese Patent Application No. 202180066943.2.

* cited by examiner

| RANGE | DRIVING PERIOD (MINUTE) | VOLTAGE (V) |
|---|---|---|
| FIRST RANGE | PREDETERMINED PERIOD T1 | PREDETERMINED VALUE V1 |
| SECOND RANGE | PREDETERMINED PERIOD T2 | PREDETERMINED VALUE V2 |

VEHICLE SENSOR DEVICE

CROSS-REFERENCE TO RELATED APPLICATIONS

This application is a Rule 53(b) Continuation of International Application No. PCT/JP2021/035675 filed Sep. 28, 2021, which claims priorities based on Japanese Patent Application Nos. 2020-165962, 2020-165963, 2020-165964, 2020-165967 filed Sep. 30, 2020 respectively and Japanese Patent Application No. 2021-153313 filed Sep. 21, 2021, the respective disclosures of all of the above of which are incorporated herein by reference in their entirety.

TECHNICAL FIELD

The present invention relates to a vehicle sensor device.

BACKGROUND ART

A vehicle sensor device that detects an object outside a vehicle using an electromagnetic wave is known. Patent Literature 1 below discloses such a vehicle sensor device.

A vehicle sensor device in Patent Literature 1 below includes a lamp unit that emits light toward the front of a vehicle, a radar device that detects an object located in front of the vehicle using an electromagnetic wave, a reflected wave intensity acquisition unit that acquires an intensity of a reflected wave of the electromagnetic wave, a control unit, a cover, and a separator. The cover is disposed in front of the radar device, and the electromagnetic wave emitted from the radar device passes through the cover and emitted to the front of the vehicle. The separator is disposed between the lamp unit and the radar device and is connected to the cover, and absorbs a part of radiant heat of the lamp unit and transmits the absorbed radiant heat to the cover.

The intensity of the electromagnetic wave acquired by the reflected wave intensity acquisition unit tends to change depending on an adhering substance such as ice, snow, and frost adhering to the cover. In general, when the adhering substance adheres to the cover, the intensity of the electromagnetic wave reflected by the cover tends to be higher than when the adhering substance does not adhere to the cover. In the vehicle sensor device, when the adhering substance adheres, the intensity of the electromagnetic wave increases as described above, and in this case, the control unit controls the lamp unit to be ON. As a result, the adhering substance is removed by the radiant heat as described above. In addition, when the adhering substance is removed, the intensity of the electromagnetic wave decreases, and in this case, the control unit controls the lamp unit to be OFF.

Further, the control unit determines whether ice and snow or frost adheres to the cover based on the intensity of the reflected wave of the electromagnetic wave, and controls the lamp unit to be turned on or off according to the determination result. According to this vehicle sensor device, it is possible to melt or vaporize ice and snow, frost, and the like adhering to the cover by heating the cover by the radiant heat of the lamp unit, and it is possible to suppress a decrease in accuracy of object detection due to ice and snow or frost.

[Patent Literature 1] JP 2020-50271 A

SUMMARY OF INVENTION

According to a first aspect of the present invention, there is provided a vehicle sensor device including: an outer cover; a sensor unit that is disposed inside a vehicle with respect to the outer cover, transmits and receives an electromagnetic wave through the outer cover, and outputs a signal related to the electromagnetic wave incident on an inner side of the outer cover; a heater that is provided in the outer cover and heats a transmission region of the outer cover through which the electromagnetic wave emitted from the sensor unit passes; and a control unit, in which the control unit outputs a detection signal of an object located outside the outer cover based on the signal from the sensor unit in at least a part of a period in which a heater is OFF, and stops outputting of the detection signal in at least a part of a period in which the heater is ON.

In the vehicle sensor device according to the first aspect, when the electromagnetic wave emitted from the sensor unit toward the outside of the vehicle is reflected in a traveling direction of the electromagnetic wave and by an object outside the vehicle and passes through the transmission region, the electromagnetic wave can be received by the sensor unit, and the object can be detected from the signal related to the electromagnetic wave. Further, in the vehicle sensor device, the control unit outputs the detection signal of the object based on the signal related to the electromagnetic wave from the sensor unit in at least a part of the period in which the heater is OFF. Generally, in the period in which the heater is OFF, an adhering substance tends not to adhere to the transmission region. In this case, since obstruction of the traveling of the electromagnetic wave by the adhering substance is suppressed, a decrease in detection accuracy of the vehicle sensor device can be suppressed. In addition, in general, the adhering substance tends to adhere to the transmission region in the period in which the heater is ON. In this case, since the traveling of the electromagnetic wave is hindered by the adhering substance, the detection accuracy of the vehicle sensor device decreases. Therefore, information obtained by detection is difficult to use, and power used to output a detection signal including the information may be wasted. However, in the vehicle sensor device, the control unit stops the outputting of the detection signal in at least a part of the period in which the heater is ON. That is, the outputting of the detection signal is stopped during at least a part of a period in which the adhering substance is removed by the heat of the heater. Therefore, wasteful power consumption can be suppressed.

Further, in the vehicle sensor device according to the first aspect, the control unit may stop the outputting of the detection signal when an intensity of the electromagnetic wave indicated by the signal is more than a first threshold and an adhesion amount of adhering substances adhering to the transmission region is equal to or more than a second threshold indicating that the amount of adhering substances adhering to the transmission region is more than the amount of adhering substances at the first threshold, and output the detection signal when the intensity is equal to or more than the first threshold and less than the second threshold, in the period in which the heater is ON.

As described above, generally, the adhering substance tends to adhere to the transmission region during the period in which the heater is ON. In the vehicle sensor device, when the adhering substance adheres to the transmission region, a part of the electromagnetic wave emitted from the sensor unit is reflected by the adhering substance and received by the sensor unit. The intensity of the received electromagnetic wave tends to increase as the adhesion amount of the adhering substance increases, because the reflection of the electromagnetic wave reflected by the adhering substance increases. In general, the intensity of the electromagnetic wave received by the sensor unit tends to increase in the order of when dust or water droplets adhere to the transmission region and when ice and snow adhere to the transmission region. In this case, the first threshold is set to a value less than the intensity of the electromagnetic wave received by the sensor unit when dust or water droplets adhere to the transmission region. The second threshold is higher than the intensity of the electromagnetic wave received by the sensor unit when dust or water droplets adhere to the transmission region, and is less than the intensity of the electromagnetic wave received by the sensor unit when ice and snow adhere to the transmission region. When the intensity of the electromagnetic wave is equal to or more than the second threshold, the detection accuracy of the vehicle sensor device decreases as compared with a case where the intensity is equal to or more than the first threshold and less than the second threshold. Therefore, since the information obtained in this case is difficult to use, a time during which power is wastefully consumed becomes long. However, in the vehicle sensor device, when the intensity of the electromagnetic wave is equal to or more than the second threshold, the outputting of the detection signal is stopped, so that the time during which the power is wastefully consumed may be shortened.

In addition, when the adhering substance starts to melt and decreases, the reflection of the electromagnetic wave by the adhering substance is suppressed, and the intensity decreases. In a case where the intensity is equal to or more than the first threshold and less than the second threshold, the adhesion amount of the adhering substance is smaller as compared with a case where the intensity is equal to or more than the second threshold, and thus, it is possible to suppress the hindrance of the traveling of the electromagnetic wave due to the adhering substance and to suppress the decrease in the detection accuracy of the vehicle sensor device. In this case, even when the detection signal is output, the vehicle sensor device can obtain highly accurate information as compared with a case where the intensity is equal to or more than the second threshold, and the safety of the vehicle during traveling can be improved by using the information.

Alternatively, in the vehicle sensor device according to the first aspect, the control unit may stop the outputting of the detection signal when a signal output from a temperature sensor that measures a temperature of the transmission region indicates a temperature less than a predetermined temperature, and output the detection signal when the signal output from the temperature sensor indicates a temperature equal to or more than the predetermined temperature, in the period in which the heater is ON.

In a case where the temperature of the transmission region is less than the predetermined temperature, the adhering substance is less likely to melt even when heated, and the traveling of the electromagnetic wave is hindered by the adhering substance, as compared with a case where the temperature of the transmission region is equal to or more than the predetermined temperature, and the detection accuracy of the vehicle sensor device decreases. Therefore, since the information obtained in this case is difficult to use, a time during which power is wastefully consumed becomes long. However, in the vehicle sensor device, in a case where the signal output from the temperature sensor indicates the temperature less than the predetermined temperature in the period in which the heater is ON, the outputting of the detection signal is stopped, and thus, the time during which power is wastefully consumed may be shortened.

In addition, in a case where the temperature of the transmission region is equal to or more than the predetermined temperature, the adhering substance is more likely to melt as compared with a case where the temperature of the transmission region is less than the predetermined temperature, and it is possible to suppress the hindrance of the traveling of the electromagnetic wave due to the adhering substance and to suppress the decrease in the detection accuracy of the vehicle sensor device. In this case, even when the detection signal is output, the vehicle sensor device can use highly accurate information as compared with the case where the temperature of the transmission region is less than the predetermined temperature, and the use of the information can improve the safety during traveling of the vehicle.

Alternatively, in the vehicle sensor device according to the first aspect, the control unit may output the detection signal in the period in which the heater is ON and a period in which a light source unit that emits light toward an outside of the vehicle via the outer cover is ON.

The outer cover including the transmission region is warmed by light emitted from the light source unit and transmitted through the outer cover. For this reason, the adhering substance is warmed by the light from the light source unit together with the heat from the heater, and can be melted and removed earlier than in the case of being warmed by the heat from the heater. When the adhering substance is removed, a decrease in detection accuracy of the vehicle sensor device can be suppressed even when the detection signal is output. Therefore, in the vehicle sensor device, highly accurate information can be used as compared with the case where the adhering substance is not removed, and the safety of the vehicle during traveling can be improved by using the information.

Furthermore, in the vehicle sensor device according to the first aspect, the sensor unit may emit the electromagnetic wave toward an outside of the vehicle via the outer cover, in the period in which the heater is ON.

In the above configuration, the sensor unit emits the electromagnetic wave during the period in which the heater is ON and the period in which the heater is OFF, and does not switch the stop of the emission of the electromagnetic wave or the emission of the electromagnetic wave according to the switching of ON/OFF of the heater. Therefore, a load on the sensor unit due to the switching can be reduced. In addition, in general, it takes time to activate the sensor unit, but in the above configuration, since the sensor unit is always driven to emit the electromagnetic wave, the time required for activating the sensor unit can be omitted. As compared with a case where time is not omitted, in a case where the time is omitted, the detection signal can be output earlier when the heater is switched from ON to OFF.

Furthermore, in the vehicle sensor device according to the first aspect, the sensor unit may receive the electromagnetic wave incident on an inside of the vehicle from the outside of the vehicle through the outer cover, in the period in which the heater is ON.

In the above configuration, the sensor unit receives the electromagnetic wave in the period in which the heater is ON and the period in which the heater is OFF, and does not switch the stop of the reception of the electromagnetic wave or the reception of the electromagnetic wave according to the switching of ON/OFF of the heater. Therefore, a load on the sensor unit due to the switching can be reduced. In addition, since the sensor unit is always driven to receive the electromagnetic wave, the time required for activation can be omitted. When the time is omitted, the detection signal can be output quickly as described above.

Further, in the vehicle sensor device according to the first aspect, the sensor unit may receive the electromagnetic wave incident on the inside of the vehicle from the outside of the vehicle through the outer cover and output the signal to the control unit, in the period in which the heater is ON.

In the above configuration, the sensor unit outputs the signal to the control unit CO in the period in which the heater is ON and the period in which the heater is OFF, and does not stop the outputting of the signal or switch the outputting of the signal according to the switching of ON/OFF of the heater. Therefore, a load on the sensor unit due to the switching can be reduced. In addition, since the sensor unit is always driven to output a signal, the time required for activation can be omitted. When the time is omitted, the detection signal can be output quickly as described above.

Furthermore, in the vehicle sensor device according to the first aspect, the control unit may control the heater to be ON in at least a part of a period in which the vehicle is stopped and stop the outputting of the detection signal in at least a part of the period in which the heater is ON.

Generally, in a state where the vehicle is stopped, removal of an adhering substance is required for improving safety of the vehicle when the vehicle is moving rather than detecting an object. In the vehicle sensor device, the heater is ON in at least a part of the period in which the vehicle is stopped, and the outputting of the detection signal is stopped in at least a part of the period in which the heater is ON. When the heater is ON, the adhering substance is removed by the heat of the heater. Therefore, when the vehicle starts to move, it is possible to suppress the hindrance of the traveling of the electromagnetic wave due to the adhering substance and to suppress the decrease in the detection accuracy of the vehicle sensor device. In the above configuration, since the outputting of the detection signal is stopped, the power consumption due to the outputting of the detection signal can be suppressed as compared with a case where the detection signal is output.

According to a second aspect of the present invention, there is provided a vehicle sensor device including: an outer cover; a sensor unit that is disposed inside a vehicle with respect to the outer cover, transmits and receives an electromagnetic wave through the outer cover, and outputs a signal indicating an intensity of the electromagnetic wave incident on an inner side of the outer cover; a heater that is provided in the outer cover and heats a transmission region of the outer cover through which the electromagnetic wave emitted from the sensor unit passes; and a control unit, in which the control unit sets a driving period of the heater and a power amount of the heater in the driving period based on the intensity, and applies a voltage of the set power amount to the heater in the set driving period.

In the vehicle sensor device according to the second aspect, when the electromagnetic wave emitted from the sensor unit toward the outside of the vehicle is reflected by the traveling direction of the electromagnetic wave and the object outside the vehicle and passes through the transmission region, the electromagnetic wave can be received by the sensor unit, and the object can be detected from the signal related to the electromagnetic wave. In the vehicle sensor device, the control unit sets the driving period of the heater and the power amount of the heater during the driving period based on the intensity of the electromagnetic wave. The power amount of the heater is obtained by integrating the power of the heater with the driving period of the heater. Further, the power is obtained by a voltage applied to the heater and a resistance of the heater which is a fixed value. The control unit applies a voltage at the set power amount to the heater during the set driving period. Generally, in the period in which the heater is ON, the adhering substance tends to adhere to the transmission region. In addition, in the period in which the heater is ON, the adhering substance is warmed by heat from the heater, and thus tends to melt and decrease with the lapse of time. As the amount of the adhering substance decreases, the intensity of the electromagnetic wave received by the sensor unit tends to decrease because the reflection of the electromagnetic wave reflected by the adhering substance decreases. In the vehicle sensor device, since the driving period of the heater and the power amount of the heater are set on the basis of the intensity as described above, the load on the control unit can be reduced as compared with a case where the power amount of the heater is always controlled on the basis of the intensity every time the intensity changes.

In general, the intensity of the electromagnetic wave received by the sensor unit tends to increase in the order of when dust or water droplets adhere to the transmission region and when ice and snow adhere to the transmission region. As described above, the intensity increases as the amount of adhering substances increases, and the power amount required for removing the adhering substance increases. In the vehicle sensor device, since the power amount is set based on the intensity, it is possible to prevent the power amount from being too little set or too much set with respect to the adhesion amount of adhering substance, and it is possible to appropriately remove the adhering substance by the power amount corresponding to the intensity.

In the vehicle sensor device according to the second aspect, the control unit may sharply increase the voltage applied to the heater.

When the adhering substance adheres, as the voltage increases more sharply, the temperature of heat from the heater increases more greatly in a short time, so that the adhering substance can be warmed and dissolved earlier.

Alternatively, in the vehicle sensor device according to the second aspect, the control unit may stepwise increase the voltage applied to the heater.

According to the above configuration, the control unit may control the heater at timing when the voltage increases stepwise. Therefore, the load on the control unit can be reduced as compared with a case where the voltage does not increase stepwise.

Alternatively, in the vehicle sensor device according to the second aspect, the control unit may gradually increase the voltage applied to the heater.

According to the above configuration, a rapid temperature change of the outer cover can be suppressed, and application of a thermal shock to the outer cover due to the rapid temperature change can be suppressed.

Further, in the vehicle sensor device according to the second aspect, the control unit may sharply decrease the voltage after the voltage increases.

According to the above configuration, wasteful consumption of the power amount of the heater can be suppressed as compared with a case where the voltage does not sharply decrease. In addition, even when the voltage decreases, residual heat can remain in the outer cover, and thus the adhering substance remaining in the outer cover can be removed by the residual heat.

Alternatively, in the vehicle sensor device according to the second aspect, the control unit may stepwise decrease the voltage after the voltage increases.

According to the above configuration, the control unit may control the heater at the timing when the voltage stepwise decreases. Therefore, the load on the control unit can be reduced as compared with a case where the voltage does not decrease stepwise. In addition, as compared with a case where the voltage does not decrease stepwise but sharply decreases, the time for warming the outer cover at a high temperature can be longer, and the adhering substance can be easily dissolved.

Alternatively, in the vehicle sensor device according to the second aspect, the control unit may gradually decrease the voltage after the voltage increases.

According to the above configuration, as compared with a case where the voltage does not gradually decrease, a rapid temperature change of the outer cover can be suppressed, and application of a thermal shock to the outer cover due to the rapid temperature change can be suppressed.

In the vehicle sensor device according to the second aspect, the control unit may increase the voltage applied to the heater when a signal output from a temperature sensor that measures a temperature outside the vehicle indicates a temperature less than a predetermined temperature.

In a case where the temperature outside the vehicle is less than a predetermined temperature such as the temperature of the adhering substance or the temperature at which water or the like freezes, the adhering substance is less likely to melt and freeze as compared with a case where the temperature outside the vehicle is equal to or more than the predetermined temperature. In the vehicle sensor device, with the above configuration, the adhering substance can be melted and removed earlier as compared with a case where the voltage does not increase.

According to a third aspect of the present invention, there is provided a vehicle sensor device including: an outer cover; a sensor unit that is disposed on an inner side of a vehicle with respect to the outer cover, transmits and receives an electromagnetic wave through the outer cover, and outputs a signal indicating an intensity of the electromagnetic wave incident on the inner side of the outer cover; a heater that is provided in the outer cover and heats a transmission region of the outer cover through which the electromagnetic wave emitted from the sensor unit passes; a cleaner that injects at least one of liquid and gas from the outer cover toward the transmission region from the outside of the vehicle; and a control unit, in which the control unit controls the heater and the cleaner such that at least the heater is driven in at least a part of a predetermined period when the intensity indicated by the signal is within a predetermined range, and such that at least the cleaner is driven in at least a part of a predetermined period when the intensity indicated by the signal is within a specific range different from the predetermined range, and a combination of an operation of the heater and an operation of the cleaner with elapse of time in the predetermined period when the intensity indicated by the signal is within the specific range is different from a combination of an operation of the heater and an operation of the cleaner with elapse of time in the predetermined period when the intensity indicated by the signal is within the predetermined range.

In the vehicle sensor device according to the third aspect, when the electromagnetic wave emitted from the sensor unit toward the outside of the vehicle is reflected in the traveling direction of the electromagnetic wave and by the object outside the vehicle and passes through the transmission region, the electromagnetic wave can be received by the sensor unit, and the object can be detected from the signal related to the electromagnetic wave. In addition, in this vehicle sensor device, since the electromagnetic wave from the sensor unit propagates toward the outside of the vehicle via the outer cover, a part of the electromagnetic wave is reflected by the outer cover and received by the sensor unit.

In addition, when there is an adhering substance in the transmission region of the outer cover, another part of the electromagnetic wave is reflected by the adhering substance and received by the sensor unit. Therefore, when there is an adhering substance in the transmission region of the outer cover, the intensity of the electromagnetic wave received by the sensor unit tends to be higher as compared with a case where there is no adhering substance on the outer cover. In addition, when there is an adhering substance in this transmission region, the intensity of the electromagnetic wave received by the sensor unit tends to change depending on the adhering substance. Generally, the intensity of the electromagnetic wave received by the sensor unit when dirt such as mud adheres to the transmission region tends to be higher than the intensity of the electromagnetic wave received by the sensor unit when ice and snow adhere to the transmission region. Therefore, according to the vehicle sensor device, the combination of the operation of the heater and the operation of the cleaner with the lapse of time in the predetermined period can be changed according to the difference in the adhering substance. For example, the vehicle sensor device can melt and remove ice and snow adhering to the outer cover by heating the outer cover with a heater, and can remove dirt such as mud adhering to the outer cover by liquid or gas injected from a cleaner. Therefore, the vehicle sensor device can appropriately remove the adhering substance and suppress a decrease in accuracy of object detection as compared with a case where the combination of the operation of the heater and the operation of the cleaner does not change with the lapse of time in the predetermined period according to the intensity of the electromagnetic wave indicated by the signal from the sensor unit.

Further, in the vehicle sensor device according to the third aspect, the specific range may include at least one of a first range in which the intensity indicated by the signal is equal to or more than a first threshold and less than a second threshold greater than the first threshold and a third range in which the intensity indicated by the signal is equal to or more than a third threshold greater than the second threshold, and the predetermined range may be a second range in which the intensity indicated by the signal is equal to or more than the second threshold and less than the third threshold.

As described above, the intensity of the electromagnetic wave received by the sensor unit when dirt such as mud adheres to the transmission region in the outer cover tends to be higher than the intensity of the electromagnetic wave received by the sensor unit when ice and snow adhere to the transmission region. The intensity of the electromagnetic wave received by the sensor unit when ice and snow adhere to the transmission region tends to be higher than the intensity of the electromagnetic wave received by the sensor unit when dust or water droplets adhere to the transmission region. Therefore, the first threshold, the second threshold, and the third threshold can be set such that the intensity indicated by the signal when dust or water droplets adhere is included in the first range, the intensity indicated by the signal when ice and snow adhere is included in the second range, and the intensity indicated by the signal when dirt such as mud adheres is included in the third range. In the vehicle sensor device, at least the cleaner is driven in at least one of the first range and the third range where the intensity indicated by the signal is within the first range and the third range. When the intensity indicated by the signal is within the second range, at least the heater is driven. Therefore, according to the vehicle sensor device, for example, dust and water droplets adhering to the outer cover can be removed by liquid or gas from the cleaner, ice and snow adhering to the outer cover can be melted and removed by heating the outer cover by the heater, and dirt such as mud adhering to the outer cover can be removed by liquid or gas from the cleaner.

In this case, in the vehicle sensor device according to the third aspect, when the intensity indicated by the signal is within the second range, the control unit may control the heater and the cleaner such that a timing of start of driving of the cleaner comes after a timing of start of driving of the heater.

In the vehicle sensor device according to the third aspect, when the intensity indicated by the signal is within the second range, at least one of liquid and gas is injected toward the outer cover after the outer cover is heated. Therefore, when ice and snow adhere to the outer cover, the vehicle sensor device can inject at least one of liquid and gas toward the ice and snow after the water is interposed in at least a part between the ice and snow and the outer cover by heating the outer cover. The adhesion of ice and snow to the outer cover when water is interposed at least partially between the ice and snow and the outer cover tends to be smaller than that when water is not interposed between the ice and snow and the outer cover. Therefore, the vehicle sensor device can easily remove ice and snow as compared with a case where the outer cover is not heated before injecting liquid or gas toward the outer cover.

In this case, in the vehicle sensor device according to the third aspect, when the intensity indicated by the signal is within the second range, the control unit may control the heater and the cleaner such that the timing of the start of the driving of the cleaner comes after the timing of the start of the driving of the heater and a period in which the heater is driven comes after a timing of end of the driving of the cleaner.

In the vehicle sensor device according to the third aspect, the outer cover is heated even after the timing of the end of the driving of the cleaner. Therefore, the vehicle sensor device can suppress freezing of liquid adhering to the outer cover after the injection of liquid or gas to the outer cover ends, for example, liquid from a cleaner, or can vaporize and remove the liquid. Therefore, the vehicle sensor device can suppress a decrease in accuracy of object detection as compared with a case where the outer cover is not heated after the timing of the end of the driving of the cleaner.

Alternatively, in the vehicle sensor device according to the third aspect, when the specific range includes at least one of the first range and the third range and the predetermined range is the second range, the cleaner may individually inject the liquid and the gas, and when the intensity indicated by the signal is within the second range, the control unit may control the heater and the cleaner such that a timing of start of injection of the liquid by the cleaner comes after a timing of start of driving of the heater, there is a period in which the heater is driven after a timing of end of injection of the liquid by the cleaner, and a timing of start of injection of the gas by the cleaner comes after the timing of the end of the injection of the liquid by the cleaner.

In the vehicle sensor device of the third aspect, since the liquid is injected toward the outer cover after the outer cover is heated, ice and snow can be easily removed. The outer cover is heated even after the injection of the liquid by the cleaner ends. Therefore, it is possible to suppress freezing of liquid adhering to the outer cover, for example, liquid from the cleaner after the injection of the liquid to the outer cover ends, or to vaporize and remove the liquid. After the injection of the liquid by the cleaner ends, gas is injected toward the outer cover. Therefore, the liquid adhering to the outer cover after the injection of the liquid to the outer cover ends can be removed by the gas from the cleaner.

Further, in the vehicle sensor device according to a third aspect, when the specific range includes at least one of the first range and the third range and the predetermined range is the second range, the cleaner may inject at least the liquid, the specific range may include at least the third range, and when the intensity indicated by the signal is within the third range, the control unit may control the heater and the cleaner such that there is a period in which the heater is driven after a timing of end of injection of the liquid by the cleaner.

In the vehicle sensor device according to the third aspect, the outer cover is heated after the injection of the liquid to the outer cover ends. Therefore, the vehicle sensor device can suppress freezing of liquid adhering to the outer cover, for example, liquid from the cleaner after the injection of the liquid to the outer cover ends, or can vaporize and remove the liquid.

In this case, in the vehicle sensor device according to the third aspect, when the intensity indicated by the signal is within the third range, the control unit may control the heater and the cleaner such that a timing of start of the injection of the liquid by the cleaner comes before a timing of start of driving of the heater, and there is the period in which the heater is driven after the timing of the end of the injection of the liquid by the cleaner.

In the vehicle sensor device according to the third aspect, the outer cover is not heated before the liquid is injected toward the outer cover. Here, when the outer cover is heated and the moisture of dirt such as mud adhering to the outer cover decreases, the adhesion force of dirt such as mud to the outer cover tends to increase. Therefore, the vehicle sensor device can easily remove dirt such as mud as compared with a case where liquid is injected toward the outer cover after the outer cover is heated.

Alternatively, in the vehicle sensor device according to the third aspect, when the specific range includes at least one of the first range and the third range, and the predetermined range is the second range, the cleaner may individually inject the liquid and the gas, the specific range may include at least the third range, and when the intensity indicated by the signal is within the third range, the control unit may control the heater and the cleaner so that a timing of start of the injection of the gas by the cleaner comes after a timing of end of the injection of the liquid by the cleaner.

In the vehicle sensor device according to the third aspect, gas is injected toward the outer cover after the injection of the liquid by the cleaner ends. Therefore, the liquid adhering to the outer cover after the injection of the liquid to the outer cover ends can be removed by the gas from the cleaner.

In this case, in the vehicle sensor device according to the third aspect, when the intensity indicated by the signal is within the third range, the control unit may control the heater and the cleaner such that there is a period in which the heater is driven after the timing of the end of the injection of the liquid by the cleaner, and the timing of the start of the injection of the gas by the cleaner comes after the timing of the end of the injection of the liquid by the cleaner.

In the vehicle sensor device according to the third aspect, the outer cover is heated after the injection of the liquid to the outer cover ends. Therefore, the vehicle sensor device can suppress freezing of the liquid adhering to the outer cover after the injection of the liquid to the outer cover ends, or can vaporize and remove the liquid.

In this case, in the vehicle sensor device according to the third aspect, when the intensity indicated by the signal is within the third range, the control unit may control the heater and the cleaner such that timing of the start of the injection of the liquid by the cleaner comes before the timing of the start of the driving of the heater, there is the period in which the heater is driven after the timing of the end of the injection of the liquid by the cleaner, and the timing of the start of the injection of the gas by the cleaner comes after the timing of the end of the injection of the liquid by the cleaner.

In the vehicle sensor device according to the third aspect, the outer cover is not heated before the liquid is injected toward the outer cover. Therefore, it is possible to suppress the decrease in the moisture of the mud adhering to the outer cover before injecting the liquid toward the outer cover, and it is possible to easily remove the mud.

In the vehicle sensor device according to the third aspect, when the specific range includes at least one of the first range and the third range and the predetermined range is the second range, the cleaner may inject at least the gas, the specific range may include at least the first range, and the control unit may control the heater and the cleaner such that the cleaner injects at least the gas when the intensity indicated by the signal is within the first range.

According to the vehicle sensor device of the third aspect, for example, dust and water droplets adhering to the outer cover can be removed by the gas from the cleaner.

In the vehicle sensor device according to the third aspect, when a temperature indicated by a signal output from a temperature sensor that measures a temperature outside the vehicle is equal to or less than a predetermined temperature and the intensity indicated by the signal output from the sensor unit is within the specific range, the control unit may control the heater and the cleaner such that a timing of start of driving of the cleaner comes after a timing of start of driving of the heater, and when the temperature indicated by the signal output from the temperature sensor exceeds the predetermined temperature and the intensity indicated by the signal output from the sensor unit is within the specific range, the control unit may control the heater and the cleaner such that only the cleaner is driven.

In mud, dust, and the like adhering to the outer cover at a temperature at which water or the like freezes outside the vehicle, moisture in the mud tends to freeze, or ice tends to adhere to the dust. In this vehicle sensor device, for example, by setting the predetermined temperature to a temperature at which water or the like starts to freeze, when the temperature outside the vehicle is a temperature at which water or the like freezes and mud, dust, or the like adheres to the outer cover, liquid or gas can be injected toward the outer cover after the outer cover is heated. Therefore, according to the vehicle sensor device, the liquid or the gas can be injected after the moisture in the mud is melted or the ice adhering to the dust is melted, and the mud, the dust, and the like can be more easily removed. Further, in this vehicle sensor device, for example, when the temperature outside the vehicle exceeds a temperature at which water or the like freezes and mud, dust, or the like adheres to the outer cover, only the cleaner can be driven without driving the heater. Therefore, according to the vehicle sensor device, it is possible to remove mud, dust, and the like adhering to the outer cover while reducing the opportunity for driving the heater.

In this case, in the vehicle sensor device according to the third aspect, the cleaner may inject at least the liquid, and when the temperature indicated by the signal output from the temperature sensor is equal to or less than a predetermined temperature and the intensity indicated by the signal output from the sensor unit is within the specific range, the heater and the cleaner may be controlled such that a timing of start of the injection of the liquid by the cleaner comes after the timing of the start of the driving of the heater, and there is a period in which the heater is driven after a timing of end of the injection of the liquid by the cleaner.

The outer cover is heated even after the timing of the end of the injection of the liquid by the cleaner at the temperature outside the vehicle at which water or the like freezes. Therefore, it is possible to more appropriately prevent the liquid adhering to the outer cover, for example, the liquid from the cleaner from freezing after the injection of the liquid ends.

The cleaner may inject at least the liquid, and the control unit may control the cleaner such that the injection of the liquid ends when the intensity indicated by the signal output from the sensor unit during the injection of the liquid is equal to or less than a first predetermined value smaller than the intensity at the start of the injection of the liquid. The cleaner may inject at least the gas, and the control unit may control the cleaner such that the injection of the gas ends when the intensity indicated by the signal output from the sensor unit during the injection of the gas is equal to or less than a second predetermined value smaller than the intensity at the start of the injection of the gas. Further, the control unit may control the heater such that the driving of the heater ends when the intensity indicated by the signal output from the sensor unit during the driving of the heater is equal to or less than a third predetermined value smaller than the intensity at the start of the driving of the heater.

With such a configuration, for example, it is possible to suppress injection of liquid or gas by the cleaner and driving of the heater in a state where the adhering substance of the outer cover is removed.

According to a fourth aspect of the present invention, there is provided a vehicle sensor device including: an outer cover; a sensor unit that is disposed inside a vehicle with respect to the outer cover, transmits and receives an electromagnetic wave through the outer cover, and outputs a signal related to the electromagnetic wave incident on an inner side of the outer cover; an electric heating wire that is provided in the outer cover and heats a transmission region of the outer cover through which the electromagnetic wave emitted from the sensor unit passes; and a control unit, in which the control unit outputs a detection signal of an object located outside the outer cover at a predetermined time interval based on the signal from the sensor unit, and sets a first voltage applied to the electric heating wire in at least a part of a transmission/reception period in which the electromagnetic wave used for the detection signal is transmitted and received by the sensor unit to a voltage less than a second voltage applied to the electric heating wire in at least a part of a period sandwiched between the transmission/reception periods.

A certain amount of time is required for the control unit to process the signal input from the sensor unit. In the present vehicle sensor device, since the detection signal is output from the control unit at predetermined time intervals, the control unit can perform at least part of the processing of the signal input from the sensor unit in a period in which the detection signal is not output from the control unit. Since the detection signal is output from the control unit at predetermined time intervals in this manner, the electromagnetic wave used for the detection signal is periodically transmitted and received by the sensor unit. Therefore, the transmission/reception period is a periodic period, for example, a predetermined time interval. However, the electromagnetic wave may or may not be transmitted and received in the sensor unit in a period sandwiched between the transmission/reception periods. For example, the electromagnetic wave may be continuously transmitted and received in the sensor unit. In this case, not all the electromagnetic waves received by the sensor unit are used for the detection signal, and the electromagnetic wave used for the detection signal and the electromagnetic wave not used for the detection signal are alternately transmitted and received in the sensor unit. In the vehicle sensor device of the present invention, the first voltage applied to the electric heating wire in at least a part of the transmission/reception period is less than the second voltage applied to the electric heating wire in at least a part of the period sandwiched between the transmission/reception periods. Therefore, an intensity of a magnetic field generated from the electric heating wire in the period in which the first voltage is applied to the electric heating wire is less than an intensity of a magnetic field generated from the electric heating wire in the period in which the second voltage is applied to the electric heating wire. Therefore, as compared with a case where the second voltage is continuously applied to the electric heating wire, it is possible to suppress the influence of the magnetic field generated from the electric heating wire on the sensitivity of the sensor unit. Therefore, according to the present invention, a vehicle sensor device capable of suppressing a decrease in accuracy of object detection is provided.

Further, in the vehicle sensor device according to the fourth aspect, the control unit preferably sets a voltage to be applied to the electric heating wire as the first voltage in the entire transmission/reception period.

In this case, it is possible to suppress the influence of the magnetic field generated from the electric heating wire on the sensitivity of the sensor unit as compared with a case where the voltage applied to the electric heating wire in a part of the transmission/reception period is set to the first voltage and the voltage applied to the electric heating wire in another part of the transmission/reception period is set to the second voltage.

Further, in the vehicle sensor device according to the fourth aspect, the control unit preferably sets a voltage to be applied to the electric heating wire as the first voltage in a period longer than the transmission/reception period.

In this case, since the first voltage is applied to the electric heating wire at least at the start or end of the transmission/reception period, it is possible to more appropriately suppress the influence of the magnetic field generated from the electric heating wire on the sensitivity of the sensor unit.

Further, in the vehicle sensor device according to the fourth aspect, the control unit preferably sets the first voltage to zero.

In this case, no voltage is applied to the electric heating wire in at least a part of the transmission/reception period. Therefore, it is possible to further suppress the radiation of the magnetic field from the electric heating wire in at least a part of the transmission/reception period, and it is possible to further suppress the influence of the magnetic field generated from the electric heating wire on the sensitivity of the sensor unit.

Further, in the vehicle sensor device according to the fourth aspect, the control unit preferably makes a magnitude of the first voltage in a state where a speed of the vehicle is greater than a predetermined speed smaller than the first voltage in a state where the speed of the vehicle is equal to or less than the predetermined speed.

Further, in the vehicle sensor device according to the fourth aspect, the control unit preferably makes a period during which the first voltage is applied in a state where a speed of the vehicle is greater than a predetermined speed longer than a period during which the first voltage is applied in a state where the speed of the vehicle is equal to or less than the predetermined speed.

Further, in the vehicle sensor device according to a fourth aspect, the control unit preferably makes a magnitude of the first voltage in a state where a distance of the object indicated by the detection signal is smaller than a predetermined distance smaller than the first voltage in a state where the distance of the object indicated by the detection signal is equal to or more than the predetermined distance.

Further, in the vehicle sensor device according to a fourth aspect, the control unit preferably makes a period during which the first voltage is applied in a state where a distance of the object indicated by the detection signal is smaller than a predetermined distance longer than a period during which the first voltage is applied in a state where the distance of the object indicated by the detection signal is equal to or more than the predetermined distance.

Further, in the vehicle sensor device according to the fourth aspect, the control unit preferably makes a magnitude of the first voltage in a state where a signal indicating rain is input to the control unit smaller than the first voltage in a state where the signal indicating rain is not input.

Further, in the vehicle sensor device according to the fourth aspect, the control unit preferably makes a period during which the first voltage is applied in a state where a signal indicating rain is input to the control unit longer than a period during which the first voltage is applied in a state where the signal indicating rain is not input.

Further, in the vehicle sensor device according to the fourth aspect, the control unit preferably makes a magnitude of the first voltage in a state where a signal indicating that a headlight of the vehicle is turned on is input to the control unit smaller than the first voltage in a state where the signal indicating that the headlight of the vehicle is turned on is not input.

Further, in the vehicle sensor device according to the fourth aspect, the control unit preferably makes a period during which the first voltage is applied in a state in which a signal indicating that a headlight of the vehicle is turned on is input to the control unit longer than a period during which the first voltage is applied in a state in which the signal indicating that the headlight of the vehicle is turned on is not input.

A state in which the speed of the vehicle is high, a state in which the distance from the vehicle to the object is small, a state of rain, and a state in which the headlights are turned on are states in which information about the surroundings of the vehicle by a method other than visual observation is more necessary. In these states, by decreasing the magnitude of the first voltage to decrease the magnetic field generated from the electric heating wire, or by increasing the period during which the first voltage is applied to increase the period during which the magnetic field generated from the electric heating wire is suppressed, the vehicle sensor device can further suppress a decrease in accuracy of object detection, and can contribute to safety.

Further, in the vehicle sensor device according to the fourth aspect, it is preferable that the control unit stops outputting of the detection signal and applies a voltage to the electric heating wire in at least a part of a period in which the vehicle is stopped, outputs the detection signal at the predetermined time interval in at least a part of a period in which the vehicle travels, and sets the first voltage applied to the electric heating wire in at least a part of the transmission/reception period to a voltage less than the second voltage applied to the electric heating wire in at least a part of a period sandwiched between the transmission/reception periods.

In a state where the vehicle is stopped, safety concerns tend to be less as compared with a state where the vehicle is moving. In particular, in a period from when ignition is turned on to when the vehicle starts to move, concerns about safety are generally low. Therefore, by applying a voltage to the electric heating wire in at least a part of the period in which the vehicle is stopped, even when snow or the like adheres to the outer cover, melting the snow or the like is prioritized over detection of an object around the vehicle, so that it is possible to suppress a decrease in accuracy of object detection by the vehicle sensor device due to snow or the like after the vehicle starts to move. In at least a part of the state in which the vehicle is traveling, the first voltage applied to the electric heating wire in at least a part of the transmission/reception period is set to a voltage less than the second voltage applied to the electric heating wire in at least a part of the period sandwiched between the transmission/reception periods. Therefore, in the at least part of the state where the vehicle is traveling, it is possible to suppress the influence of the magnetic field generated from the electric heating wire on the sensitivity of the sensor unit as compared with the case where the second voltage is continuously applied to the electric heating wire, and it is possible to suppress a decrease in the accuracy of object detection.

DESCRIPTION OF EMBODIMENTS

Figure 1:
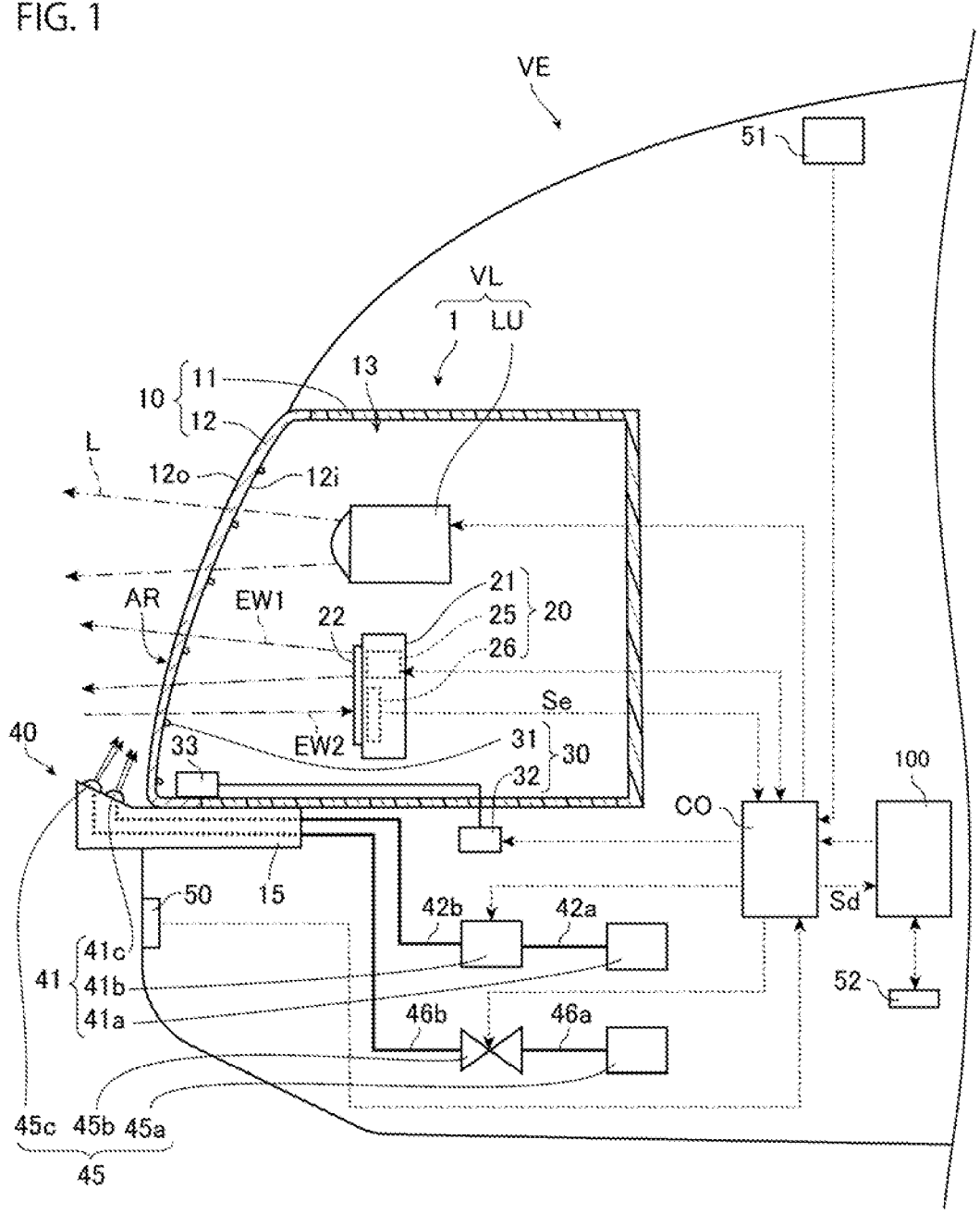
FIG. 1 is a diagram schematically illustrating a vehicle lamp including a vehicle sensor device according to a first embodiment as a first aspect of the present invention.

Hereinafter, preferred embodiments of a vehicle sensor device according to the present invention will be described in detail with reference to drawings. The embodiments exemplified below are intended to facilitate understanding of the present invention and are not intended to limit the present invention. The present invention can be modified and improved without departing from the gist thereof. In the drawings referred to below, dimensions of each member may be changed for easy understanding.

First Embodiment

A first embodiment as a first aspect of the present invention will be described. FIG. 1 is a diagram schematically illustrating a vehicle lamp including a vehicle sensor device according to a first embodiment of the present invention. A vehicle lamp VL of the present embodiment is a headlight for an automobile. Generally, one headlight for an automobile is provided in each of left and right directions in a front portion of the vehicle, and the left and right headlights are configured to be substantially symmetrical in the left and right direction. Therefore, one headlight will be described. As illustrated in FIG. 1, the vehicle lamp VL of the present embodiment which is the headlight includes a vehicle sensor device 1 and a lamp unit LU as main components.

The vehicle sensor device 1 of the present embodiment includes a case 10, a sensor unit 20, a heater 30, a cleaner 40, and a control unit CO as main components. In FIG. 1, the case 10 is illustrated in a vertical cross section.

The case 10 of the present embodiment includes a housing 11 and an outer cover 12 as main components. The housing 11 and the outer cover 12 are made of different types of resins, for example. The outer cover 12 is made of a material that passes through light emitted from the lamp unit LU and an electromagnetic wave emitted from the sensor unit 20. The housing 11 is formed in a box shape having an opening on the front side, and the outer cover 12 is fixed to the housing 11 so as to close the opening. An accommodation space 13 surrounded by the housing 11 and the outer cover 12 is formed in the case 10, and the sensor unit 20 and the lamp unit LU are arranged in the accommodation space 13. Most of an outer surface 12o of the outer cover 12 is exposed to the outside of a vehicle VE and is a part of the outer surface of the vehicle VE.

The control unit CO includes, for example, an integrated circuit such as a microcontroller, an integrated circuit (IC), a large-scale integrated circuit (LSI), or an application specific integrated circuit (ASIC), or a numerical control (NC) device. In addition, when the NC device is used, the control unit CO may use a machine learning device or may not use a machine learning device. As described below, some configurations of the vehicle sensor device 1 and the lamp unit LU are controlled by the control unit CO.

An electronic control unit (ECU) 100 of the vehicle VE is connected to the control unit CO. In the present embodiment, a signal indicating a speed of the vehicle VE and a signal indicating a gear position are input from the ECU 100 to the control unit CO. Note that the signal indicating the speed of the vehicle VE may be input from a speed sensor provided in the vehicle VE to the control unit CO without passing through the ECU 100. In addition, the signal indicating the gear position may also be input from a sensor (not illustrated) that detects the gear position to the control unit CO without passing through the ECU 100.

In addition, a temperature sensor 50 that measures a temperature outside the vehicle VE is connected to the control unit CO, and the temperature sensor 50 outputs a signal indicating a measured temperature to the control unit CO. Examples of the temperature sensor 50 include a sensor using a thermistor. The temperature sensor 50 of the present embodiment is attached to, for example, a front bumper of the vehicle VE. Note that a configuration and an attachment position of the temperature sensor 50 are not particularly limited. Therefore, the signal indicating the temperature input to the control unit CO may be input from the ECU 100 to the control unit CO.

In addition, a rain sensor 51 that detects rainfall is connected to the control unit CO, and the rain sensor 51 outputs a signal indicating the measured rainfall to the control unit CO. Examples of the rain sensor 51 include a sensor that detects rainfall by detecting a wetting amount of the rain sensor 51 by transmitting and receiving infrared rays, and a sensor that detects rainfall by detecting a wetting amount of windshield glass. The rain sensor 51 of the present embodiment is attached, for example, near the windshield of the vehicle VE. A configuration and an attachment position of the rain sensor 51 are not particularly limited. Therefore, the signal indicating rainfall to be input to the control unit CO may be input from the ECU 100 to the control unit CO.

In addition, a storage unit 52 that stores a table to be described later is connected to the control unit CO. The storage unit 52 is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal (transitory, propagating signal), and does not exclude a volatile recording medium. The storage unit 52 may be provided inside the control unit CO.

The sensor unit 20 is a transmission/reception unit that transmits and receives electromagnetic waves via the outer cover 12. The sensor unit 20 includes a case 21 having an accommodation space, a transmission unit 25, and a reception unit 26 as main components. In the present embodiment, a radio wave is used as the electromagnetic wave, and the radio wave is a millimeter wave.

The transmission unit 25 is disposed in the accommodation space of the case 21 and emits a radio wave EW1. The frequency of the radio wave EW1 is, for example, 30 GHz or more and 300 GHz or less. The radio wave EW1 propagates from an electromagnetic wave transmission unit 22 facing the outer cover 12 in the case 21 toward the outer cover 12, passes through the outer cover 12, and is emitted to the front of the vehicle VE. In the present embodiment, the transmission unit 25 is configured to emit a radio wave spreading at a predetermined angle in the left and right directions of the vehicle VE from the electromagnetic wave transmission unit 22 and to change the frequency of the radio wave. The transmission unit 25 includes an antenna (not illustrated). The transmission unit 25 emits a radio wave whose intensity is substantially constant and whose frequency repeatedly increases and decreases at a predetermined cycle according to a control signal from the control unit CO. When emitting the radio wave EW1, the transmission unit 25 outputs a signal related to the radio wave EW1 to the control unit CO. This signal may include information on the intensity of the radio wave EW1 and information on the phase of the radio wave EW1.

The reception unit 26 is disposed in the accommodation space of the case 21 and includes a plurality of antennas (not illustrated). The plurality of antennas are arranged in the left and right directions of the vehicle VE, for example. A part of the radio wave EW2 passing through the outer cover 12 from the outside of the vehicle VE and incident on the accommodation space 13 is received by the antenna of the reception unit 26 via the electromagnetic wave transmission unit 22. When each antenna receives the radio wave EW2 incident on the electromagnetic wave transmission unit 22, the reception unit 26 outputs a signal Se related to the radio wave EW2 to the control unit CO. The signal Se may include information on the intensity of the radio wave EW2 and information on the phase of the radio wave EW2.

When an object such as a preceding vehicle or a person is located in front of the vehicle VE, a part of the radio wave EW1 transmitted from the transmission unit 25 is reflected by the object. A part of the radio wave reflected by the object passes through the outer cover 12, enters the accommodation space 13, and is received by the reception unit 26 of the sensor unit 20. The control unit CO of the present embodiment detects the object located in front of the vehicle VE on the basis of the signal Se related to the radio wave EW2 input from the reception unit 26 of the sensor unit 20 and the signal related to the radio wave EW1 input from the transmission unit 25 of the sensor unit 20, and outputs a detection signal Sd of the object. Therefore, the detection signal Sd is generated on the basis of the signals from the transmission unit 25 and the reception unit 26. Each of the signals from the transmission unit 25 and the reception unit 26 is a signal related to the electromagnetic wave from the sensor unit 20. Note that the control unit CO detects an object located in front of the vehicle VE, calculates an azimuth of the object with respect to the vehicle VE, and calculates a distance from the vehicle VE to the object by, for example, a frequency modulated continuous wave (FMCW) method on the basis of these signals. The detection signal Sd may include information related to the object such as the presence or absence of the object, the orientation, and the distance. The detection signal Sd output from the control unit CO is input to the ECU 100, for example. The ECU 100 assists the traveling of the vehicle VE based on the detection signal Sd.

Note that the sensor unit 20 only needs to transmit and receive the electromagnetic wave through the outer cover 12 and output a signal related to the electromagnetic wave, and the configuration of the sensor unit 20 is not particularly limited. For example, the transmission unit 25 may be configured to repeatedly emit pulsed radio waves. In this case, the control unit CO detects an object and calculates the distance to the object by, for example, a time of flight (ToF) method. Furthermore, the sensor unit 20 may include a detection unit disposed in the case 21, and the detection unit may detect an object located in front of the vehicle VE on the basis of a signal input from the transmission unit 25 and a signal Se input from the reception unit 26. In this case, the detection unit outputs a signal indicating the intensity of the electromagnetic wave received together with the information on the object to the control unit CO. The control unit CO inputs the detection signal Sd to the ECU 100 based on the signal. As a configuration of such a detection unit, for example, a configuration similar to that of the control unit CO can be exemplified. Furthermore, the sensor unit 20 may be a light detection and ranging (LiDAR) that emits laser light as an electromagnetic wave and receives the laser light. The electromagnetic wave transmitted and received by the sensor unit 20 may be infrared rays or ultraviolet rays. That is, the signal Se includes not only the signal related to the radio wave as described above but also the signal related to the electromagnetic wave received by the sensor unit 20.

As illustrated in FIG. 1, the heater 30 according to the present embodiment includes an electric heating wire 31 and a power supply circuit 32 as main components. The electric heating wire 31 is provided on an inner surface 12i that is a surface of the outer cover 12 on the sensor unit 20 side, and is connected to the power supply circuit 32 via the connector 33. The electric heating wire 31 is not particularly limited as long as it generates heat when a current flows, and may be formed of a paste of a conductor or may be formed of a metal wire or the like. The power supply circuit 32 applies a voltage to the electric heating wire 31 in accordance with the control signal from the control unit CO. When the voltage is applied to cause a current to flow through the electric heating wire 31, the electric heating wire 31 generates heat to heat the outer cover 12. The electric heating wire 31 is provided on the outer cover 12 such that a transmission region AR through which the radio wave EW1 emitted from the sensor unit 20 passes, of the outer surface 12o, which is the surface of the outer cover 12 on the side opposite to the sensor unit 20 side, is heated by the heat generation of the electric heating wire 31. In the present embodiment, the transmission region AR overlaps a part of the electric heating wire 31 in the propagation direction of the radio wave EW1. The calorific value of the electric heating wire 31 is such a calorific value that deformation, burning, or the like of the outer cover 12 due to heat does not occur. Note that, in the present description, the transmission region AR is described as a region through which the radio wave EW1 passes. However, as described above, since the sensor unit 20 also includes a mode of transmitting and receiving laser light as an electromagnetic wave, the transmission region AR is a region through which the electromagnetic wave emitted from the sensor unit 20 passes. Further, the heater 30 may include a heating element formed of a conductive paste instead of the electric heating wire 31, and the heating element may be attached to the inner surface 12i. The heater 30 may be configured to blow heated air to the inner surface 12i. In this case, the heater 30 includes a heat source that heats the air and a motor that rotates a fan that blows the heated air. In this case, a driving period of the heater 30 indicates driving periods of the heat source and the motor, a power amount of the heater 30 indicates power amount of the heat source and the motor, a voltage applied to the heater 30 indicates voltages applied to the heat source and the motor, and a resistance of the heater 30 indicates resistances of the heat source and the motor.

Note that the electric heating wire 31 only needs to be able to heat the transmission region AR, and for example, the transmission region AR and the electric heating wire 31 may not overlap each other in the propagation direction of the radio wave EW1, and may be attached to the outer surface 12o or the inside of the outer cover 12.

The cleaner 40 is configured to inject at least one of liquid and gas from the outer cover 12 toward the transmission region AR of the outer surface 12o of the vehicle VE. The vehicle sensor device 1 can remove an adhering substance adhering to the transmission region AR by the liquid or gas injected from the cleaner 40. In the present embodiment, the cleaner 40 is configured to be capable of injecting liquid and gas individually toward the transmission region AR, and includes a liquid unit 41 that injects liquid toward the transmission region AR and a gas unit 45 that injects gas toward the transmission region AR.

A support base 15 extending in the front-rear direction is attached to a front end portion below the housing 11. A front end of the support base 15 is located in front of the outer cover 12. The liquid unit 41 of the present embodiment includes a tank 41a that stores liquid, a pump 41b, and an injection nozzle 41c as main components. A pipe 42a connected to the tank 41a and a pipe 42b connected to the injection nozzle 41c are connected to the pump 41b. The pump 41b pressure-feeds the liquid in the tank 41a to the injection nozzle 41*c*. The pump 41*b* adjusts an amount of liquid to be pressure-fed to the injection nozzle 41*c* or stops the pressure-feeding of liquid in accordance with the control signal from the control unit CO. The injection nozzle 41*c* is attached to a portion of the support base 15 located in front of the outer cover 12 so that the liquid pressure-fed from the tank 41*a* is injected toward the transmission region AR. The injection nozzle 41*c* is located below the transmission region AR. Therefore, when the pump 41*b* pressure-feeds the liquid to the injection nozzle 41*c*, the liquid is injected from the lower side toward the transmission region AR. Examples of the liquid stored in the tank 41*a* include water and a window washer liquid. When the liquid is the window washer liquid, the tank 41*a* may be a window washer tank provided in the vehicle VE. Note that the liquid unit 41 only needs to be able to inject liquid from the outer cover 12 toward the transmission region AR from the outside of the vehicle VE, and the configuration of the liquid unit 41 is not particularly limited. The injection nozzle 41*c* is preferably configured such that the liquid is blown to the entire transmission region AR, but may be configured such that the liquid is blown to a part of the transmission region AR. Further, the injection nozzle 41*c* may be provided above the transmission region AR, and may be configured to inject liquid toward the transmission region AR from above. Further, the liquid unit 41 may be configured to spray the mist-like liquid toward the transmission region AR. Further, the liquid unit 41 may include a heater that heats the liquid to be injected, and may be configured to inject the liquid having a predetermined temperature, for example, 50° C. or higher toward the transmission region AR.

The gas unit 45 of the present embodiment includes a tank 45*a* that stores gas at a pressure higher than atmospheric pressure, a valve 45*b*, and an injection nozzle 45*c* as main components. A pipe 46*a* connected to the tank 45*a* and a pipe 46*b* connected to the injection nozzle 45*c* are connected to the valve 45*b*. When the valve 45*b* is opened, the gas in the tank 41*a* is pressure-fed to the injection nozzle 45*c*. The valve 45*b* adjusts degrees of opening and closing of the valve 45*b* in accordance with the control signal from the control unit CO. The injection nozzle 45*c* is attached to a portion of the support base 15 located in front of the outer cover 12 so that the gas pressure-fed from the tank 45*a* is injected toward the transmission region AR. The injection nozzle 45*c* is located below the transmission region AR. Therefore, when the valve 45*b* is opened, the gas is injected from the lower side toward the transmission region AR. Examples of the gas stored in the tank 41*a* include air and the like. When this gas is air, a compressor may be connected to the tank 41*a*, and the pressure of the air in the tank 41*a* may be maintained in a predetermined range by the compressor. The configuration of the gas unit 45 is not particularly limited as long as the gas unit 45 can inject gas from the outer cover 12 toward the transmission region AR from the outside of the vehicle VE. The injection nozzle 45*c* is preferably configured such that the gas is blown to the entire transmission region AR, but may be configured such that the gas is blown to a part of the transmission region AR. Further, the injection nozzle 45*c* may be provided above the transmission region AR, and may be configured to inject gas toward the transmission region AR from above. Furthermore, the gas unit 45 may further include a heater that heats the gas to be injected, and may be configured to inject the gas having a predetermined temperature, for example, 50° C. or higher toward the transmission region AR.

The lamp unit LU of the present embodiment is configured to emit light L of a predetermined light distribution pattern forward. The light L emitted from the lamp unit LU is emitted to the front of the vehicle VE via the outer cover 12. In the present embodiment, the lamp unit LU is configured to switch between emission and non-emission of the light L and switch the light distribution pattern of the emitted light L between a light distribution pattern of a low beam and a light distribution pattern of a high beam according to a control signal from the control unit CO. Examples of such a lamp unit LU include a configuration including a light source unit in which a plurality of light emitting elements is arranged in a matrix and a lens through which light emitted from the light source unit passes. Examples of the light source unit include a light emitting diode (LED) array. Note that the configuration of the lamp unit LU is not particularly limited. The lamp unit LU may not be able to change the light distribution pattern of the emitted light, and may be a parabolic lamp unit or a projector type lamp unit. Furthermore, the lamp unit LU may be controlled by another control unit different from the control unit CO.

Figure 2:
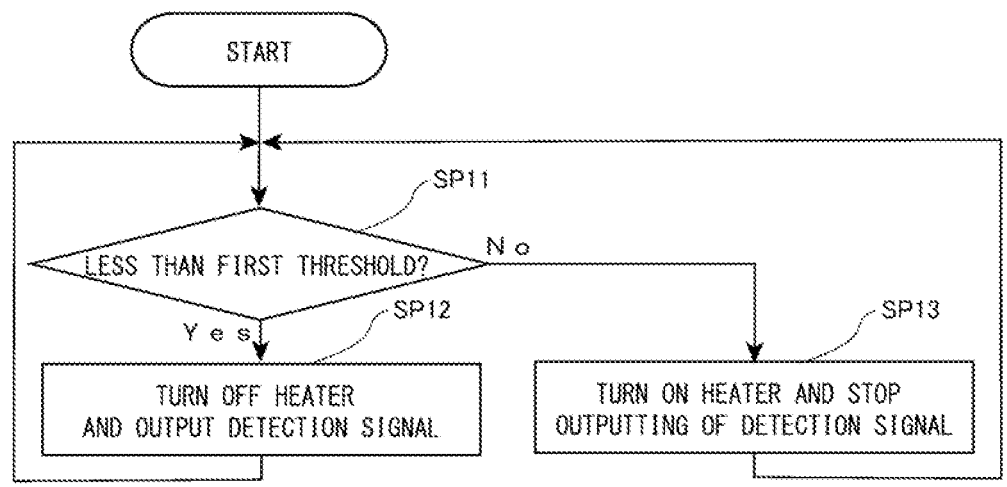
FIG. 2 is a diagram illustrating an example of a control flowchart of a control unit according to the first embodiment.

Next, an operation of the vehicle sensor device 1 of the present embodiment, specifically, an operation of controlling ON/OFF of the heater 30 and output/stop of the detection signal Sd will be described. FIG. 2 is a diagram illustrating an example of a control flowchart of the control unit CO in the present embodiment. As illustrated in FIG. 2, the control flow of the present embodiment includes Steps SP11 to SP13.

In a start state illustrated in FIG. 2, the sensor unit 20 transmits and receives an electromagnetic wave through the outer cover 12, and a signal related to the electromagnetic wave is input to the control unit CO from the sensor unit 20. The signal is the signal from the transmission unit 25 and the signal Se from the reception unit 26 as described above. In the start state, the control unit CO turns the heater 30 to OFF and outputs the detection signal Sd.

(Step SP11)

This step is a step in which the control unit CO determines whether the intensity is less than the first threshold based on the intensity of the radio wave EW2 indicated by the signal Se input from the reception unit 26. As described above, the radio wave EW1 emitted from the sensor unit 20 propagates toward the outer cover 12. A part of the radio wave EW1 passes through the outer cover 12 and is emitted to the front of the vehicle VE. Another part of the radio wave EW1 is reflected by the outer cover 12 and received by the sensor unit 20 as the radio wave EW2. When there is an adhering substance in the transmission region AR, another part of the radio wave EW1 is reflected by the adhering substance and received by the sensor unit 20 as the radio wave EW2. Therefore, when there is the adhering substance in the transmission region AR, the intensity of the radio wave EW2 received by the sensor unit 20 tends to be high as compared with a case where there is no adhering substance in the transmission region AR. In addition, when there is the adhering substance in the transmission region AR, the intensity of the radio wave EW2 received by the sensor unit 20 tends to change depending on the adhering substance. In general, the intensity of the radio wave EW2 received by the sensor unit 20 tends to decrease in the order of the case where ice and snow adhere to the transmission region AR and the case where dust or water droplets adhere to the transmission region AR. In the present embodiment, the first threshold is set to a value less than the intensity of the radio wave EW2 received by the sensor unit 20 when a predetermined amount of dust or water droplets adheres to the transmission region AR. Then, when the intensity of the radio wave EW2 indicated by the signal Se input from the reception unit 26 is less than the first threshold, the control unit CO advances the control flow to Step SP12. Meanwhile, when the intensity of the radio wave EW2 indicated by the signal Se is equal to or more than the first threshold, the control unit CO advances the control flow to Step SP13. In this manner, the control unit CO divides the case according to the signal Se input from the reception unit 26 and changes the step to proceed to the next.

(Step SP12)

In this step, the control unit CO controls the heater 30 to be OFF to control the sensor unit 20 to be ON, and outputs the detection signal Sd in the entire period of the period in which the heater 30 is OFF. As a result, the heater 30 is stopped, the transmission unit 25 emits the radio wave EW1 toward the outside of the vehicle VE via the outer cover 12, and the reception unit 26 receives the radio wave EW2 reflected by the object on a traveling path of the radio wave EW1 in the radio wave EW1 via the outer cover 12. Further, the transmission unit 25 outputs the signal related to the transmitted radio wave EW1 to the control unit CO, and the reception unit 26 outputs the signal Se related to the received radio wave EW2 to the control unit CO. The control unit CO outputs the detection signal Sd generated based on the signal input from the transmission unit 25 and the signal Se input from the reception unit 26. Next, the control unit CO returns the control flow to Step SP11.

(Step SP13)

In this step, the control unit CO controls the heater 30 to be ON to control the sensor unit 20 to be ON, and stops the outputting of the detection signal Sd in the entire period of the period in which the heater 30 is ON. As a result, the heater 30 is driven to generate heat, the heat is transmitted to the outer cover 12, and the outer cover 12 including the transmission region AR is warmed to a predetermined temperature. The adhering substance adhering to the outer cover starts to melt by heat from the outer cover 12. In this step, the transmission unit 25 emits the radio wave EW1 toward the outer cover 12, and the reception unit 26 receives the radio wave EW2 reflected from the adhering substance among the emitted radio waves EW1. In this step, as in Step SP12, the transmission unit 25 outputs the signal related to the radio wave EW1 to the control unit CO, and the reception unit 26 outputs the signal Se related to the received radio wave EW2 to the control unit CO. In this step, as in Step SP12, the control unit CO generates the detection signal Sd based on the signal input from the transmission unit 25 and the signal Se input from the reception unit 26. However, in this step, unlike Step SP12, the control unit CO stops outputting of the detection signal Sd. Therefore, in this step, the transmission unit 25 and the reception unit 26 do not stop, and the control unit CO does not output the detection signal Sd. In this step, since the detection signal Sd is not output, the power consumption due to the outputting of the detection signal Sd is suppressed as compared with the case where the detection signal Sd is output. Next, the control unit CO returns the control flow to Step SP11. In this step, the control unit CO stops outputting of the detection signal Sd, but receives the signal Se from the reception unit 26. Therefore, when the control flow returns from Step SP13 to Step SP11, in Step SP11, the control unit CO determines whether the intensity is less than the first threshold based on the intensity of the radio wave EW2 indicated by the signal Se.

As described in each of the above steps, the control unit CO switches ON/OFF of the heater 30 based on the intensity of the radio wave EW2 indicated by the signal Se, and switches stop of outputting of the detection signal Sd and outputting of the detection signal Sd based on the switching of ON/OFF of the heater 30.

Meanwhile, in the vehicle sensor device of Patent Literature 1, in order to detect an object, an electromagnetic wave is emitted even when an adhering substance adheres to the cover. In this case, the traveling of the electromagnetic wave is hindered by the adhering substance, and the detection accuracy of the vehicle sensor device may decrease. When the detection accuracy is low, information obtained by detection is difficult to use, and power used to output the information may be wasted.

Therefore, the vehicle sensor device 1 of the present embodiment includes the outer cover 12 and the sensor unit 20 that is disposed inside the vehicle VE with respect to the outer cover 12, transmits and receives the electromagnetic wave through the outer cover 12, and outputs a signal related to the electromagnetic wave incident on the inside of the outer cover 12. In addition, the vehicle sensor device 1 includes the heater 30 that is provided in the outer cover 12 and heats the transmission region AR through which the electromagnetic wave emitted from the sensor unit 20 in the outer cover 12 passes, and the control unit CO. The control unit CO outputs the detection signal Sd of the object located outside the outer cover 12 based on the signal related to the electromagnetic wave from the sensor unit 20 in the entire period of the period in which the heater 30 is OFF, and stops the outputting of the detection signal Sd in the entire period of the period in which the heater 30 is ON.

In the vehicle sensor device 1, when the electromagnetic wave emitted from the sensor unit 20 toward the outside of the vehicle VE is reflected by the traveling direction of the electromagnetic wave and the object outside the vehicle VE and passes through the transmission region AR, the electromagnetic wave can be received by the sensor unit 20, and the object can be detected from the signal related to the electromagnetic wave. In the vehicle sensor device 1, the control unit CO outputs the detection signal Sd of the object based on the signal related to the electromagnetic wave from the sensor unit 20 in the period in which the heater 30 is OFF. Generally, in the period in which the heater 30 is OFF, the adhering substance tends not to adhere to the transmission region AR. In this case, since the obstruction of the travel of the electromagnetic wave by the adhering substance is suppressed, the decrease in the detection accuracy of the vehicle sensor device 1 can be suppressed. In addition, in general, the adhering substance tends to adhere to the transmission region AR in the period in which the heater 30 is ON. In this case, since the traveling of the electromagnetic wave is hindered by the adhering substance, the detection accuracy of the vehicle sensor device 1 decreases. Therefore, information obtained by detection is difficult to use, and power used to output the detection signal Sd including the information may be wasted. However, in the vehicle sensor device 1, the control unit CO stops the outputting of the detection signal Sd in the entire period of the period in which the heater 30 is ON. That is, the outputting of the detection signal Sd is stopped in the entire period while the adhering substance is removed by the heat of the heater 30. Therefore, wasteful power consumption can be suppressed.

In Step SP13, in the period in which the heater 30 is ON, the transmission unit 25 of the sensor unit 20 emits the radio wave EW1 as the electromagnetic wave toward the outside of the vehicle VE via the outer cover 12.

In the above configuration, the transmission unit 25 emits the radio wave EW1 during the period in which the heater 30 is ON and the period in which the heater 30 is OFF, and does not switch the stop of the emission of the radio wave EW1 or the emission of the radio wave EW1 according to the switching of ON/OFF of the heater 30. Therefore, the load on the transmission unit 25 due to the switching can be reduced. Furthermore, in general, it takes time to activate the transmission unit 25, but in the above configuration, since the transmission unit 25 is always driven to emit the radio wave EW1, the time required for activation can be omitted. When the time is omitted, the detection signal Sd can be output early when the heater 30 is switched from ON to OFF as compared with a case where the time is not omitted.

In Step SP13, in the period in which the heater 30 is ON, the reception unit 26 of the sensor unit 20 receives the radio wave EW2 as the electromagnetic wave incident on the inside of the vehicle VE from the outside of the vehicle VE through the outer cover 12.

In the above configuration, the reception unit 26 receives the radio wave EW2 during the period in which the heater 30 is ON and the period in which the heater 30 is OFF, and does not switch the stop of the reception of the radio wave EW2 or the reception of the radio wave EW2 according to the switching of ON/OFF of the heater 30. Therefore, the load on the reception unit 26 due to the switching can be reduced. In addition, since the reception unit 26 is always driven to receive the radio wave EW2, the time required for activation can be omitted. When the time is omitted, the detection signal Sd can be output early as described above.

In Step SP13, in the period in which the heater 30 is ON, the reception unit 26 of the sensor unit 20 receives the radio wave EW2 as the electromagnetic wave incident on the inside of the vehicle VE from the outside of the vehicle VE through the outer cover 12, and outputs the signal Se to the control unit CO.

In the above configuration, the reception unit 26 outputs the signal Se to the control unit CO in the period in which the heater 30 is ON and the period in which the heater 30 is OFF, and does not stop the outputting of the signal Se or switch the outputting of the signal Se according to the switching of ON/OFF of the heater 30. Therefore, the load on the reception unit 26 due to the switching can be reduced. Furthermore, since the reception unit 26 is always driven to output the signal Se, the time required for activation can be omitted. When the time is omitted, the detection signal Sd can be output early as described above.

In Step SP13, the control unit CO only needs to stop the outputting of the detection signal Sd, and the operations of the sensor unit 20 and the control unit CO are not particularly limited. For example, in Step SP13, the transmission unit 25 may stop without outputting the radio wave EW1, the transmission unit 25 may stop without outputting the signal related to the radio wave EW1 to the control unit CO, or the reception unit 26 may stop without outputting the signal Se related to the radio wave EW2 to the control unit CO. As a result, the detection signal Sd is not generated on the basis of the signals from the transmission unit 25 and the reception unit 26, and the outputting of the detection signal Sd is stopped. Since at least one of the transmission unit 25 and the reception unit 26 is OFF and the outputting of the detection signal Sd is stopped, power consumption is suppressed as compared with a case where both the transmission unit 25 and the reception unit 26 are ON and the outputting of the detection signal Sd is stopped. When at least one of the transmission unit 25 and the reception unit 26 is OFF, both the transmission unit 25 and the reception unit 26 are controlled to be ON after a lapse of a predetermined period after the heater 30 is ON in Step SP13. As a result, the transmission unit 25 emits the radio wave EW1 toward the outer cover 12, and the reception unit 26 receives the reflected radio wave EW2 out of the emitted radio waves EW1. Further, the transmission unit 25 outputs the signal related to the transmitted radio wave EW1 to the control unit CO, and the reception unit 26 outputs the signal related to the received radio wave EW2 to the control unit CO. The control unit CO may output the detection signal Sd generated based on the signal input from each of the transmission unit 25 and the reception unit 26, and return the control flow to Step SP11.

In Step SP12, the control unit CO may output the detection signal Sd in at least a part of the predetermined period in which the heater 30 is OFF. In Step SP13, the control unit CO may stop the outputting of the detection signal Sd in at least a part of the predetermined period in which the heater 30 is ON.

In the case of returning the control flow from Step SP13 to Step SP11, the control unit CO may return the control flow to Step SP11 after a lapse of a predetermined period after the heater 30 is ON in Step SP13. As a result, as compared with the case where the control flow returns from Step SP13 to Step SP11 before the predetermined period elapses, an interval for determining the intensity in Step SP11 becomes longer, and the load on the control unit CO can be reduced.

Next, a modification of the present embodiment will be described.

Figure 3:
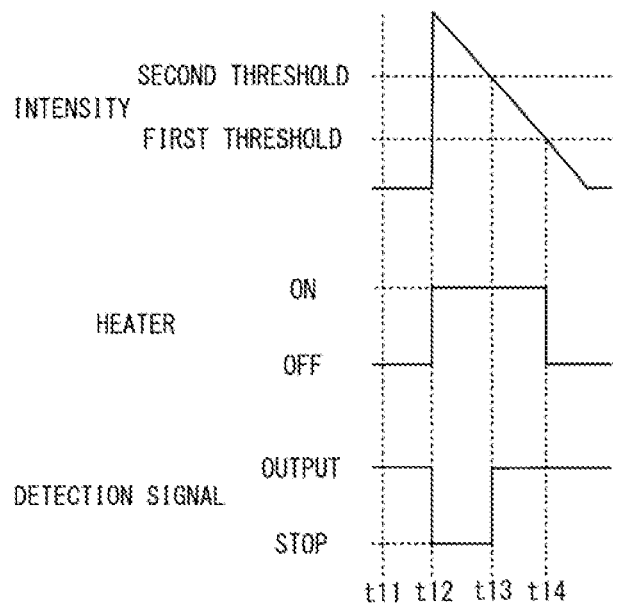
FIG. 3 is a timing chart related to ON/OFF of a heater and output/stop of a detection signal according to an intensity in a first modification of the first embodiment.

A first modification will be described with reference to FIG. 3. FIG. 3 is a timing chart regarding ON/OFF of the heater 30 and output/stop of the detection signal Sd according to the intensity in the present modification.

The control unit CO stops the outputting of the detection signal Sd when the intensity is more than the first threshold and the adhesion amount of the adhering substance is equal to or more than the second threshold indicating that the adhesion amount is more than the adhesion amount at the first threshold in the period in which the heater 30 is ON. In addition, the control unit CO outputs the detection signal Sd in a case where the detection signal is equal to or more than the first threshold and less than the second threshold in the period in which the heater 30 is ON. As described in the first embodiment, the intensity is the intensity of the radio wave EW2, and is indicated by the signal Se from the reception unit 26 and changes according to the adhesion amount of the adhering substance adhering to the transmission region AR.

At a time t11 illustrated in FIG. 3, the intensity is less than the first threshold, and the control unit CO turns the heater 30 to OFF and outputs the detection signal Sd. When the adhering substance adheres to the transmission region AR at a time t12 after the time t11, the intensity becomes equal to or more than the first threshold. At the time t12, a large amount of adhering substance adheres, and the intensity is equal to or more than the second threshold. In this case, the control unit CO switches the heater 30 to ON and stops the outputting of the detection signal Sd. When the time elapses from the time t12, the adhering substance is generally melted by heat from the heater 30, and decreases every time the time elapses. When the amount of the adhering substance decreases, the reflection of the electromagnetic wave reflected by the adhering substance decreases, so that the intensity decreases. When the intensity becomes equal to or more than the first threshold and less than the second threshold at a time t13 after the time t12, the control unit CO outputs the detection signal Sd while maintaining ON of the heater 30. As time elapses from the time t13, the amount of adhering substances further decreases, and the intensity further decreases. When the intensity becomes less than the first threshold at a time t14 after the time t13, the control unit CO switches the heater 30 to OFF, but keeps the outputting of the detection signal Sd. Note that the heater 30 may remain ON at the time t14.

As described above, generally, the adhering substance tends to adhere to the transmission region AR during the period in which the heater 30 is ON. In the vehicle sensor device 1, when the adhering substance adheres to the transmission region AR, a part of the electromagnetic wave emitted from the sensor unit 20 is reflected by the adhering substance and received by the sensor unit 20. The intensity of the received electromagnetic wave tends to increase as the adhesion amount of the adhering substance increases, because the reflection of the electromagnetic wave reflected by the adhering substance increases. In general, the intensity of the electromagnetic wave received by the sensor unit 20 tends to increase in the order of when dust or water droplets adhere to the transmission region AR and when ice and snow adhere to the transmission region AR. In this case, the first threshold is set to a value less than the intensity of the electromagnetic wave received by the sensor unit 20 when dust or water droplets adhere to the transmission region AR. The second threshold is set to a value higher than the intensity of the electromagnetic wave received by the sensor unit 20 when a predetermined amount of dust or water droplets adheres to the transmission region AR, and less than the intensity of the electromagnetic wave received by the sensor unit 20 when ice and snow adhere to the transmission region AR. When the intensity of the electromagnetic wave is equal to or more than the second threshold, the detection accuracy of the vehicle sensor device 1 decreases as compared with a case where the intensity is equal to or more than the first threshold and less than the second threshold. Therefore, since the information obtained in this case is difficult to use, a time during which power is wastefully consumed becomes long. However, in the vehicle sensor device 1 of the present modification, when the intensity of the electromagnetic wave is equal to or more than the second threshold, the outputting of the detection signal Sd is stopped, so that the time during which the power is wastefully consumed may be shortened.

In addition, when the adhering substance starts to melt and decreases, the reflection of the electromagnetic wave by the adhering substance is suppressed, and the intensity decreases. In a case where the intensity is equal to or more than the first threshold and less than the second threshold, the adhesion amount of the adhering substance is smaller than that in a case where the intensity is equal to or more than the second threshold, and thus, it is possible to suppress the hindrance of the traveling of the electromagnetic wave due to the adhering substance and to suppress the decrease in the detection accuracy of the vehicle sensor device 1. In this case, even when the detection signal Sd is output, the vehicle sensor device 1 can obtain highly accurate information as compared with the case where the intensity is equal to or more than the second threshold, and the safety of the vehicle during traveling can be improved by using the information.

Figure 4:
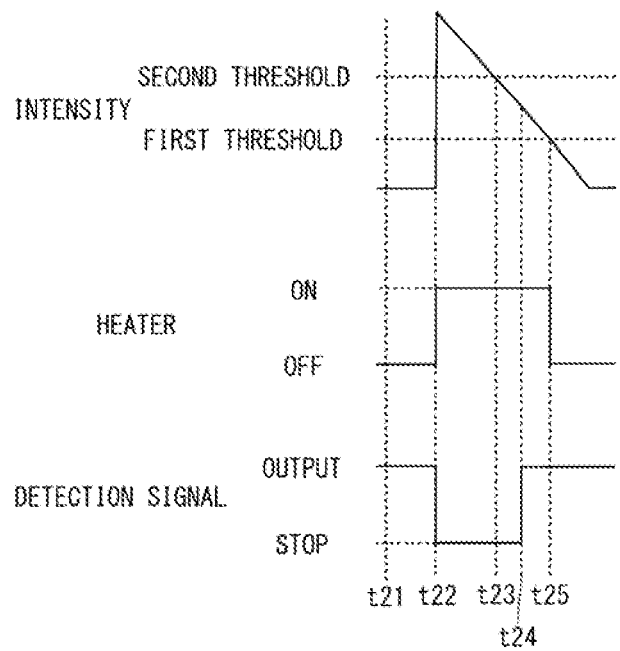
FIG. 4 is a timing chart related to ON/OFF of a heater and output/stop of a detection signal according to an intensity in a second modification of the first embodiment.

Next, a second modification will be described with reference to FIG. 4. FIG. 4 is a timing chart regarding ON/OFF of the heater 30 and output/stop of the detection signal Sd according to the intensity in the present modification.

The control unit CO maintains ON of the heater 30 for a predetermined period after the intensity becomes equal to or more than the second threshold in a case where the intensity is equal to or more than the second threshold more than the first threshold. In addition, the control unit CO makes an output stop period of the detection signal Sd longer than an output period of the detection signal Sd in the period in which the heater 30 is ON. The intensity, the first threshold, and the second threshold are the same as the intensity, the first threshold, and the second threshold in the first modification.

At a time t21 illustrated in FIG. 4, the intensity is less than the first threshold, and the control unit CO turns the heater 30 to OFF and outputs the detection signal Sd. When a large amount of adhering substance adheres to the transmission region AR at a time t22 after the time t21, the intensity is equal to or more than the second threshold. In this case, the control unit CO switches the heater 30 to ON and stops the outputting of the detection signal Sd. The control unit CO maintains ON of the heater 30 for a predetermined period. A time at which a predetermined period has elapsed from time t22 is defined as a time t25. In addition, the control unit CO sets a time between the time t22 and the time t25 as a time t24. The time t24 is set such that a period from the time t22 to the time t24 is longer than a period from the time t24 to the time t25. As time elapses from the time t22, the adhering substance is warmed to decrease, and the intensity decreases. At a time t23 between time t22 and time t24, even when the intensity is equal to or more than the first threshold and less than the second threshold, the control unit CO maintains ON of the heater 30 and stops the outputting of the detection signal Sd. At the time t24, the control unit CO outputs the detection signal Sd while maintaining ON of the heater 30. At the time t25, the control unit CO switches the heater 30 to OFF, but keeps the outputting of the detection signal Sd.

When the intensity of the electromagnetic wave is equal to or more than the second threshold as described above, the heater 30 is ON for a predetermined period. In a case where the output period of the detection signal Sd is longer than the output stop period of the detection signal Sd in the period in which the heater 30 is ON, since a large amount of adhering substance adheres to the transmission region AR as described above, the detection accuracy of the vehicle sensor device 1 decreases. Therefore, since the information obtained in this case is difficult to use, a time during which power is wastefully consumed becomes long. However, in the vehicle sensor device 1 of the present modification, since the output stop period of the detection signal Sd is longer than the output period of the detection signal Sd, the time during which power is wastefully consumed may be shortened. Note that the timing at which the detection signal Sd is switched from stop to output appropriately changes depending on the time during which the intensity is equal to or more than the second threshold and the time during which the intensity is equal to or more than the first threshold and less than the second threshold. Therefore, the timing may be when the intensity is equal to or more than the second threshold or when the intensity is equal to or more than the first threshold and less than the second threshold. Furthermore, at the time t25, ON of the heater 30 may be maintained.

Figure 5:
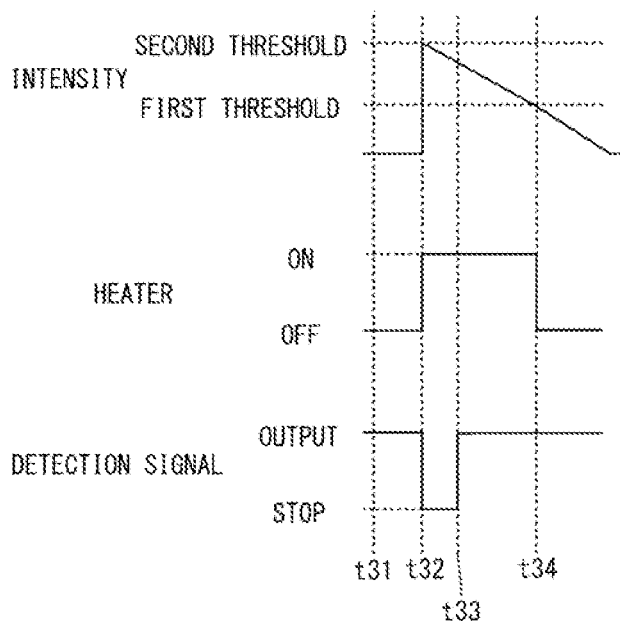
FIG. 5 is a timing chart related to ON/OFF of a heater and output/stop of a detection signal according to an intensity in a third modification of the first embodiment.

Next, a third modification will be described with reference to FIG. 5. FIG. 5 is a timing chart regarding ON/OFF of the heater 30 and output/stop of the detection signal Sd according to the intensity in the present modification.

In a case where the intensity is equal to or more than the first threshold and less than the second threshold, the control unit CO maintains ON of the heater 30 for a predetermined period after the intensity becomes equal to or more than the first threshold and less than the second threshold. In addition, the control unit CO makes the output period of the detection signal Sd longer than the output stop period of the detection signal Sd in the period in which the heater 30 is ON. The intensity, the first threshold, and the second threshold are the same as the intensity, the first threshold, and the second threshold in the first modification.

At a time t31 illustrated in FIG. 5, the intensity is less than the first threshold, and the control unit CO turns the heater 30 to OFF and outputs the detection signal Sd. At a time t32 after the time t31, it is assumed that the adhering substance adheres to the transmission region AR, and the intensity in this case is equal to or more than the first threshold and less than the second threshold. In this case, the control unit CO switches the heater 30 to ON and stops the outputting of the detection signal Sd. The control unit CO maintains ON of the heater 30 for a predetermined period. A time at which a predetermined period has elapsed from the time t32 is defined as a time t34. In addition, the control unit CO sets a time between the time t32 and the time t34 as a time t33. The time t33 is set such that a period from the time t33 to the time t34 is longer than a period from the time t32 to the time t34. As time elapses from the time t32, the adhering substance is warmed to decrease, and the intensity decreases. At the time t33, the control unit CO outputs the detection signal Sd while maintaining ON of the heater 30. At the time t34, the control unit CO switches the heater 30 to OFF, but keeps the outputting of the detection signal Sd.

As described above, in a case where the intensity is equal to or more than the first threshold and less than the second threshold, the adhesion amount of the adhering substance is smaller than that in a case where the intensity is equal to or more than the second threshold, and thus, it is possible to suppress the hindrance of the traveling of the electromagnetic wave due to the adhering substance and to suppress the decrease in the detection accuracy of the vehicle sensor device 1. In this case, in the vehicle sensor device 1 of the present modification, since the output period of the detection signal Sd is longer than the output stop period of the detection signal Sd, highly accurate information can be obtained as compared with the case where the intensity is equal to or more than the second threshold, and the safety during traveling of the vehicle VE can be improved by using the information. Note that the heater 30 may remain ON at the time t34.

Figure 6:
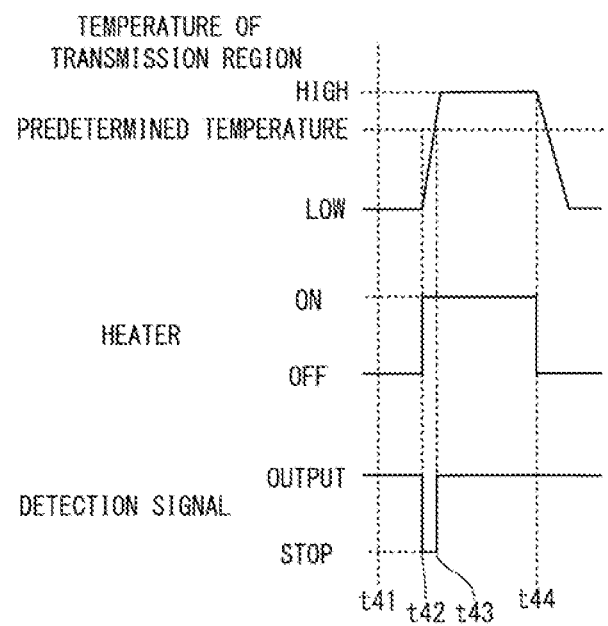
FIG. 6 is a timing chart related to ON/OFF of a heater and output/stop of a detection signal according to a temperature of a transmission region of an outer cover in a fourth modification of the first embodiment.

A fourth modification will be described with reference to FIG. 6. FIG. 6 is a timing chart regarding ON/OFF of the heater 30 and output/stop of the detection signal Sd according to the temperature of the transmission region AR in the present modification.

The control unit CO stops the outputting of the detection signal Sd when the signal output from the temperature sensor 50 that measures the temperature of the transmission region AR indicates a temperature less than the predetermined temperature in the period in which the heater 30 is ON. In addition, the control unit CO outputs the detection signal Sd in a case where the signal output from the temperature sensor indicates a temperature equal to or more than the predetermined temperature in the period in which the heater 30 is ON. The predetermined temperature may be a value set in advance in the storage unit 52.

The temperature sensor 50 is attached to, for example, the outer surface of the outer cover 12, and measures the temperature of the transmission region AR through the outer surface of the outer cover 12. Since the transmission region AR has substantially the same temperature as the outer surface, the temperature sensor 50 measures the temperature of the outer surface as the temperature of the transmission region AR. Note that the temperature sensor 50 may be disposed in the transmission region AR so as not to hinder the traveling of the electromagnetic wave, and measure the temperature of the transmission region AR. The temperature sensor 50 is electrically connected to the control unit CO, and outputs a signal indicating the measured temperature to the control unit CO.

At a time t41 illustrated in FIG. 6, the temperature of the transmission region AR is less than the predetermined temperature, and the control unit CO turns the heater 30 to OFF and outputs the detection signal Sd. At a time t42 after the time t41, the control unit CO switches the heater 30 to ON and stops the outputting of the detection signal Sd. When the heater 30 is ON, the temperature of the transmission region AR increases due to the heat from the heater 30. In a case where the temperature is less than the predetermined temperature, the control unit CO remains stopping the outputting of the detection signal Sd. When the temperature becomes equal to or more than the predetermined temperature at a time t43 after the time t42, the control unit CO maintains ON of the heater 30 and outputs the detection signal Sd. During a period from the time t43 to a time t44 after a lapse of time, the control unit CO outputs the detection signal Sd while maintaining ON of the heater 30. At the time t44, the control unit CO switches the heater 30 to OFF, but keeps the outputting of the detection signal Sd. Note that the heater 30 may remain ON at the time t44.

In a case where the temperature of the transmission region AR is less than the predetermined temperature, the adhering substance is less likely to melt even when heated, and the traveling of the electromagnetic wave is hindered by the adhering substance, as compared with a case where the temperature of the transmission region AR is equal to or more than the predetermined temperature, and the detection accuracy of the vehicle sensor device 1 decreases. Therefore, since the information obtained in this case is difficult to use, a time during which power is wastefully consumed becomes long. However, in the vehicle sensor device 1 of the present modification, in a case where the signal output from the temperature sensor 50 indicates a temperature less than the predetermined temperature in the period in which the heater 30 is ON, the outputting of the detection signal Sd is stopped, so that the time during which the power is wastefully consumed may be shortened.

In addition, in a case where the temperature of the transmission region AR is equal to or more than the predetermined temperature, the adhering substance is likely to be melted as compared with a case where the temperature of the transmission region AR is less than the predetermined temperature, the hindrance of the traveling of the electromagnetic wave by the adhering substance is suppressed, and the decrease in the detection accuracy of the vehicle sensor device 1 can be suppressed. In this case, in the vehicle sensor device 1, even if the detection signal Sd is output, highly accurate information can be used as compared with the case where the temperature of the transmission region AR is less than the predetermined temperature, and the safety during traveling of the vehicle can be improved by using the information.

Figure 7:
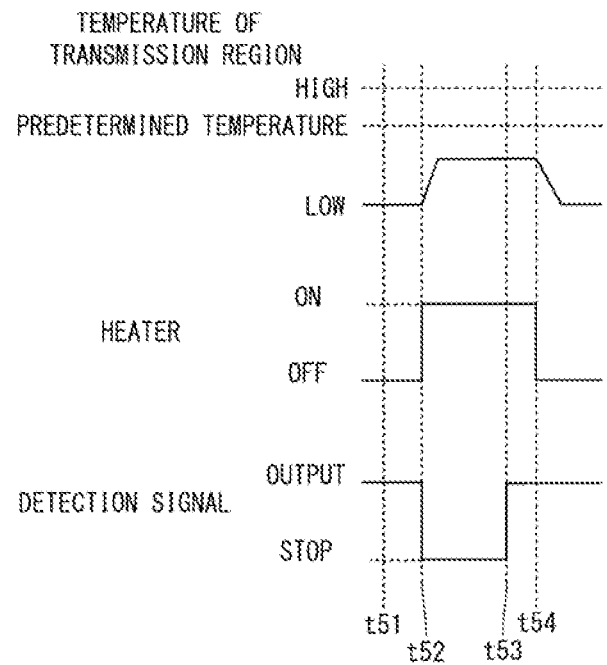
FIG. 7 is a timing chart related to ON/OFF of a heater and output/stop of a detection signal according to a temperature of a transmission region of an outer cover in a fifth modification of the first embodiment.

Next, a fifth modification will be described with reference to FIG. 7. FIG. 7 is a timing chart regarding ON/OFF of the heater 30 and output/stop of the detection signal Sd according to the temperature of the transmission region AR in the present modification.

When the signal output from the temperature sensor 50 indicates a temperature less than the predetermined temperature after the heater 30 is ON for the predetermined period, the control unit CO makes the output stop period of the detection signal Sd longer than the output period of the detection signal Sd in the period in which the heater 30 is ON.

At a time t51 illustrated in FIG. 7, the temperature of the transmission region AR is less than the predetermined temperature, and the control unit CO turns the heater 30 to OFF and outputs the detection signal Sd. At a time t52 after the time t51, the control unit CO switches the heater 30 to ON and stops outputting the detection signal Sd. The control unit CO maintains ON of the heater 30 for a predetermined period. A time at which a predetermined period has elapsed from time t52 is defined as a time t54. In addition, the control unit CO sets a time between the time t52 and the time t54 as a time t53. The time t53 is set such that a period from the time t52 to the time t53 is longer than a period from the time t53 to the time t54. Between the time t52 and the time t53, the control unit CO maintains ON of the heater 30 and stops the outputting of the detection signal Sd. At the time t53, the adhering substance is warmed to be less than that at the time t52. Therefore, at the time t53, the control unit CO outputs the detection signal Sd while maintaining ON of the heater 30. At the time t54, the control unit CO switches the heater 30 to OFF, but keeps the outputting of the detection signal Sd. Note that the heater 30 may remain ON at the time t54.

In a case where the temperature of the transmission region AR is less than a predetermined temperature such as the temperature of the adhering substance, for example, the adhering substance is less likely to melt even when heated, and the traveling of the electromagnetic wave is hindered by the adhering substance, as compared with a case where the temperature of the transmission region AR is equal to or more than the predetermined temperature. In this case, even when the output period of the detection signal Sd becomes longer than the output stop period of the detection signal Sd, the detection accuracy of the vehicle sensor device 1 decreases. Therefore, since the information obtained in this case is difficult to use, a time during which power is wastefully consumed becomes long. However, in the vehicle sensor device 1 of the present modification, the time during which power is wastefully consumed can be shortened by the above configuration.

Figure 8:
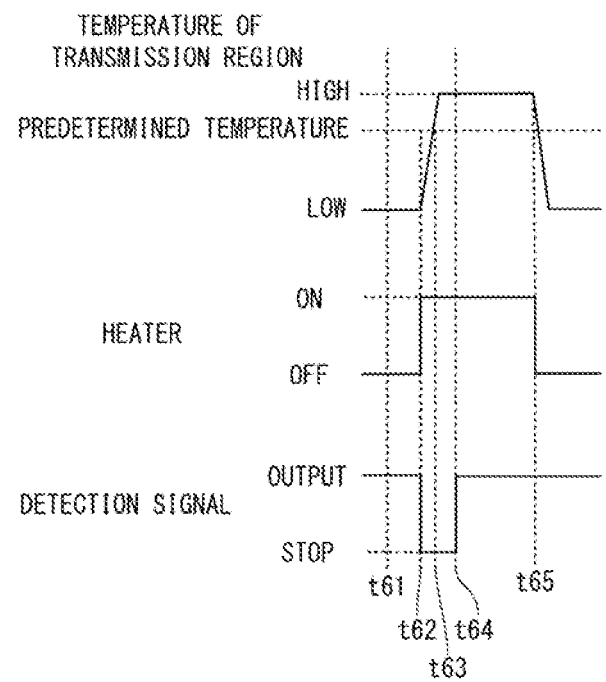
FIG. 8 is a timing chart related to ON/OFF of a heater and output/stop of a detection signal according to a temperature of a transmission region of an outer cover in a sixth modification of the first embodiment.

Next, a sixth modification will be described with reference to FIG. 8. FIG. 8 is a timing chart regarding the output/stop of the detection signal Sd according to the temperature of the transmission region AR in the present modification.

When the signal output from the temperature sensor 50 indicates a temperature equal to or more than a predetermined temperature after the heater 30 is ON for a predetermined period, the control unit CO makes the output period of the detection signal Sd longer than the output stop period of the detection signal Sd in the period in which the heater 30 is ON.

At a time t61 illustrated in FIG. 8, the temperature of the transmission region AR is less than the predetermined temperature, and the control unit CO turns the heater 30 to OFF and outputs the detection signal Sd. At a time t62 after the time t61, the control unit CO switches the heater 30 to ON and stops the outputting of the detection signal Sd. The control unit CO maintains ON of the heater 30 for a predetermined period. A time at which a predetermined period has elapsed from the time t62 is defined as a time t65. In addition, the control unit CO sets a time between the time t62 and the time t65 as a time t64. The time t64 is set such that a period from the time t64 to the time t65 is longer than a period from the time t62 to the time t64. When the heater 30 is ON, the temperature of the transmission region AR increases due to the heat from the heater 30. In a case where the temperature is less than the predetermined temperature, the control unit CO remains stopping the outputting of the detection signal Sd. Even at a time t63 between the time t62 and the time t64 when the temperature becomes equal to or more than the predetermined temperature, the control unit CO maintains ON of the heater 30 and stops the outputting of the detection signal Sd. During a period from time t63 to time t64, the control unit CO maintains ON of the heater 30 and stops the outputting of the detection signal Sd. At the time t64, the control unit CO outputs the detection signal Sd while maintaining ON of the heater 30. At time the t65, the control unit CO switches the heater 30 to OFF, but keeps the outputting of the detection signal Sd. Note that the heater 30 may remain ON at the time t65.

In a case where the temperature of the transmission region AR is equal to or more than a predetermined temperature such as the temperature of the adhering substance, for example, the adhering substance is easily melted as compared with a case where the temperature of the transmission region AR is less than the predetermined temperature, hindrance of the traveling of the electromagnetic wave by the adhering substance is suppressed, and a decrease in detection accuracy of the vehicle sensor device 1 can be suppressed. In this case, in the vehicle sensor device 1 of the present modification, with the above configuration, information with high accuracy can be used as compared with the case where the temperature of the heater 30 is less than the predetermined temperature, and the safety during traveling of the vehicle VE can be improved by using the information.

Figure 9:
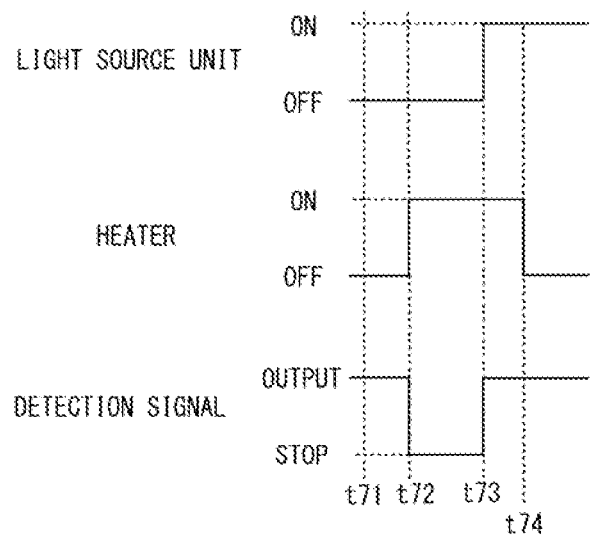
FIG. 9 is a timing chart regarding ON/OFF of each of a light source unit and a heater and output/stop of a detection signal in a seventh modification of the first embodiment.

Next, a seventh modification will be described with reference to FIG. 9. FIG. 9 is a timing chart regarding ON/OFF of each of the light source unit 61 and the heater 30 and output/stop of the detection signal Sd in the present modification.

The control unit CO outputs the detection signal Sd in the period in which the heater 30 is ON and the period in which the light source unit 61 that emits light to the outside of the vehicle VE via the outer cover 12 is ON. When a light source switch (not illustrated) is OFF, a control signal indicating that the light source unit 61 is ON is not input from the light source switch to the control unit CO, and when the light source switch is ON, the control signal is input from the light source switch to the control unit CO.

At a time t71 illustrated in FIG. 9, the light source unit 61 is OFF, the control signal is not input to the control unit CO, and the control unit CO turns the heater 30 to OFF and outputs the detection signal Sd. In addition, at a time t72 after the time t71, the light source unit 61 remains OFF and the control signal remains not input to the control unit CO, and the control unit CO switches the heater 30 to ON and stops the outputting of the detection signal Sd. In addition, when the light source unit 61 is ON at a time t73 after the time t72, the control signal is input to the control unit CO, and the control unit CO outputs the detection signal Sd while maintaining ON of the heater 30. At a time t74 after the time t73, the control unit CO switches the heater 30 to OFF, but keeps the outputting of the detection signal Sd. At time the t73, the light source unit 61 is ON, but may be OFF.

In the vehicle sensor device 1, the outer cover 12 including the transmission region AR is warmed by the light emitted from the light source unit 61 and passing through the outer cover 12. Therefore, the adhering substance is warmed by the light from the light source unit 61 together with the heat from the heater 30, and can be melted and removed earlier than the case of being warmed by the heat from the heater 30. When the adhering substance is removed, even when the detection signal Sd is output, a decrease in detection accuracy of the vehicle sensor device 1 can be suppressed. Therefore, in the vehicle sensor device 1 of the present modification, information with higher accuracy than in a case where an adhering substance is not removed can be used, and the safety of the vehicle VE during traveling can be improved by using the information.

Figure 10:
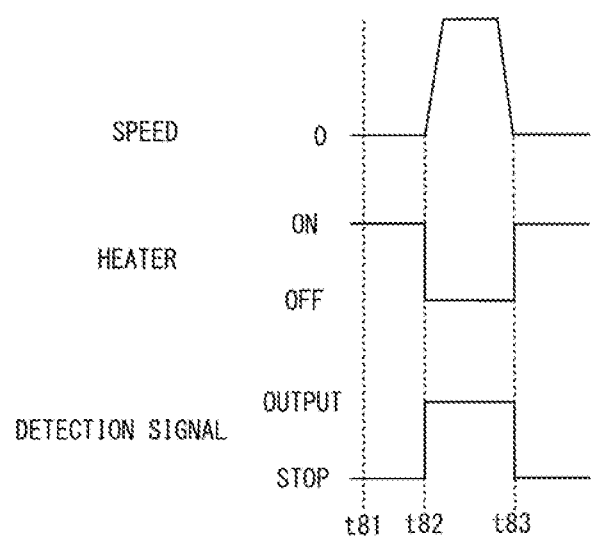
FIG. 10 is a timing chart related to ON/OFF of a heater and output/stop of a detection signal according to a speed of a vehicle according to an eighth modification of the first embodiment.

Next, an eighth modification will be described with reference to FIG. 10. FIG. 10 is a timing chart related to ON/OFF of the heater 30 and output/stop of the detection signal Sd according to the speed of the vehicle VE in the present modification.

The control unit CO controls the heater 30 to be ON in a state where the vehicle VE is stopped, and stops the outputting of the detection signal Sd during the period in which the heater 30 is ON.

At a time t81 illustrated in FIG. 10, the vehicle VE is stopped, and the control unit CO turns the heater 30 to ON and stops the outputting of the detection signal Sd. When the vehicle VE travels at a time t82 after the time t81, control unit CO switches the heater 30 to OFF, and outputs the detection signal Sd. When the vehicle VE stops at a time t83 after the time t82, the control unit CO switches the heater 30 to ON and stops outputting the detection signal Sd.

Generally, in a state where the vehicle VE is stopped, removal of an adhering substance is required to improve safety of the vehicle VE in a case where the vehicle VE is moving rather than detecting an object. In the vehicle sensor device 1, the heater 30 is ON in a state where the vehicle VE is stopped, and the outputting of the detection signal Sd is stopped during the period in which the heater 30 is ON. The state in which the vehicle VE is stopped includes at least a part of a period from when an ignition switch (not illustrated) of the vehicle VE is ON until a driving instruction of the vehicle VE is input from the ECU 100 to the control unit CO. The state where the vehicle VE is stopped also includes a case where a shift lever of the vehicle VE is located at the parking position. When the heater 30 is ON, the adhering substance is removed by the heat of the heater 30. Therefore, when the vehicle starts to move, it is possible to suppress the hindrance of the traveling of the electromagnetic wave due to the adhering substance and to suppress the decrease in the detection accuracy of the vehicle sensor device 1. In the above configuration, since the outputting of the detection signal Sd is stopped, the power consumption due to the outputting of the detection signal Sd can be suppressed as compared with the case where the detection signal Sd is output.

In addition, the control unit CO controls the heater 30 to be OFF in a state where the vehicle VE is moving, and outputs the detection signal Sd in the period in which the heater 30 is OFF.

In general, in a state where the vehicle VE is moving, it is required to detect an object in order to improve safety during traveling of the vehicle VE rather than removing the adhering substance. In the vehicle sensor device 1, the heater 30 is OFF in a state where the vehicle VE is moving, and the detection signal Sd is output in the period in which the heater 30 is OFF. As a result, in a state where the vehicle VE is moving, an object is detected by the detection signal Sd, and the safety at the time of traveling of the vehicle VE can be improved. In addition, in general, when the vehicle VE moves, the adhering substance tends to be removed by wind pressure to decrease. Therefore, it is possible to suppress the hindrance of the traveling of the electromagnetic wave due to the adhering substance and to suppress the decrease in the detection accuracy of the vehicle sensor device 1. In the above configuration, since the heater 30 is OFF, the power consumption by the heater 30 can be suppressed as compared with the case where the heater 30 is ON.

In the present modification, the control unit CO may control the heater 30 to be ON in at least a part of the period in which the vehicle VE is stopped, and stop the outputting of the detection signal Sd in at least a part of the predetermined period in which the heater 30 is ON. Further, the control unit CO may control the heater 30 to be OFF in at least a part of the period in which the vehicle VE is moving and output the detection signal Sd in at least a part of the predetermined period in which the heater 30 is OFF.

A speed may be used as a criterion for determination of ON/OFF of the heater 30. In this case, a signal indicating the speed of the vehicle VE measured by a measurement unit (not illustrated) is input to the control unit CO. When the signal is input, the control unit CO determines whether the speed is greater than a predetermined value. When the speed is greater than the predetermined value, the control unit CO controls the heater 30 to be OFF in at least a part of the period in which the speed of the vehicle VE is greater than the predetermined value, and outputs the detection signal Sd in at least a part of the period in which the heater 30 is OFF. When the speed is equal to or less than the predetermined value, the control unit CO controls the heater 30 to be ON in at least a part of the period in which the speed is equal to or less than the predetermined value, and stops the outputting of the detection signal Sd in at least a part of the period in which the heater 30 is ON.

An outside air temperature or a heater switch (not illustrated) may be used as a criterion for determination of ON/OFF of the heater 30.

When the outside air temperature is less than a predetermined temperature, an adhering substance such as frost may adhere to the transmission region AR. In this case, when the outside air temperature becomes equal to or more than a predetermined temperature, for example, even when an adhering substance such as frost adheres to the transmission region AR, the adhering substance melts by the outside air temperature and is removed from the outer cover 12. In this case, when the signal indicating that the outside air temperature is equal to or more than the predetermined temperature is input from the temperature sensor 50 to the control unit CO, the control unit CO advances the control flow to Step SP12. When the signal indicating that the outside air temperature is less than the predetermined temperature is input from the temperature sensor 50 to the control unit CO, the control unit CO advances the control flow to Step SP13.

Alternatively, when the heater switch is OFF, the control signal is not input from the heater switch to the control unit CO, and the control unit CO advances the control flow to Step SP12. When the heater switch is ON, the control signal indicating that the heater 30 is ON is input from the heater switch to the control unit CO, and the control unit CO advances the control flow to Step SP13. When the heater switch is OFF, a control signal from the heater switch is not input to the power supply circuit 32, and a current from a power supply (not illustrated) does not flow to the electric heating wire 31 in the power supply circuit 32, so that the heater is OFF. When the heater switch is ON, the power supply circuit 32 causes a current from a power supply (not illustrated) to flow through the electric heating wire 31 according to a control signal from the heater switch, and the heater 30 is ON.

As described above, the ON/OFF control of the heater 30 is not particularly limited, and the control unit CO may output the detection signal Sd during the period in which the heater 30 is OFF, and may stop the outputting of the detection signal Sd during the period in which the heater 30 is ON.

Second Embodiment

A second embodiment as a second aspect of the present invention will be described. Note that the same or equivalent components as those of the first embodiment are denoted by the same reference numerals and redundant description is omitted unless otherwise specified. Since the vehicle lamp VL of the present embodiment has the same configuration as the vehicle lamp VL of the first embodiment, the description thereof will be omitted.

Figures 11, 12:
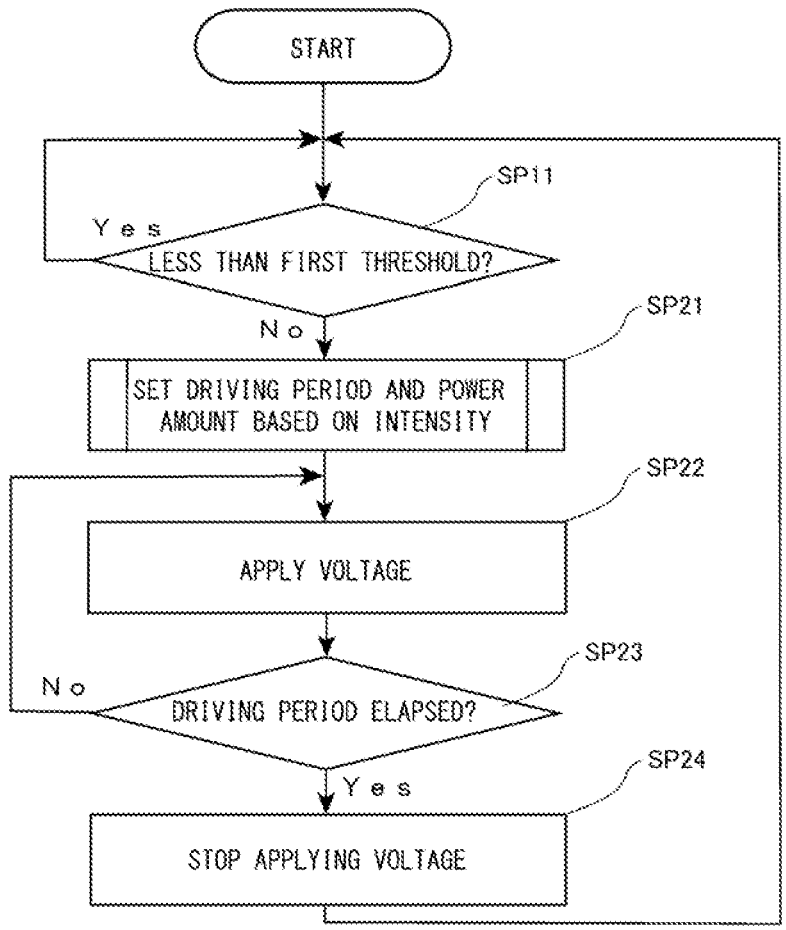
FIG. 11 is a diagram illustrating an example of a control flowchart of a control unit according to a second embodiment as a second aspect of the present invention.
FIG. 12 is a diagram illustrating an example of a table illustrating a relationship between a range of an intensity of a radio wave indicated by a signal from a sensor unit, a driving period, and a voltage.

Next, an operation of a vehicle sensor device 1 of the present embodiment, specifically, setting of a driving period and a voltage, and an operation of applying the voltage during the driving period will be described. FIG. 11 is a diagram illustrating an example of a control flowchart of a control unit CO according to the present embodiment. As illustrated in FIG. 11, a control flow of the present embodiment includes Step SP11 and Steps SP21 to SP24.

In a start state illustrated in FIG. 11, an ignition switch (not illustrated) of the vehicle VE is switched from OFF to ON, and a transmission unit 25 emits a radio wave EW1. A signal Se indicating an intensity of a radio wave EW2 at the time of ON when the ignition switch is switched from OFF to ON is input from a reception unit 26 to the control unit CO. In the start state, the control unit CO turns a heater 30 to OFF and does not apply a voltage to the heater 30. Therefore, a power supply circuit 32 does not apply a voltage from a power supply (not illustrated) to an electric heating wire 31 according to a control signal from the control unit CO. When no voltage is applied, no current flows through the electric heating wire 31, the electric heating wire 31 does not generate heat, and an outer cover 12 is not heated.
(Step SP11)

In this step, the control unit CO repeats Step SP11 when the intensity of the radio wave EW2 indicated by the signal Se input from the reception unit 26 is less than a first threshold. Meanwhile, when the intensity is equal to or more than the first threshold, the control unit CO advances the control flow to Step SP21.

When the control flow repeats Step SP11, the control unit CO controls a sensor unit 20 to be ON while controlling the heater 30 to be OFF. As a result, the heater 30 remains stopped, and the transmission unit 25 emits the radio wave EW1 and the reception unit 26 receives the radio wave EW2 as described in the first embodiment. Further, the transmission unit 25 outputs the signal related to the transmitted radio wave EW1 to the control unit CO, and the reception unit 26 outputs the signal Se related to the received radio wave EW2 to the control unit CO. The control unit CO outputs the detection signal Sd generated based on the signal input from the transmission unit 25 and the signal Se input from the reception unit 26.
(Step SP21)

In this step, the control unit CO sets the driving period of the heater 30 and the power amount of the heater 30 during the driving period based on the intensity of the radio wave EW2 indicated by the signal Se. In the following description, the power consumption of the power supply circuit 32 is ignored. Therefore, in the following description, the resistance value of the heater 30 is substantially the resistance value of the electric heating wire 31 and is a fixed value, the power amount of the heater 30 can be understood as the power amount consumed by the electric heating wire 31, and the voltage applied to the heater 30 can be understood as the voltage applied to the electric heating wire 31. The power amount of the heater 30 is obtained by integrating the driving period with the power consumed by the heater 30. Further, the power of the heater 30 is obtained by a voltage applied to the heater 30 and the resistance value of the heater 30 which is a fixed value. Hereinafter, the driving period of the heater 30 refers to a period during which the voltage is applied to the electric heating wire 31.

The application time and the voltage, which are the driving period, are set in advance based on the intensity of the radio wave EW2, which is the electromagnetic wave indicated by the signal Se, and are stored in the table of the storage unit 52. FIG. 12 is a diagram illustrating an example of the table illustrating the relationship among the range of the intensity, the driving period, and the voltage. A first range and a second range are stored in the table. The first range indicates that the intensity is equal to or more than a first threshold and less than a second threshold greater than the first threshold. The second range indicates that the intensity is equal to or more than the second threshold. As described in the first embodiment, the intensity of the electromagnetic wave received by the sensor unit 20 tends to increase in the order of dust, water droplets, and ice and snow. In this case, the first threshold is a value less than the intensity of the electromagnetic wave received by the sensor unit 20 when a predetermined amount of dust or water droplets adheres to the transmission region AR. The second threshold is set to a value higher than the intensity of the electromagnetic wave received by the sensor unit 20 when a predetermined amount of dust or water droplets adheres to the transmission region AR, and less than the intensity of the electromagnetic wave received by the sensor unit 20 when ice and snow adhere to the transmission region AR. Therefore, when an adhering substance such as dust or water droplets adheres to the transmission region AR, the intensity is included in the first range equal to or more than the first threshold and less than the second threshold. In addition, when an adhering substance such as ice and snow adheres to the transmission region AR, the intensity is included in the second range equal to or more than the second threshold. In the table, the driving period and the voltage are stored in each range. A predetermined period T1 which is the driving period and a predetermined value V1 which is a voltage value are set in the first range, and a predetermined period T2 which is the driving period and a predetermined value V2 which is a voltage value are set in the second range. The predetermined periods T1 and T2 are preset values, for example, 15 minutes. The predetermined values V1 and V2 are preset values, and the predetermined value V1 is less than the predetermined value V2. The predetermined period T1 may be longer or shorter than the predetermined period T2, and the predetermined value V1 may be equal to or more than the predetermined value V2.

Figure 14:
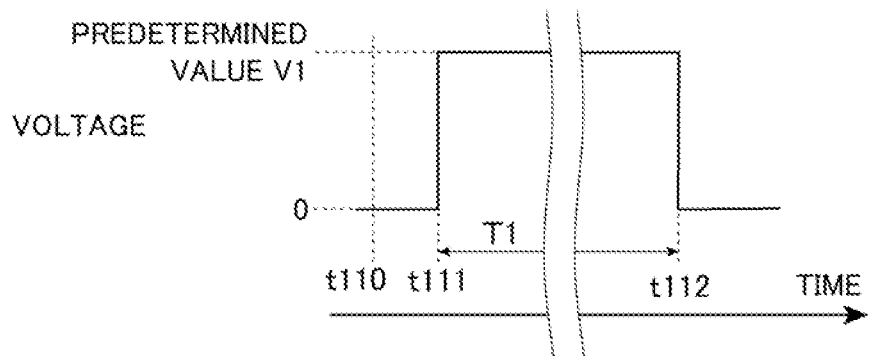
FIG. 14 is a timing chart regarding the driving period and the voltage in the second embodiment.

When the intensity of the radio wave EW2 is within the first range, in the present embodiment, the control unit CO sharply increases the voltage applied to the heater 30 from 0 V to a predetermined value V1 as illustrated in FIG. 14 to be described later. The steepness indicates that the voltage changes like one step with the lapse of time. When the voltage reaches the predetermined value V1, the control unit CO maintains the voltage at the predetermined value V1 for the predetermined period T1. When the predetermined period T1 elapses after the voltage reaches the predetermined value V1, the control unit CO sharply decreases the voltage from the predetermined value V1 to 0 V. When the intensity is within the second range, the control unit CO controls the voltage similarly to the case where the intensity is within the first range, except that the predetermined value V1 is set to the predetermined value V2 and the predetermined period T1 is set to the predetermined period T2.

Figure 13:
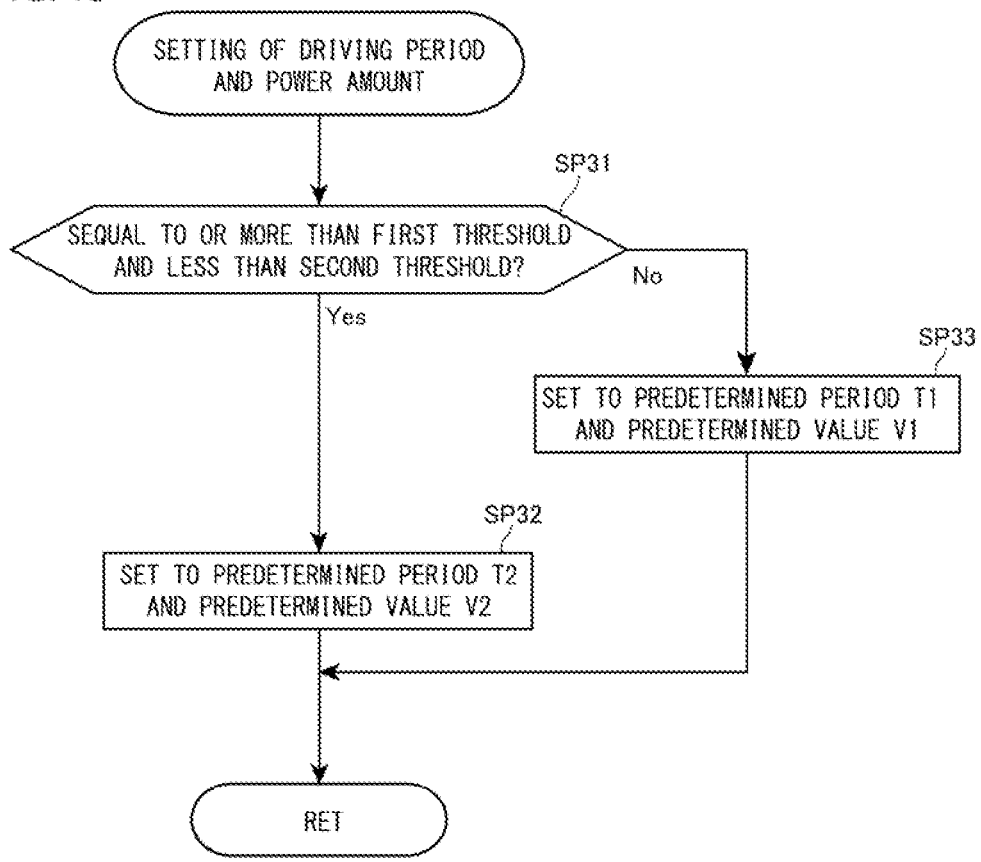
FIG. 13 is a flowchart illustrating setting processing of a driving period of a heater and a power amount of the heater based on the intensity of the radio wave indicated by the signal from the sensor unit.

FIG. 13 is a flowchart illustrating processing of setting the driving period described in Step SP21 and the power amount of the heater 30 during the driving period.

(Step SP31)

This step is a step in which the control unit CO determines, based on the intensity of the radio wave EW2 indicated by the signal Se, whether the intensity is within the first range that is equal to or more than a first threshold and less than a second threshold greater than the first threshold. As described above, the intensity of the radio wave EW2 indicated by the signal Se when dust or water droplets adhere to the transmission region AR is within the first range. When the intensity is within the first range, the control unit CO advances the control flow to Step SP32. Meanwhile, in a case where the intensity is not the first threshold or more and less than the second threshold, the control unit CO advances the control flow to Step SP33.

(Step SP32)

In this step, the control unit CO reads the driving period and the voltage corresponding to the first range from the table, sets the driving period to the predetermined period T1, and sets the voltage to the predetermined value V1. Next, the control unit CO advances the control flow to Step SP22.

(Step SP33)

As described above, when ice and snow adhere to the transmission region AR, the intensity of the radio wave EW2 indicated by the signal Se is included in the second range. In this step, the control unit CO reads the driving period and the voltage corresponding to the second range from the table, sets the driving period to the predetermined period T2, and sets the voltage to the predetermined value V2. Next, the control unit CO advances the control flow to Step SP22.

(Step SP22)

Next, referring back to FIG. 11, the description will be continued. In this step, the control unit CO applies the voltage of the predetermined value V1 set in Step SP32 or the voltage of the predetermined value V2 set in Step SP33 to the heater 30. As a result, the voltage sharply increases from 0 V to the predetermined value V1 or the predetermined value V2, the heat from the heater 30 is transmitted to the outer cover 12, and the outer cover 12 including the transmission region AR is warmed to a predetermined temperature. The adhering substance adhering to the transmission region AR starts to melt by the heat from the outer cover 12. As the voltage increases sharply, the temperature of the heat from the heater 30 greatly increases in a short time, so that the adhering substance can be warmed and melted quickly.

Also in this step, the transmission unit 25 emits the radio wave EW1 and the reception unit 26 receives the radio wave EW2 in the same manner as described above. Similarly to the above, the transmission unit 25 outputs the signal related to the radio wave EW1 to the control unit CO, the reception unit 26 outputs the signal related to the radio wave EW2 to the control unit CO, and the control unit CO generates the detection signal Sd based on the signal input from the transmission unit 25 and the signal Se input from the reception unit 26. However, in this step, unlike the case where the heater 30 is OFF, the control unit CO stops the outputting of the detection signal Sd. Therefore, in this step, the transmission unit 25 and the reception unit 26 do not stop, and the control unit CO does not output the detection signal Sd. In this step, since the detection signal Sd is not output, the power consumption is suppressed as compared with the case where the detection signal Sd is output.

When applying the voltage of the predetermined value V1 to the heater 30 in the predetermined period T1 or the voltage of the predetermined value V2 to the heater 30 in the predetermined period T2, the control unit CO advances the control flow to step SP23.

(Step SP23)

In this step, the control unit CO determines whether the predetermined periods T1 and T2, which are the driving periods set in Steps SP32 and SP33, have elapsed. When the predetermined periods T1 and T2 have not elapsed, the process returns to Step SP22, and the control unit CO applies a voltage to the heater 30 until the predetermined periods T1 and T2 have elapsed. When the predetermined periods T1 and T2 have elapsed, the control unit CO advances the control flow to Step SP24.

(Step SP24)

In this step, the control unit CO stops applying the voltage to the heater 30. As a result, the voltage sharply decreases from the predetermined value V1 or the predetermined value V2, and the heater 30 is OFF. Generally, adhering substances tend to be removed and reduced with increasing warming time. Therefore, after the predetermined periods T1 and T2 have elapsed, the amount of adhering substances tends to be smaller than that during the predetermined periods T1 and T2 have elapsed. Therefore, the temperature of the heat from the heater 30 may decrease. In addition, in the vehicle sensor device 1, the voltage increases to the predetermined value V1 or the predetermined value V2, and sharply decreases after the predetermined periods T1 and T2 elapse. As a result, wasteful consumption of the power amount of the heater 30 can be suppressed as compared with a case where the voltage does not sharply decrease. In addition, even when the voltage decreases, residual heat can remain in the outer cover 12, and thus a small amount of adhering substances remaining in the outer cover 12 can be removed by the residual heat. When the application of the voltage is stopped, the control unit CO returns the control flow to Step SP11. In this control flow, the control unit CO receives the signal Se from the reception unit 26 as described above. Therefore, when the control flow returns from Step SP24 to Step SP11, in Step SP11, the control unit CO determines whether the intensity is less than the first threshold based on the intensity of the radio wave EW2 indicated by the signal Se.

FIG. 14 is a timing chart regarding the driving period and the voltage in the present embodiment. In FIG. 14, the description will be made using the first range, but the same operation and effect as those of the first range can be obtained also in the second range.

At a time t110 illustrated in FIG. 14, the intensity of the radio wave EW2 is less than the first threshold, and the control unit CO does not apply a voltage to the heater 30 and turns off the heater 30. At a time t111 after the time t110, when the intensity becomes equal to or more than the first threshold, the control unit CO advances the control flow from Step SP11 to Step SP21. As described in Step SP21, Step SP31, and Step SP32, when the intensity is equal to or more than the first threshold and less than the second threshold, the control unit CO sets the predetermined period T1 and the predetermined value V1. Next, as described in Step SP22, the control unit CO applies the voltage of the predetermined value V1 to the heater 30 from the time t111. In the present embodiment, the voltage sharply increases from 0 V to the predetermined value V1 at the time t111, and remains at the predetermined value V1 during the predetermined period T1 after increasing to the predetermined value V1. At a time t112 when the predetermined period T1 has elapsed from the time t111, the control unit CO advances the control flow from Step SP22 to Step SP24 via Step SP23. In this case, in the present embodiment, the voltage sharply decreases from the predetermined value V1 to 0 V at the time t112 when the predetermined period T1 has elapsed from the time t111. Even when the intensity is within the second range, a voltage profile is substantially the same as that in FIG. 14.

By the way, in the vehicle sensor device of Patent Literature 1, the electromagnetic wave is emitted as described above not only in the case of detecting an object but also even when an adhering substance adheres to the cover. In this case, it is necessary to always control ON and OFF of the lamp unit as the heater on the basis of the intensity of the electromagnetic wave, and the load on the control unit increases.

Therefore, the vehicle sensor device 1 of the present embodiment includes the outer cover 12 and the sensor unit 20 that is disposed inside the vehicle VE with respect to the outer cover 12, transmits and receives the electromagnetic wave through the outer cover 12, and outputs a signal indicating the intensity of the electromagnetic wave incident on the inside of the outer cover 12. In addition, the vehicle sensor device 1 includes the heater 30 that is provided in the outer cover 12 and heats the transmission region AR through which the electromagnetic wave emitted from the sensor unit 20 in the outer cover 12 passes, and the control unit CO. The control unit CO sets the driving period of the heater 30 and the power amount of the heater 30 during the driving period based on the intensity, and applies a voltage of the set power amount to the heater 30 during the set driving period.

In the vehicle sensor device 1, when the electromagnetic wave emitted from the sensor unit 20 toward the outside of the vehicle VE is reflected by the traveling direction of the electromagnetic wave and the object outside the vehicle VE and passes through the transmission region AR, the electromagnetic wave can be received by the sensor unit 20, and the object can be detected from the signal related to the electromagnetic wave. In the vehicle sensor device 1, the control unit CO sets the driving period of the heater 30 and the power amount of the heater 30 during the driving period based on the intensity of the electromagnetic wave. The power amount of the heater 30 is obtained by integrating the power of the heater 30 with the driving period of the heater 30. Further, the electric power is obtained by the voltage applied to the heater 30 and the resistance of the heater 30 which is a fixed value. The control unit CO applies the voltage at the set power amount to the heater 30 during the set driving period. Generally, in the period in which the heater is ON, the adhering substance tends to adhere to the transmission region AR. In addition, in the period in which the heater is ON, the adhering substance is warmed by heat from the heater, and thus tends to melt and decrease with the lapse of time. As the amount of the adhering substance decreases, the intensity of the electromagnetic wave received by the sensor unit tends to decrease because the reflection of the electromagnetic wave reflected by the adhering substance decreases. In the vehicle sensor device 1, since the driving period of the heater 30 and the power amount of the heater 30 are set on the basis of the intensity as described above, the load on the control unit CO can be reduced as compared with a case where the power amount of the heater 30 is always controlled on the basis of the intensity every time the intensity changes.

In general, the intensity of the electromagnetic wave received by the sensor unit 20 tends to increase in the order of when dust or water droplets adhere to the transmission region AR and when ice and snow adhere to the transmission region AR. As described above, the intensity increases as the amount of adhering substances increases, and the power amount required for removing the adhering substance increases. In the vehicle sensor device 1, since the power amount is set on the basis of the intensity, it is possible to prevents the power amount from being too little set or too much set with respect to the adhesion amount of adhering substance, and it is possible to appropriately remove the adhering substance by the power amount corresponding to the intensity.

During the ON period of the heater 30, the adhering substance tends to adhere to the transmission region AR as described above, and the traveling of the electromagnetic wave is hindered by the adhering substance, so that the detection accuracy of the vehicle sensor device 1 decreases. Therefore, information obtained by detection is difficult to use, and power used to output the detection signal Sd including the information may be wasted. However, in the vehicle sensor device 1, the control unit CO stops the outputting of the detection signal Sd in the entire period of the period in which the heater 30 is ON. That is, the outputting of the detection signal Sd is stopped in the entire period while the adhering substance is removed by the heat of the heater 30. Therefore, wasteful power consumption can be suppressed. The control unit CO may stop the outputting of the detection signal Sd in at least a part of the predetermined period in which the heater 30 is ON. In addition, in the vehicle sensor device 1 of the present embodiment, the control unit CO outputs the detection signal Sd in the period in which the heater 30 is OFF. There is a tendency that an adhering substance does not adhere during the period in which the heater 30 is OFF. In this case, since the obstruction of the travel of the electromagnetic wave by the adhering substance is suppressed, the decrease in the detection accuracy of the vehicle sensor device 1 can be suppressed. Note that the control unit CO may output the detection signal Sd in at least a part of the predetermined period in which the heater 30 is OFF.

When an ignition switch (not illustrated) of the vehicle VE is switched from OFF to ON, the control unit CO may output a signal indicating the intensity of the radio wave EW2 indicated by the signal Se from the reception unit 26 to the storage unit 52, and the storage unit 52 may store the intensity from the signal Se. While the ignition switch is ON, the storage unit 52 stores the intensity. The storage unit 52 also stores the intensity at the time of ON when the ignition switch is switched from ON to OFF. When the storage unit 52 also stores the intensity at the time of ON when the ignition switch is switched from ON to OFF, the stored intensity may be erased other than this case. When the ignition switch is switched from ON to OFF and then switched from OFF to ON again, the control unit CO reads the intensity at the time of ON from the storage unit 52 when the ignition switch is switched from ON to OFF from the storage unit 52. When the ignition switch is switched from OFF to ON again, the signal Se from the reception unit 26 is input to the control unit CO as described above, and the control unit CO acquires the intensity of the radio wave EW2 indicated by the signal Se. When the intensity at the time of ON when the ignition switch is switched from OFF to ON is higher than the intensity at the time of ON when the ignition switch is switched from ON to OFF, the amount of adhering substances tends to be larger when the engine of the vehicle VE is driven than when the engine is stopped. When the intensity at the time of ON when the ignition switch is switched from OFF to ON is equal to or more than the first threshold, in the vehicle sensor device 1, the driving period of the heater 30 and the power amount of the heater 30 are set based on the intensity, and the heater 30 is driven with the set driving period and power amount. In this case, the adhering substance can be removed more quickly when the ignition switch is from OFF to ON than when the heater 30 is not driven.

In Step SP24, the control unit CO does not need to stop the application of the voltage to the heater 30, and Step SP24 may be omitted. When the driving period has elapsed, the control unit CO may return the control flow to Step SP11.

When the intensity of the radio wave EW2 is within the first range, the voltage does not need to remain at the predetermined value V1 after increasing to the predetermined value V1, and may increase or decrease from the predetermined value V1. In addition, the voltage does not need to be lowered to 0 V, and may be less than the predetermined value V1 or may be equal to or more than the predetermined value V1. Even when the intensity is within the second range, the voltage may change from the predetermined value V2 as described above.

The control unit CO may calculate the driving period and the power amount based on the intensity, and set the driving period and the power amount to the calculated driving period and power amount.

In addition, in Step SP22, in a case where the signal output from the temperature sensor 50 that measures the temperature outside the vehicle VE indicates a temperature less than the predetermined temperature, the control unit CO may increase the voltage applied to the heater 30.

In a case where the temperature outside the vehicle VE is less than a predetermined temperature such as the temperature of the adhering substance or the temperature at which water or the like freezes, the adhering substance is less likely to melt and freeze than in a case where the temperature outside the vehicle VE is equal to or more than the predetermined temperature. In the vehicle sensor device 1, with the above configuration, the adhering substance can be melted and removed more quickly than when the voltage does not increase.

Next, a modification of the present embodiment will be described. In each modification, the description will be given using the first range, but the same operation and effect as those of the first range can be obtained also in the second range.

Figure 15:
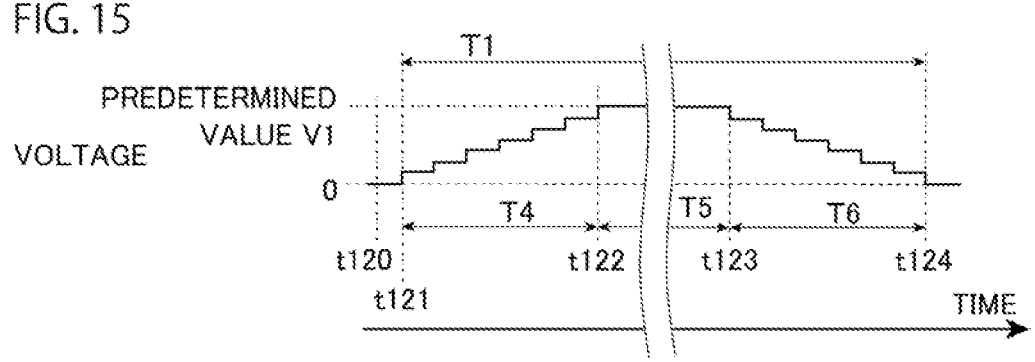
FIG. 15 is a timing chart regarding a driving period and a voltage in a first modification of the second embodiment.

A first modification will be described with reference to FIG. 15. FIG. 15 is a timing chart regarding a driving period and a voltage in the present modification.

In the present modification, the voltage increases stepwise to the predetermined value V1. In this case, the voltage changes like a plurality of steps over time. At a time t120 in this example, the intensity of the radio wave EW2 is less than the first threshold, and the control unit CO does not apply a voltage to the heater 30 and turns off the heater 30. At a time t121 after the time t120, the intensity is equal to or more than the first threshold and less than the second threshold, and the control unit CO sets the period T4 and the predetermined value V1 in the predetermined period T1, and increases the voltage stepwise to the predetermined value V1 during a period from the time t121 to the time t122 when the period T4 has elapsed. The period T4 is, for example, three minutes. Note that the example of the predetermined period T1 in the present modification is different from the example of the predetermined period T1 in the above embodiment.

Furthermore, in the present modification, when the voltage increases to the predetermined value V1, the voltage remains at the predetermined value V1 during a period T5 of the predetermined period T1 from the time t122. The control unit CO sets a period T5 in the predetermined period T1, and continues to apply the voltage of the predetermined value V1 to the heater 30 in the period T5. The period T5 is, for example, 15 minutes longer than the period T4. Note that the period T5 may be the same as the period T4 or may be shorter than the period T4.

In the present modification, the voltage stepwise decreases from the predetermined value V1 to 0 V. At a time t123 when the period T5 has elapsed from the time t122, the control unit CO sets a period T6 in the predetermined period T1, and stepwise decreases the voltage from the predetermined value V1 to 0 V during a period from the time t123 to a time t124 when the period T6 has elapsed. The period T6 is, for example, similar to the period T5. However, the period T6 may be the same as, shorter than, or longer than each of the periods T4 and T5.

In the vehicle sensor device 1 of the present modification, the control unit CO may control the heater 30 at a timing when the voltage increases stepwise. Therefore, the load on the control unit CO can be reduced as compared with the case where the voltage does not increase stepwise.

In addition, in the vehicle sensor device 1 of the present modification, the control unit CO may control the heater 30 at the timing at which the voltage decreases stepwise. Therefore, the load on the control unit CO can be reduced as compared with a case where the voltage does not decrease stepwise. In addition, as compared with a case where the voltage does not decrease stepwise but sharply decreases, the time for warming the outer cover 12 at a high temperature can be longer, and the adhering substance can be easily dissolved.

Figure 16:
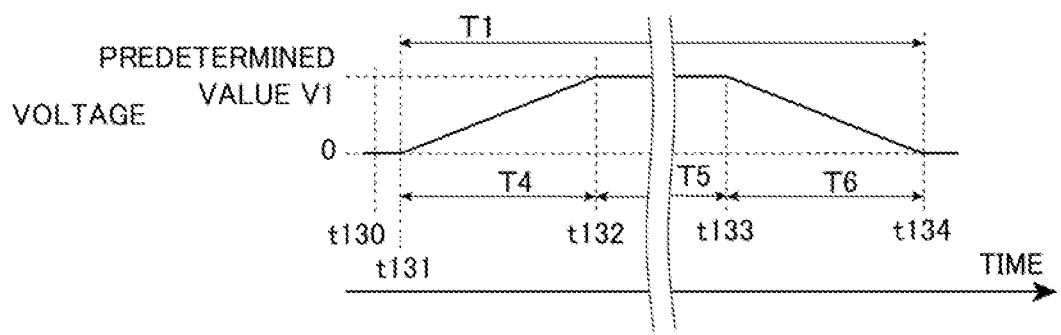
FIG. 16 is a timing chart regarding a driving period and a voltage in a second modification of the second embodiment.

Next, a second modification will be described with reference to FIG. 16. FIG. 16 is a timing chart regarding a driving period and a voltage in the present modification.

In the present modification, the voltage gradually increases to a predetermined value V1. In this case, the voltage preferably increases at a constant change rate. Note that this change rate may increase or decrease with the lapse of time. At a time t130 in this example, the intensity of the radio wave EW2 is less than the first threshold, and the control unit CO does not apply a voltage to the heater 30 and turns off the heater 30. At a time t131 after time the t130, the intensity is equal to or more than the first threshold and less than the second threshold, and the control unit CO sets the period T4 and the predetermined value V1 in the predetermined period T1, and gradually increases the voltage to the predetermined value V1 during a period from the time t131 to the time t132 when the period T4 has elapsed. The period T4 may be different from the period T4 in the first modification, for example. Also in the present modification, the example of the predetermined period T1 is different from the example of the predetermined period T1 in the above embodiment as in the first modification.

In the present modification, similarly to the first modification, when the voltage increases to the predetermined value V1, the voltage remains at the predetermined value V1 during a period T5 of the predetermined period T1 from the time t132.

In the present modification, the voltage gradually decreases from the predetermined value V1 to 0 V. At a time t133 when the period T5 has elapsed from time t132, the control unit CO sets a period T6 in the predetermined period T1, and gradually decreases the voltage from the predetermined value V1 to 0 V during a period from the time t133 to a time t134 when the period T6 has elapsed. The period T6 may be different from the period T6 in the first modification, for example.

In the vehicle sensor device 1 of the present modification, the temperature of heat from the heater 30 gradually increases. As a result, a steep temperature change of the outer cover 12 can be suppressed, and application of a thermal shock to the outer cover 12 due to the steep temperature change can be suppressed.

In addition, in the vehicle sensor device 1 of the present modification, as compared with the case where the voltage does not gradually decrease, a rapid temperature change of the outer cover 12 can be suppressed, and application of a thermal shock to the outer cover 12 due to the rapid temperature change can be suppressed.

In the setting of the voltage, for example, as in a combination of the present embodiment and the first modification or the second modification, the voltage may sharply increase and then stepwise decrease. Alternatively, as in a combination of the first modification and the present embodiment or the second modification, the voltage may increase stepwise and then decrease sharply or gradually. Alternatively, as in a combination of the second modification and the present embodiment or the first modification, the voltage may gradually increase and then decrease sharply or stepwise. Alternatively, as in a combination of the present embodiment and the first modification or the second modification, the voltage may increase sharply and then stepwise or gradually. In the above description, the ascending order is not particularly limited. Alternatively, as in a combination of the present embodiment and the first modified example or the second modified example, the voltage may decrease sharply and then decrease stepwise or gradually. In the above description, the descending order is not particularly limited. In the above combination, the voltage may repeatedly increase in any one of the present embodiment, the first modification, and the second modification, and decrease in any one of the present embodiment, the first modification, and the second modification. In the above combination, a period during which the voltage remains constant at the predetermined values V1 and V2 may be provided. The above combination is an example, and the setting of the voltage may be appropriately combined with each of the above embodiments and modifications.

Third Embodiment

A third embodiment as a third aspect of the present invention will be described. Note that the same or equivalent components as those of the first embodiment are denoted by the same reference numerals and redundant description is omitted unless otherwise specified. Since a configuration of a vehicle lamp VL of the present embodiment is the same as the configuration of the vehicle lamp VL of the first embodiment, the description thereof will be omitted.

Figure 17:
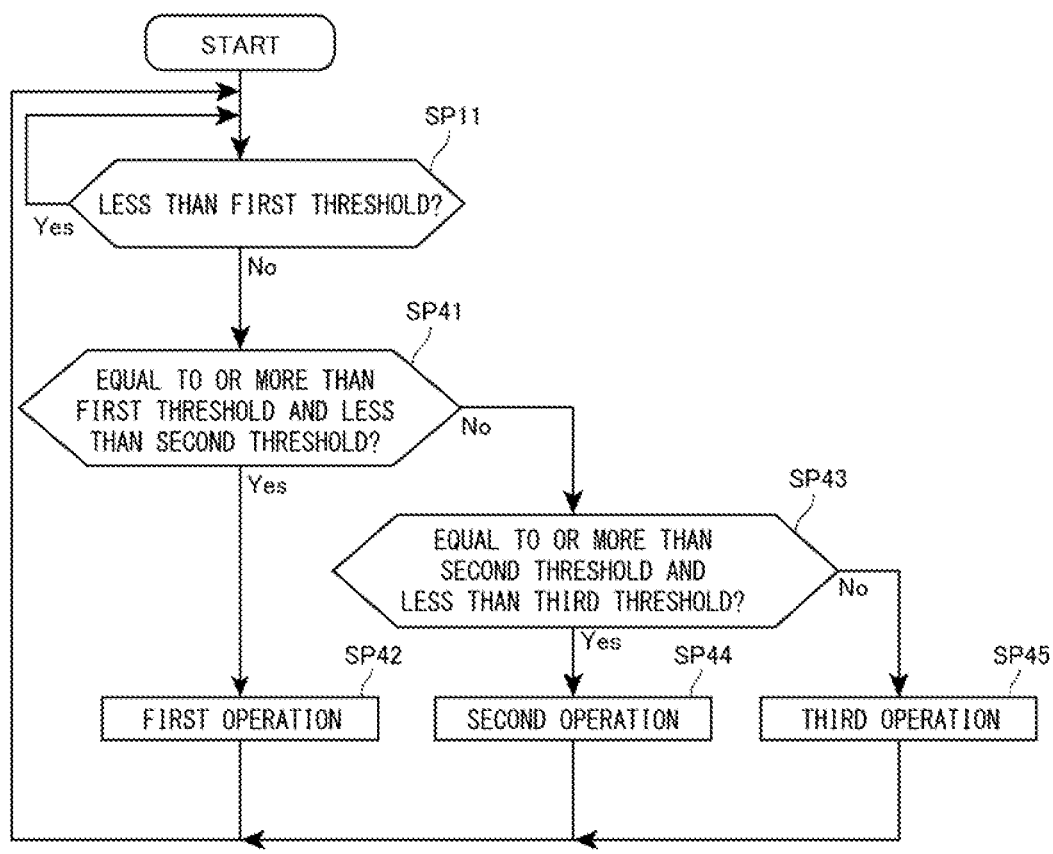
FIG. 17 is a diagram illustrating an example of a control flowchart of a control unit according to a third embodiment as a third aspect of the present invention.

Next, an operation of a vehicle sensor device 1 of the present embodiment, specifically, an operation of removing an adhering substance adhering to an outer surface 12o of an outer cover 12 will be described. Examples of the adhering substances of the present embodiment include mud in addition to ice and snow, dust, and water droplets described in the above embodiments. Generally, an intensity of a radio wave EW2 received by a sensor unit 20 tends to decrease in the order of a case where mud adheres to a transmission region AR, a case where ice and snow adhere to the transmission region AR, and a case where dust or water droplets adhere to the transmission region AR. FIG. 17 is a diagram illustrating an example of a control flowchart of the control unit CO according to the present embodiment. As illustrated in FIG. 17, the control flow of the present embodiment includes Step SP11 and Steps SP41 to SP45.

In a start state illustrated in FIG. 17, the sensor unit 20 emits the radio wave EW1 and outputs a signal Se indicating the intensity of the received radio wave EW2.
(Step SP11)

When the intensity of the radio wave EW2 indicated by the signal Se input from a reception unit 26 is less than a first threshold, the control unit CO repeats Step SP11. Meanwhile, when the intensity is equal to or more than the first threshold, the control unit CO advances the control flow to Step SP41.
(Step SP41)

This step is a step in which the control unit CO determines whether the intensity is within a first range that is equal to or more than the first threshold and less than a second threshold greater than the first threshold on the basis of the intensity of the radio wave EW2 indicated by the signal Se in a similar manner to Step SP31. When dust or water droplets adhere to the transmission region AR, the intensity of the radio wave EW2 indicated by the signal Se can be included in the first range. Then, in a case where the intensity is within the first range, the control unit CO advances the control flow to Step SP42. Meanwhile, in a case where the intensity is equal to or more than the first threshold and not less than the second threshold, the control unit CO advances the control flow to Step SP43.
(Step SP42)

This step is a step in which the control unit CO controls the heater 30 and the cleaner 40 so that the operation including the combination of the operation of the heater 30 and the operation of the cleaner 40 with the lapse of time in a predetermined period becomes a first operation. The predetermined period may be constant or may change according to the intensity of the radio wave EW2 indicated by the signal Se from the sensor unit 20. In the first operation, at least the cleaner 40 is driven in at least a part of the predetermined period. The first operation of the present embodiment is an operation in which the heater 30 is not driven and the cleaner 40 injects gas from the gas unit 45 toward the transmission region AR for, for example, 3 seconds. Therefore, the control unit CO controls a valve 45b so that the valve 45b opens only for 3 seconds. When the valve 45b is opened, gas is injected from an injection nozzle 45c toward the transmission region AR. The predetermined period in the first operation is 3 seconds, and the cleaner 40 is driven in the entire predetermined period. The first operation may be an operation in which the heater 30 is not driven and the cleaner 40 intermittently injects gas. Then, the control unit CO returns the control flow to Step SP11.
(Step SP43)

This step is a step in which the control unit CO determines, based on the intensity of the radio wave EW2 indicated by the signal Se from the sensor unit 20, whether the intensity is within a second range that is equal to or more than a second threshold and is less than a third threshold greater than the second threshold. In the present embodiment, the third threshold is set to a value higher than the intensity of the radio wave EW2 received by the sensor unit 20 when a predetermined amount of ice and snow adheres to the transmission region AR, and less than the intensity of the radio wave EW2 received by the sensor unit 20 when a predetermined amount of mud adheres to the transmission region AR. Therefore, when ice and snow adhere to the transmission region AR, the intensity indicated by the signal Se from the sensor unit 20 can be included in the second range. Further, when the mud adheres to the transmission region AR, the intensity indicated by the signal Se from the sensor unit 20 can be included in the third range that is equal to or more than the third threshold. Then, in a case where the intensity is within the second range, the control unit CO advances the control flow to Step SP44. Meanwhile, in a case where the intensity is not equal to or more than the second threshold and less than the third threshold, that is, within the third range, the control unit CO advances the control flow to Step SP45.

(Step SP44)

This step is a step in which the control unit CO controls the heater 30 and the cleaner 40 so that the operation including the combination of the operation of the heater 30 and the operation of the cleaner 40 with the lapse of time in the predetermined period becomes a second operation. The predetermined period in the second operation may be constant, may change according to the intensity of the radio wave EW2 indicated by the signal Se from the sensor unit 20, may be the same as or different from the predetermined period in the first operation. In the second operation, the heater 30 is driven in at least a part of the predetermined period, and the second operation is different from the first operation in Step SP42. The second operation of the present embodiment is an operation in which the cleaner 40 is not driven and the heater 30 is driven for, for example, 15 minutes. Therefore, the control unit CO controls the power supply circuit 32 such that the current flows through the electric heating wire 31 for 15 minutes. When a current flows through the electric heating wire 31, the electric heating wire 31 generates heat to the heat outer cover 12. The predetermined period in the second operation is 15 minutes, and the heater 30 is driven in the entire predetermined period. The second operation may be an operation in which the cleaner 40 is not driven and the heater 30 is intermittently driven. Then, the control unit CO returns the control flow to Step SP11.

(Step SP45)

This step is a step in which the control unit CO controls the heater 30 and the cleaner 40 so that the operation including the combination of the operation of the heater 30 and the operation of the cleaner 40 with the lapse of time in the predetermined period becomes a third operation. The predetermined period in the third operation may be constant, may change according to the intensity of the radio wave EW2 indicated by the signal Se from the sensor unit 20, may be the same as or different from the predetermined period in the first operation or the second operation. In the third operation, at least the cleaner 40 is driven in at least a part of the predetermined period, and the third operation is different from the second operation in Step SP44. That is, the first operation and the third operation are different from the second operation. The third operation of the present embodiment is an operation in which the heater 30 is not driven and liquid is injected from the liquid unit 41 of the cleaner 40 toward the transmission region AR for, for example, 3 seconds. Therefore, the control unit CO controls the pump 41b so that the pump 41b moves only for 3 seconds. As the pump 41b moves, the liquid is injected from the injection nozzle 41c toward the transmission region AR. The predetermined period in the third operation is 3 seconds, and the cleaner 40 is driven in the entire predetermined period. The third operation may be an operation in which the heater 30 is not driven and the cleaner 40 intermittently emits liquid. Then, the control unit CO returns the control flow to Step SP11.

Incidentally, for example, mud and the like may adhere to the cover of the vehicle sensor device in addition to ice and snow and frost, and this mud and the like are not removed even when the cover is heated. For this reason, there is a demand for suppressing a decrease in accuracy of object detection by appropriately removing an adhering substance adhering to the cover.

Therefore, the vehicle sensor device 1 of the present embodiment includes the outer cover 12, the sensor unit 20, the heater 30, the cleaner 40, and the control unit CO. The sensor unit 20 is disposed inside the vehicle VE with respect to the outer cover 12, and transmits and receives a radio wave through the outer cover 12. The sensor unit 20 outputs a signal indicating the intensity of the radio wave EW2 incident on the inner side of the outer cover 12. The heater 30 is provided in the outer cover 12 and heats the transmission region AR of the outer cover 12 through which the radio wave EW1 emitted from the sensor unit 20 passes. The cleaner 40 injects at least one of liquid and gas from the outer cover 12 toward the transmission region AR from the outside of the vehicle VE.

When the intensity of the radio wave EW2 indicated by the signal Se from the sensor unit 20 is within the second range, the control unit CO controls the heater 30 and the cleaner 40 such that at least the heater 30 is driven in at least a part of the predetermined period. Further, when the intensity of the radio wave EW2 indicated by the signal Se from the sensor unit 20 is within the first range or the third range different from the second range, the control unit CO controls the heater 30 and the cleaner 40 so that at least the cleaner 40 is driven in at least a part of the predetermined period. Therefore, when the second range is a predetermined range and the range including the first range and the third range is a specific range, it can be understood that the control unit CO controls the heater 30 and the cleaner 40 such that at least the heater 30 is driven in at least a part of the predetermined period when the intensity indicated by the signal Se from the sensor unit 20 is the predetermined range, and such that at least the cleaner 40 is driven in at least a part of the predetermined period when the intensity indicated by the signal Se from the sensor unit 20 is the specific range different from the predetermined range. In addition, the second operation including the combination of the operation of the heater 30 and the operation of the cleaner 40 with the lapse of time in the predetermined period in a case where the intensity indicated by the signal Se from the sensor unit 20 is within the second range is different from the first operation including the combination of the operation of the heater 30 and the operation of the cleaner 40 with the lapse of time in the predetermined period in a case where the intensity indicated by the signal Se from the sensor unit 20 is within the first range. The second operation is different from the third operation including a combination of the operation of the heater 30 and the operation of the cleaner 40 with the lapse of time in the predetermined period in a case where the intensity indicated by the signal Se from the sensor unit 20 is within the third range. That is, it can be understood that the combination of the operation of the heater 30 and the operation of the cleaner 40 with the lapse of time in the predetermined period in the case where the intensity indicated by the signal Se from the sensor unit 20 is within the specific range is different from the combination of the operation of the heater 30 and the operation of the cleaner 40 with the lapse of time in the predetermined period in the case where the intensity indicated by the signal Se from the sensor unit 20 is within the predetermined range.

Therefore, according to the vehicle sensor device 1 of the present embodiment, the combination of the operation of the heater 30 and the operation of the cleaner 40 with the lapse of time in the predetermined period can be changed according to the difference in the adhering substance of the outer cover 12. The vehicle sensor device of the present embodiment can remove dust and water droplets adhering to the outer cover 12 by the gas from the cleaner 40. In addition, the vehicle sensor device 1 of the present embodiment can melt and remove ice and snow adhering to the outer cover 12 by heating the outer cover 12 by the heater 30. Further, the vehicle sensor device 1 of the present embodiment can remove mud adhering to the outer cover 12 by the liquid from the cleaner 40. Therefore, the vehicle sensor device 1 of the present embodiment can appropriately remove the adhering substance and suppress a decrease in accuracy of object detection as compared with a case where the operation including the combination of the operation of the heater 30 and the operation of the cleaner 40 does not change according to the intensity of the radio wave EW2 indicated by the signal Se from the sensor unit 20.

Figure 18:
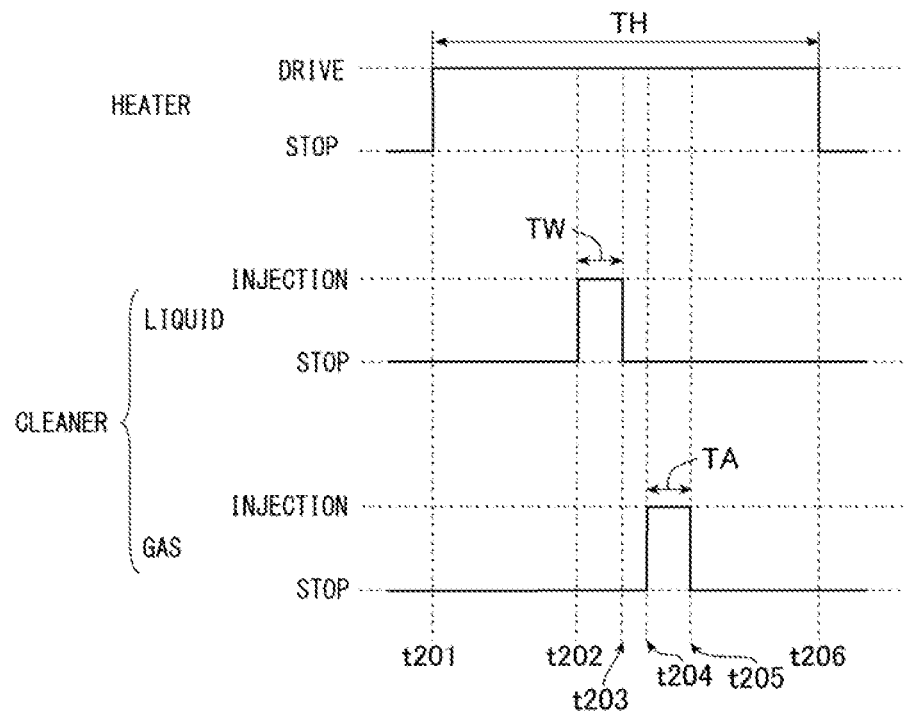
FIG. 18 is a timing chart schematically illustrating a modification of a second operation of the third embodiment.

From the viewpoint of appropriately removing the adhering substance, at least the heater 30 may be driven in at least a part of the predetermined period when the intensity of the radio wave EW2 indicated by the signal Se from the sensor unit 20 is within the predetermined range, at least the cleaner 40 may be driven in at least a part of the predetermined period when the intensity is within the specific range different from the predetermined range, and the combination of the operation of the heater 30 and the operation of the cleaner 40 when the intensity is within the specific range and the combination of the operation of the heater 30 and the operation of the cleaner 40 when the intensity is within the predetermined range may be different from each other. For example, the second operation may be the operation illustrated in FIG. 18, and the control unit CO may control the heater 30 and the cleaner 40 so that the operations of the heater 30 and the cleaner 40 become the operation illustrated in FIG. 18. FIG. 18 is a timing chart schematically illustrating a modification of the second operation.

As illustrated in FIG. 18, the heater 30 starts driving at a time t201 and starts heating the outer cover 12. The cleaner 40 starts the injection of the liquid at a time t202 later than the time t201, and ends the injection of the liquid at a time t203, for example, 3 seconds after the time t202. Therefore, the cleaner 40 injects the liquid toward the transmission region AR for 3 seconds from the time t202. The cleaner 40 starts the injection of the gas at a time t204 later than the time t203, and ends the injection of the gas at a time t205, for example, 3 seconds after the time t204. Therefore, the cleaner 40 injects the gas toward the transmission region AR for 3 seconds from the time t204. A timing of start of driving of the cleaner 40 is the time t202, which is a timing of start of injection of the liquid, and a timing of end of driving of the cleaner 40 is a time t205, which is a timing of end of injection of the gas. The heater 30 stops driving at a time t206 later than the time t205. Thus, the heater 30 heats the outer cover 12 in a period from the time t201 to a time t206.

In the second operation, the predetermined period is a period from the time t201 to the time t206, and the time t202, which is the timing of the start of the injection of the liquid of the cleaner 40, is later than the time t201, which is the timing of the start of the driving of the heater 30. That is, when the intensity of the radio wave EW2 indicated by the signal Se from the sensor unit 20 is within the second range, the control unit CO controls the heater 30 and the cleaner 40 in such a manner. Therefore, with such a configuration, the liquid can be injected toward the ice and snow after the water is interposed at least partially between the ice and snow adhering to the outer cover 12 and the outer cover 12 by the heating of the outer cover 12. The adhesion of ice and snow to the outer cover 12 when water is interposed at least partially between the ice and snow and the outer cover 12 tends to be smaller than that when water is not interposed between the ice and snow and the outer cover 12. Therefore, with such a configuration, ice and snow can be easily removed as compared with a case where the outer cover 12 is not heated before the liquid is injected toward the outer cover 12.

From the viewpoint of easily removing ice and snow from the outer cover 12, the time t202, which is the timing of the start of the driving of the cleaner 40, may be later than the time t201, which is the timing of the start of the driving of the heater 30. For example, the heater 30 may end the driving in a period TW in which the cleaner 40 injects liquid, a period TA in which the cleaner 40 injects gas before the time t202, or the like. The cleaner 40 may inject only liquid or gas. When the cleaner 40 injects only gas, the timing of the start of the driving of the cleaner 40 is the time t204, which is later than the time t201. In this case, after water is interposed in at least a part between ice and snow adhering to the outer cover 12 and the outer cover 12, gas can be injected toward the ice and snow. Therefore, ice and snow can be easily removed even in such a case. The heater 30 may be intermittently driven, and the cleaner 40 may intermittently inject liquid or gas. However, the timing of the start of the driving of the cleaner 40 may be before the timing of the start of the driving of the heater.

In the second operation, there is a period during which the heater 30 is driven after the time t205, which is the timing of end of the driving of the cleaner 40. That is, the control unit CO controls the heater 30 and the cleaner 40 in such a manner.

Therefore, the outer cover 12 is heated even after the injection of liquid or gas to the outer cover 12 ends. Therefore, with such a configuration, it is possible to prevent the liquid adhering to the outer cover 12 from freezing after the injection of the liquid or gas to the outer cover 12 ends, or to vaporize and remove the liquid. Accordingly, a decrease in the accuracy of the object detection can be suppressed as compared with a case where the outer cover 12 is not heated after the timing of the end of the driving of the cleaner 40.

From the viewpoint of preventing the liquid adhering to the outer cover 12 from freezing or removing the liquid after the driving of the cleaner 40 ends, it is sufficient that there is a period during which the heater 30 is driven after the time t205, which is the timing of the end of the driving of the cleaner 40. For example, the cleaner 40 may inject only liquid or only gas. However, there may be no period during which heater 30 is driven after the timing of the end of the driving of cleaner 40.

In the second operation, there is a period in which the heater 30 is driven after the time t203, which is the timing of the end of the injection of the liquid by the cleaner 40. That is, the control unit CO controls the heater 30 and the cleaner 40 in such a manner. Therefore, the outer cover 12 is heated even after the injection of the liquid to the outer cover 12 ends. Therefore, with such a configuration, it is possible to suppress freezing of liquid adhering to the outer cover 12 after the injection of liquid to the outer cover 12 ends, for example, liquid from the cleaner 40, or to vaporize and remove the liquid.

From the viewpoint of suppressing freezing of the liquid from the cleaner 40 or vaporizing and removing the liquid, there may be a period in which the heater 30 is driven after the time t203 which is the timing of the end of the injection of the liquid by the cleaner 40. For example, the heater 30 may start to be driven during the period TW or after the time t203, the heater 30 may be driven intermittently, and the cleaner 40 may inject liquid intermittently. However, the injection of the liquid by the cleaner 40 may end before the driving of the heater 30 ends.

In the second operation, the time t204 which is the timing of the start of the injection of the liquid by the cleaner 40 starts is later than the time t203 which is the timing of the end of the injection of the liquid by the cleaner 40. That is, the control unit CO controls the heater 30 and the cleaner 40 in such a manner. Therefore, the gas is injected toward the outer cover 12 after the injection of the liquid of the cleaner 40 ends. Therefore, with such a configuration, the liquid adhering to the outer cover 12 after the injection of the liquid to the outer cover 12 ends can be removed by the gas from the cleaner 40.

From the viewpoint of removing the liquid adhering to the outer cover 12, the time t204, which is the timing of the start of the injection of the gas by the cleaner 40, may be later than the time t203, which is the timing of the end of the injection of the liquid by the cleaner 40. For example, the cleaner 40 may intermittently inject the liquid or gas. However, the injection of the gas by the cleaner 40 may start before the end of the injection of the liquid by the cleaner 40.

Figure 19:
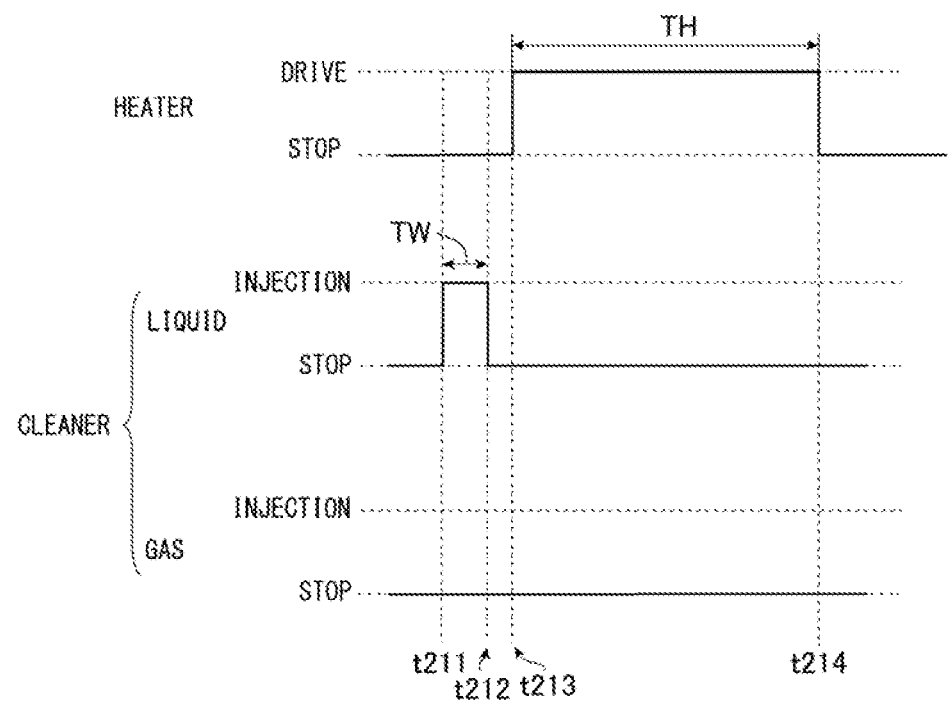
FIG. 19 is a timing chart schematically illustrating a first modification of a third operation of the third embodiment.

The third operation may be the operation illustrated in FIG. 19, and the control unit CO may control the heater 30 and the cleaner 40 so that the operations of the heater 30 and the cleaner 40 become the operations illustrated in FIG. 19. FIG. 19 is a timing chart schematically illustrating a first modification of the third operation.

As illustrated in FIG. 19, the cleaner 40 starts the injection of the liquid at a time t211, and ends the injection of the liquid at a time t212, for example, 3 seconds after the time t211. The cleaner 40 does not inject the gas. The heater 30 starts driving at a time t213 later than the time t212 and starts heating the outer cover 12, and stops the driving at a time t214, for example, 15 minutes after the time t213.

In the third operation, the predetermined period is a period from the time t211 to the time t214, and there is a period in which the heater 30 is driven after the time t212, which is the timing of the end of the injection of the liquid by the cleaner 40. Therefore, the outer cover 12 is heated after the injection of the liquid to the outer cover 12 ends. Therefore, with such a configuration, it is possible to suppress freezing of liquid adhering to the outer cover 12 after the injection of liquid to the outer cover 12 ends, for example, liquid from the cleaner 40, or to vaporize and remove the liquid.

In the third operation, the time t211 which is the timing of the start of the injection of the liquid by the cleaner 40 is earlier than the time t213 which is the timing of the start of the driving of the heater 30. Therefore, the outer cover 12 is not heated before the liquid is injected toward the outer cover 12. Here, when the outer cover 12 is heated and the moisture of dirt such as mud adhering to the outer cover 12 decreases, the adhesion force of dirt such as mud to the outer cover tends to increase. Therefore, with such a configuration, dirt such as mud can be easily removed as compared with a case where liquid is injected toward the outer cover 12 after the outer cover 12 is heated.

From the viewpoint of easily removing dirt such as mud, it is sufficient that the time t211, which is the timing of the start of the injection of the liquid by the cleaner 40, is earlier than the time t213, which is the timing of the start of the driving of the heater 30. For example, the heater 30 may start the driving during the period TW in which the cleaner 40 injects liquid.

Figure 20:
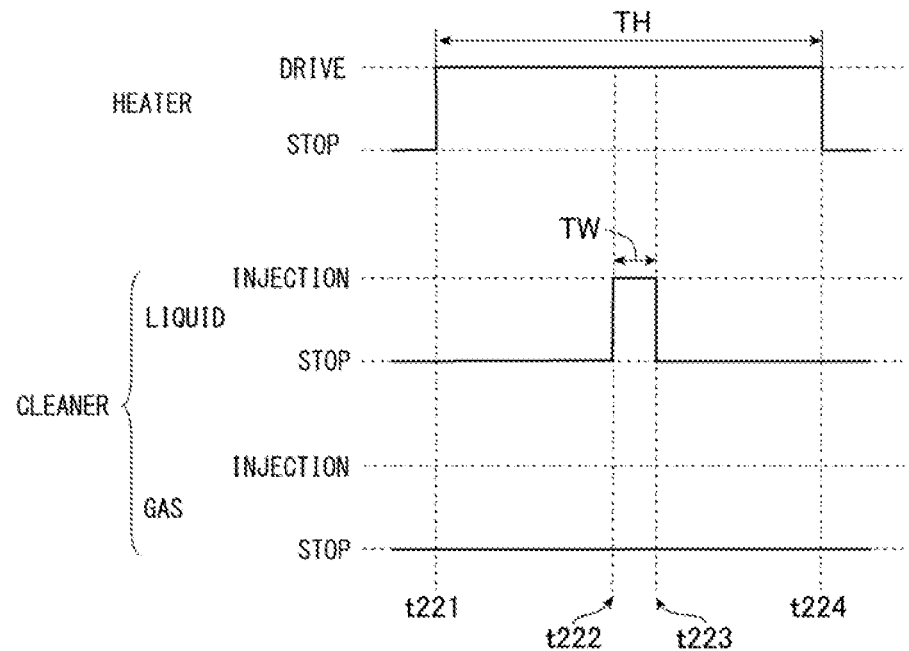
FIG. 20 is a timing chart schematically illustrating a second modification of the third operation of the third embodiment.

The third operation may be the operation illustrated in FIG. 20, and the control unit CO may control the heater 30 and the cleaner 40 so that the operations of the heater 30 and the cleaner 40 become the operations illustrated in FIG. 20. FIG. 20 is a timing chart schematically illustrating a second modification of the third operation.

As illustrated in FIG. 20, the third operation of the present modification is different from the third operation illustrated in FIG. 19 in that the timing of the start of the injection of the liquid by the cleaner 40 is later than the timing of the start of the driving of the heater 30. The heater 30 starts driving at a time t221, starts heating the outer cover 12, and stops driving at a time t224. The cleaner 40 starts the injection of the liquid at a time t222 later than the time t221 and earlier than the time t224, and ends the injection of the liquid at a time t223 earlier than time t224. The cleaner 40 does not inject the gas.

In the third operation, the predetermined period is a period from the time t221 to the time t224, and the time t222, which is the timing of the start of the injection of the liquid by the cleaner 40, is later than the time t221, which is the timing of the start of the driving of the heater 30. Therefore, the outer cover 12 is heated before the liquid is injected to the outer cover 12. Here, when the temperature outside the vehicle VE is a temperature at which water or the like freezes, moisture in the mud adhering to the outer cover 12 tends to freeze. With such a configuration, the liquid can be injected after the moisture in the mud adhering to the outer cover 12 is melted by the heating of the outer cover 12. This is useful when moisture in the mud adhering to the outer cover 12 is frozen.

From the viewpoint of appropriately removing the mud when the moisture in the mud is frozen, the timing of start of the driving of the cleaner 40 may be later than the timing of start of the driving of the heater 30. For example, the driving of the heater 30 may end before the timing of the start of the injection of the liquid by the cleaner 40, and the cleaner 40 may inject the gas instead of the liquid.

Figure 21:
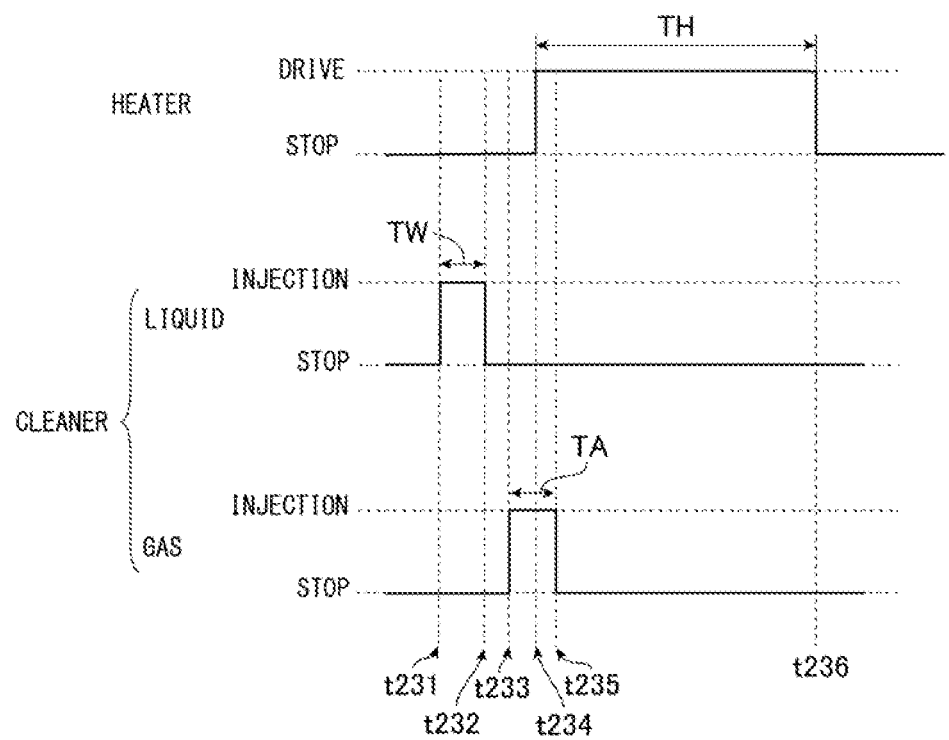
FIG. 21 is a timing chart schematically illustrating a third modification of the third operation of the third embodiment.

The third operation may be the operation illustrated in FIG. 21, and the control unit CO may control the heater 30 and the cleaner 40 so that the operations of the heater 30 and the cleaner 40 become the operations illustrated in FIG. 21. FIG. 21 is a timing chart schematically illustrating a third modification of the third operation.

As illustrated in FIG. 21, the cleaner 40 starts the injection of the liquid at a time t231, and ends the injection of the liquid at a time t232, for example, 3 seconds after the time t231. Further, the cleaner 40 starts the injection of the gas at a time t233 later than the time t232, and ends the injection of the gas at a time t235, for example, 3 seconds after the time t233. The heater 30 starts driving at a time t234 later than the time t233 and earlier than the time t235, starts heating the outer cover 12, and stops driving at a time t236, for example, 15 minutes after the time t234.

In the third operation, the predetermined period is a period from time the t231 to the time t236, and the time t233, which is the timing of the start of the injection of the gas by the cleaner 40, is later than the time t232, which is the timing of the end of the injection of the liquid by the cleaner 40. Therefore, the gas is injected toward the outer cover 12 after the injection of the liquid of the cleaner 40 ends. Therefore, with such a configuration, the liquid adhering to the outer cover 12 after the injection of the liquid to the outer cover 12 ends can be removed by the gas from the cleaner 40.

Further, in the third operation, similarly to the third operation illustrated in FIG. 19, there is a period in which the heater 30 is driven after the time t232 which is the timing of the end of the injection of the liquid by the cleaner 40. Therefore, the outer cover 12 is heated after the injection of the liquid to the outer cover 12 ends. Therefore, with such a configuration, it is possible to suppress freezing of liquid adhering to the outer cover 12 after the injection of liquid to the outer cover 12 ends, for example, liquid from the cleaner 40, or to vaporize and remove the liquid.

Although not illustrated, the third operation may be an operation in which the heater 30 is not driven and the cleaner 40 injects the liquid and gas. In this case, from the viewpoint of removing the liquid adhering to the outer cover 12, similarly to the third operation illustrated in FIG. 21, the timing of the start of the injection of the gas by the cleaner 40 is preferably later than the timing of the end of the injection of the liquid by the cleaner 40, but the timing of the start of the injection of the gas may be earlier than the timing of the start of the injection of the liquid. The third operation may be an operation in which the heater 30 is driven and the cleaner 40 injects only the gas, or may be an operation in which the cleaner 40 injects only the gas without driving the heater 30. The third operation may be an operation similar to the second operation illustrated in FIG. 18. When the control unit CO controls the heater 30 and the cleaner 40 to perform the second operation illustrated in FIG. 18 in Step SP44, for example, at least one of a period TH in which the heater 30 is driven, a period TW in which the cleaner 40 injects the liquid, and a period TA in which the cleaner 40 injects the gas is made different between the third operation and the second operation.

Figure 22:
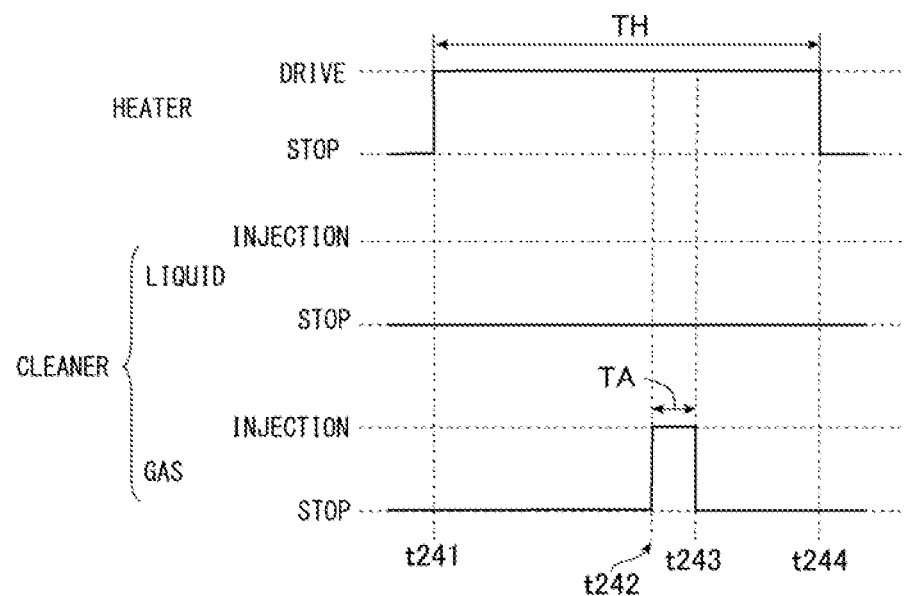
FIG. 22 is a timing chart schematically illustrating a first modification of the first operation of the third embodiment.

The first operation may be the operation illustrated in FIG. 22, and the control unit CO may control the heater 30 and the cleaner 40 so that the operations of the heater 30 and the cleaner 40 become the operation illustrated in FIG. 22. FIG. 22 is a timing chart schematically illustrating a first modification of the first operation.

As illustrated in FIG. 22, the heater 30 starts the driving at a time t241, starts heating the outer cover 12, and stops driving at a time t244. The cleaner 40 starts the injection of the gas at a time t242 later than the time t241 and earlier than the time t244, and ends the injection of the gas at a time t243 earlier than the time t244. The cleaner 40 does not inject liquid.

In the first operation, the predetermined period is a period from the time t241 to the time t244, and the time t242, which is the timing of the start of the injection of the gas by the cleaner 40, is later than time the t241, which is the timing of the start of the driving of the heater 30. Therefore, the outer cover 12 is heated before the gas is injected toward the outer cover 12. Here, when the temperature outside the vehicle VE is a temperature at which water or the like freezes, ice tends to adhere to dust. With such a configuration, the gas can be injected after the ice adhering to the dust adhering to the outer cover 12 is melted by the heating of the outer cover 12. This is useful when ice adheres to dust adhering to the outer cover 12.

From the viewpoint of appropriately removing dust when ice adheres to the dust, the timing of the start of the driving of the cleaner 40 may be later than the timing of the start of the driving of the heater 30. For example, the driving of the heater 30 may end before the timing of the start of the injection of the gas by the cleaner 40, and the cleaner 40 may inject the liquid instead of the gas.

Figure 23:
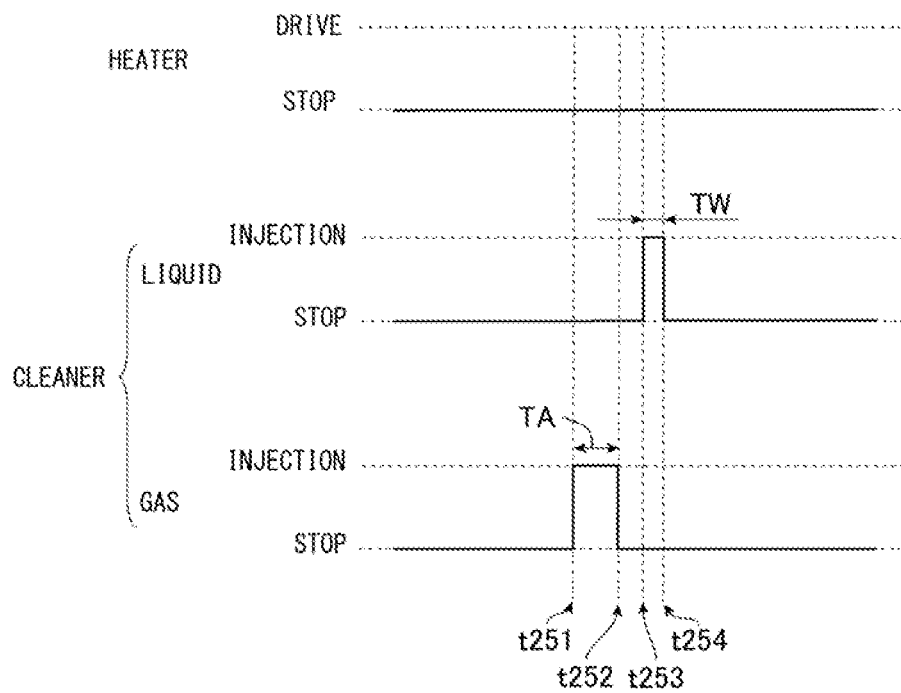
FIG. 23 is a timing chart schematically illustrating a second modification of the first operation of the third embodiment.

The first operation may be the operation illustrated in FIG. 23, and the control unit CO may control the heater 30 and the cleaner 40 so that the operations of the heater 30 and the cleaner 40 become the operations illustrated in FIG. 23. FIG. 23 is a timing chart schematically illustrating a second modification of the first operation.

As illustrated in FIG. 23, the heater 30 is not driven. The cleaner 40 starts the injection of the gas at a time t251, and ends the injection of the gas at a time t252, which is, for example, 3 seconds after time t251. The cleaner 40 starts the injection of the liquid at a time t253 later than the time t252, and ends the injection of the gas at a time t254, for example, 1 second after time t253.

In the first operation, the predetermined period is a period from the time t251 to the time t254, and the time t253, which is the timing of the start of the injection of the liquid by the cleaner 40, is later than the time t252, which is the timing of the end of the injection of the gas. Therefore, the dust adhering to the outer cover 12 without being removed by the injection of the gas can be removed by the injection of the liquid, and the dust can be more reliably removed. From the viewpoint of more reliably removing dust, the timing of the start of the injection of the liquid may be later than the timing of the end of the injection of the gas. In this example, the period TW during which the liquid is injected is shorter than the period TA during which the gas is injected, but may be equal to or longer than the period TA. The cleaner 40 may intermittently inject the liquid or gas.

The first operation may be the same as the third operation. For example, the first operation may be an operation in which the heater 30 is driven and the cleaner 40 injects only the liquid, or may be an operation in which the heater 30 is not driven and the cleaner 40 injects only the liquid.

Fourth Embodiment

Next, a fourth embodiment as a third aspect of the present invention will be described in detail. Note that, unless otherwise specified, the same or equivalent components as those in the above embodiments are denoted by the same reference numerals, and redundant description will be omitted.

A configuration of a vehicle lamp VL of the present embodiment is the same as the configuration of the vehicle lamp VL of the third embodiment. However, an operation of removing an adhering substance by a vehicle sensor device 1 in the vehicle lamp VL of the present embodiment is different from the operation of the vehicle sensor device 1 of the third embodiment.

Figure 24:
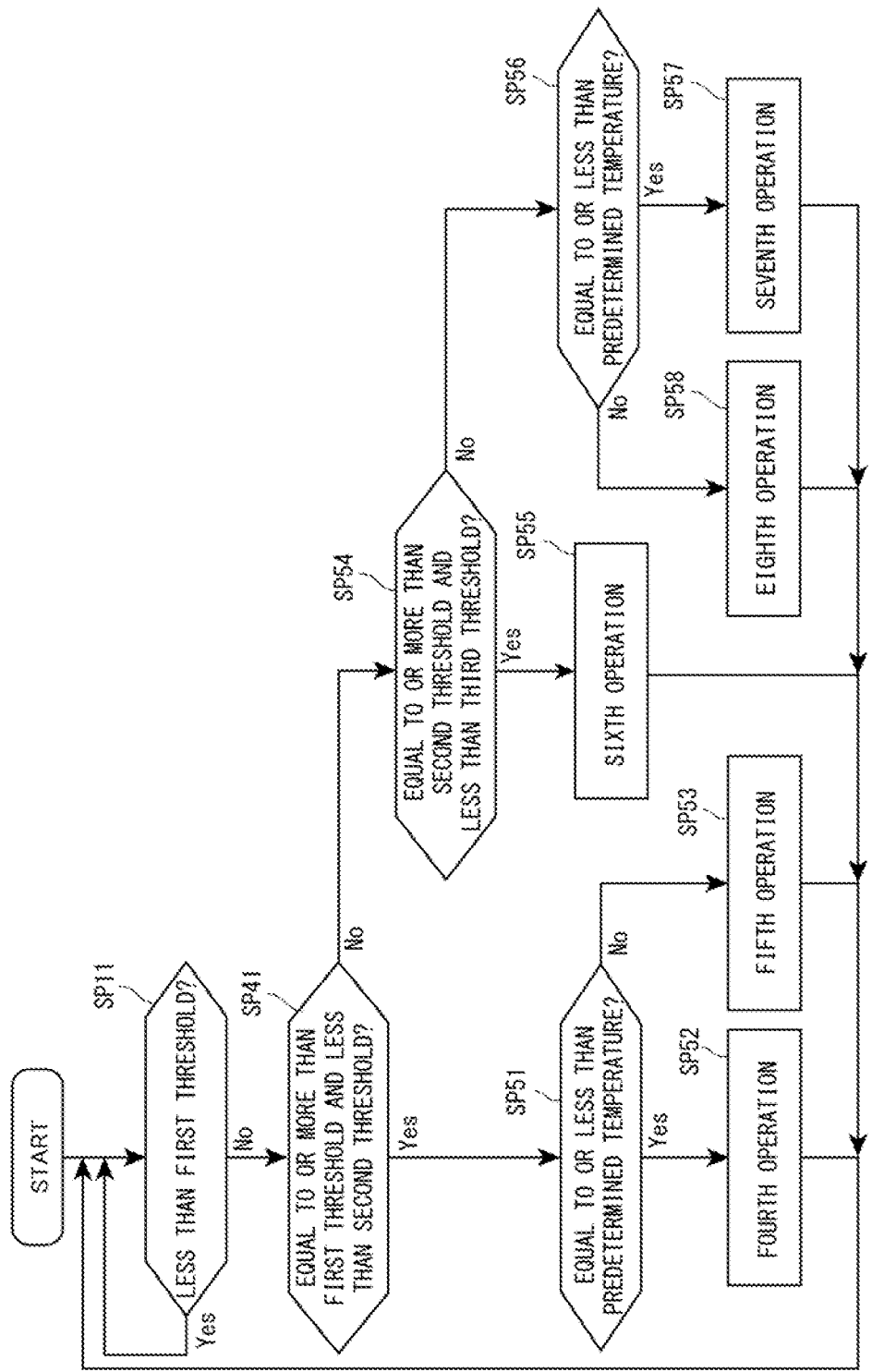
FIG. 24 is a diagram illustrating an example of a control flowchart of a control unit according to a fourth embodiment as a third aspect of the present invention.

FIG. 24 is a diagram illustrating an example of a control flowchart of a control unit CO according to the present embodiment. As illustrated in FIG. 24, the control flowchart in the present embodiment is different from the control flowchart in the third embodiment in that the control flowchart in the present embodiment includes Steps SP51 to SP58 instead of Steps SP42 to SP45 in the control flowchart in the third embodiment.

In the present embodiment, in Step SP41, when an intensity of a radio wave EW2 indicated by a signal Se from a sensor unit 20 is within a first range equal to or more than a first threshold and less than a second threshold, the control unit CO advances the control flow to Step SP51. Meanwhile, when the intensity is equal to or more than a second threshold, the control unit CO advances the control flow to Step SP54.

(Step SP51)

This step is a step in which the control unit CO determines whether a temperature indicated by a signal from a temperature sensor 50 is equal to or less than a predetermined temperature. The predetermined temperature is, for example, a temperature at which water or the like starts to freeze or a temperature close to the temperature, and is 0° C. in the present embodiment. Then, in a case where the temperature indicated by the signal is equal to or less than the predetermined temperature, the control unit CO advances the control flow to Step SP52. Meanwhile, when the temperature indicated by the signal exceeds the predetermined temperature, the control unit CO advances the control flow to Step SP53.

(Step SP52)

This step is a step in which the control unit CO controls a heater 30 and a cleaner 40 so that an operation including a combination of an operation of the heater 30 and an operation of the cleaner 40 with the lapse of time in a predetermined period becomes a fourth operation. In the fourth operation, at least the cleaner 40 is driven in at least a part of the predetermined period. The fourth operation of the present embodiment is the same operation as the first operation illustrated in FIG. 22, and the control unit CO controls the heater 30 and the cleaner 40 so as to achieve such an operation. Then, the control unit CO returns the control flow to Step SP11.

In this step, the temperature outside the vehicle VE is a temperature at which water or the like freezes, and in the fourth operation, the timing of the start of the injection of the gas by the cleaner 40 is later than the timing of the start of the driving of the heater 30. Therefore, the vehicle sensor device 1 of the present embodiment can inject the gas after the ice adhering to the dust adhering to the outer cover 12 is melted by the heating of the outer cover 12, and can more easily remove the dust. Further, since the cleaner 40 does not inject liquid, the liquid does not adhere to the outer cover 12 or freeze.

(Step SP53)

In this step, the control unit CO controls the heater 30 and the cleaner 40 such that the operation including the combination of the operation of the heater 30 and the operation of the cleaner 40 with the lapse of time in the predetermined period becomes the fifth operation. In the fifth operation, at least the cleaner 40 is driven in at least a part of the predetermined period. The fifth operation of the present embodiment is an operation in which the heater 30 is not driven and the cleaner 40 injects gas for, for example, 3 seconds, and the control unit CO controls the heater 30 and the cleaner 40 so as to achieve such a fifth operation. Then, the control unit CO returns the control flow to Step SP11.

In the fifth operation, since the gas is injected from the cleaner 40 toward the transmission region AR, dust and water droplets adhering to the outer cover 12 can be removed by the gas.

(Step SP54)

This step is a step in which the control unit CO determines whether the intensity is within the second range that is equal to or more than the second threshold and less than the third threshold based on the intensity of the radio wave EW2 indicated by the signal Se from the sensor unit 20, similarly to Step SP43. In the present embodiment, when the intensity of the radio wave is within the second range, the control unit CO advances the control flow to Step SP55. Meanwhile, in a case where the intensity is not equal to or more than the second threshold and less than the third threshold, that is, in a third range equal to or more than the third threshold, the control unit CO advances the control flow to Step SP56.

(Step SP55)

This step is a step in which the control unit CO controls the heater 30 and the cleaner 40 so that the operation including the combination of the operation of the heater 30 and the operation of the cleaner 40 with the lapse of time in the predetermined period becomes a sixth operation. In the sixth operation, at least the heater 30 is driven in at least a part of the predetermined period, and the sixth operation is different from the fourth operation in Step SP52 and the fifth operation in Step SP53. The sixth operation of the present embodiment is the same operation as the second operation illustrated in FIG. 18, and the control unit CO controls the heater 30 and the cleaner 40 so as to achieve such an operation. Then, the control unit CO returns the control flow to Step SP11.

In this step, ice and snow adhering to the outer cover 12 can be removed by heating of the outer cover 12 and the liquid from the cleaner 40. Further, the liquid adhering to the outer cover 12 after the injection of the liquid to the outer cover 12 ends can be removed by the gas from the cleaner 40.

(Step SP56)

This step is a step in which the control unit CO determines whether the temperature indicated by the signal from the temperature sensor 50 is equal to or less than the predetermined temperature as in Step SP51. Then, in a case where the temperature indicated by the signal is equal to or less than the predetermined temperature, the control unit CO advances the control flow to Step SP57. Meanwhile, when the temperature indicated by the signal exceeds the predetermined temperature, the control unit CO advances the control flow to Step SP58.

(Step SP57)

This step is a step in which the control unit CO controls the heater 30 and the cleaner 40 so that the operation including the combination of the operation of the heater 30 and the operation of the cleaner 40 with the lapse of time in the predetermined period becomes a seventh operation. In the seventh operation, at least the cleaner 40 is driven in at least a part of the predetermined period, and the seventh operation is different from the sixth operation in Step SP55. The seventh operation of the present embodiment is the same operation as the third operation illustrated in FIG. 20, and the control unit CO controls the heater 30 and the cleaner 40 so as to achieve such an operation. Then, the control unit CO returns the control flow to Step SP11.

In this step, the temperature outside the vehicle VE is a temperature at which water or the like freezes, and in the seventh operation, the timing of the start of the injection of the liquid by the cleaner 40 is later than the timing of the start of the driving of the heater 30. Therefore, the vehicle sensor device 1 of the present embodiment can inject the liquid after the moisture in the mud adhering to the outer cover 12 is melted by the heating of the outer cover 12, and can more easily remove the mud.

In the seventh operation, there is a period in which the heater 30 is driven after the timing of the end of the injection of the liquid by the cleaner 40. Therefore, the outer cover 12 is heated even after the timing of the end of the injection of the liquid by the cleaner 40 at a temperature outside the vehicle VE at which water or the like freezes. Therefore, according to the vehicle sensor device 1 of the present embodiment, it is possible to more appropriately prevent the liquid adhering to the outer cover 12, for example, the liquid from the cleaner 40 from freezing after the injection of the liquid ends.

(Step SP58)

This step is a step in which the control unit CO controls the heater 30 and the cleaner 40 such that the operation including the combination of the operation of the heater 30 and the operation of the cleaner 40 with the lapse of time in the predetermined period becomes an eighth operation. In the eighth operation, at least the cleaner 40 is driven in at least a part of the predetermined period, and the eighth operation is different from the sixth operation in Step SP55. The eighth operation of the present embodiment is an operation in which the heater 30 is not driven and the cleaner 40 injects liquid for, for example, 3 seconds, and the control unit CO controls the heater 30 and the cleaner 40 so as to achieve the eighth operation. Then, the control unit CO returns the control flow to Step SP11.

In the eighth operation, since the liquid is injected from the cleaner 40 toward the transmission region AR, the mud adhering to the outer cover 12 can be removed by the liquid.

Assuming that the second range is a predetermined range and a range including the first range and the third range is a specific range, it can be understood that the control unit CO of the present embodiment controls the heater 30 and the cleaner 40 so that at least the heater 30 is driven in at least a part of the predetermined period when the intensity of the radio wave EW2 indicated by the signal Se from the sensor unit 20 is within the predetermined range, and at least the cleaner 40 is driven in at least a part of the predetermined period when the intensity is within the specific range different from the predetermined range, as in the third embodiment. The sixth operation including the combination of the operation of heater 30 and the operation of cleaner 40 with the lapse of time in the predetermined period in the case where the intensity is within the second range is different from the fourth operation and the fifth operation including the combination of the operation of heater 30 and the operation of cleaner 40 with the lapse of time in the predetermined period in the case where the intensity is within the first range. The sixth operation is different from the seventh operation and the eighth operation including the operation of the heater 30 and the operation of the cleaner 40 with the lapse of time in the predetermined period in the case where the intensity is within the third range. That is, it can be understood that the combination of the operation of the heater 30 and the operation of the cleaner 40 with the lapse of time in the predetermined period in the case where the intensity is within the specific range is different from the combination of the operation of the heater 30 and the operation of the cleaner 40 with the lapse of time in the predetermined period in the case where the intensity is within the predetermined range. Therefore, the vehicle sensor device 1 of the present embodiment can suppress a decrease in accuracy of object detection, similarly to the third embodiment.

As described above, in Steps SP53 and SP58, only the cleaner 40 is driven without driving the heater 30. Therefore, in the vehicle sensor device 1 of the present embodiment, when the temperature outside the vehicle VE exceeds a temperature at which water or the like freezes and mud, dust, or the like adheres to the outer cover 12, only the cleaner 40 can be driven without driving the heater. Therefore, according to the vehicle sensor device 1 of the present embodiment, it is possible to remove mud, dust, and the like adhering to the outer cover 12 while reducing the opportunity for the heater 30 to be driven.

The sixth operation of the present embodiment may be the same operation as the second operation of the third embodiment or the modification of the second operation. Each of the fourth operation, the fifth operation, the seventh operation, and the eighth operation may be the same operation as any of the first operation, the third operation, the modification of the first operation, and the modification of the third operation of the third embodiment. At least two of the fourth operation, the fifth operation, the seventh operation, and the eighth operation may be the same operation. However, from the viewpoint of appropriately removing mud, dust, and the like, it is preferable that the fourth operation and the seventh operation are operations in which the heater 30 and the cleaner 40 are driven and the timing of the start of the driving of the cleaner 40 is later than the timing of the start of the driving of the heater 30. From the viewpoint of reducing the opportunity of the driving the heater 30, it is preferable that the fifth operation and the eighth operation are operations in which the heater 30 is not driven and only the cleaner 40 is driven. The predetermined period in each of the fourth operation, the fifth operation, the seventh operation, and the eighth operation may be constant, and may change according to the intensity of the radio wave EW2 indicated by the signal Se from the sensor unit 20. The predetermined periods may be the same as or different from each other.

Although the third aspect of the present invention has been described by taking the third and fourth embodiments and the modifications as examples, the present invention is not limited thereto.

In the third and fourth embodiments and the modification, the description has been given assuming that the specific range is the first range in which the intensity of the radio wave EW2 indicated by the signal Se from the sensor unit 20 is equal to or more than the first threshold and less than the second threshold, and the third range in which the intensity of the radio wave EW2 indicated by the signal is equal to or more than the third threshold. Further, the description has been given assuming that the predetermined range is the second range in which the intensity of the radio wave EW2 indicated by the signal Se from the sensor unit 20 is equal to or more than the second threshold and less than the third threshold. However, the predetermined range and the specific range are not limited thereto. For example, the specific range may be the first range, and the predetermined range may be the second range. The specific range may be the third range, and the predetermined range may be the second range. In the latter case, for example, in Step SP11 of the third embodiment, the control unit CO repeats Step SP11 in a case where the intensity of the radio wave EW2 indicated by the signal Se from the sensor unit 20 is less than the second threshold, and advances the control flow to Step SP43 in a case where the intensity is equal to or more than the second threshold. The specific range may be the second range and the third range, the predetermined range may be the first range, the specific range may be the first range and the second range, and the predetermined range may be the third range. In the latter case, for example, in Step SP42 of the third embodiment, the control unit CO controls the heater 30 and the cleaner 40 so as to perform the first operation, in Step SP44, the control unit CO controls the heater 30 and the cleaner 40 so as to perform the third operation, and in Step SP45, the control unit CO controls the heater 30 and the cleaner 40 so as to perform the second operation. There may be a width between the predetermined range and the specific range. The values of the first threshold, the second threshold, and the third threshold are not particularly limited, and can be set as appropriate.

The operation of the heater 30 also includes the amount of heat per unit time to be applied to the transmission region AR, and includes, for example, a current value flowing through the electric heating wire 31. The operation of the cleaner 40 includes an injection speed of the liquid and an injection speed of the gas. Therefore, the control unit CO may change the value of the current flowing through the electric heating wire 31, change the injection speed of the liquid, or change the injection speed of the gas according to the intensity of the radio wave EW2 indicated by the signal Se from the sensor unit 20. For example, in the fourth embodiment, the value of the current flowing through the electric heating wire 31 in the sixth operation may be more than the value of the current flowing through the electric heating wire 31 in the seventh operation. In the fourth embodiment, the injection speed of the liquid in the seventh operation may be faster than the injection speed in the eighth operation.

The control unit CO may control the transmission unit 25 such that the emission of the electromagnetic wave from the transmission unit 25 is stopped in at least a part of the period TW in which the cleaner 40 injects the liquid.

In Step SP55 of the fourth embodiment, the sixth operation may be changed according to the temperature indicated by the signal output from the temperature sensor 50, and for example, the length of the period TH in which the heater 30 is driven may be changed according to the temperature indicated by the signal.

The length of the period TH during which the heater 30 is driven, the length of the period TW during which the cleaner 40 injects liquid, and the length of the period TA during which the cleaner 40 injects gas can be appropriately set. However, the length of the period TH is preferably 1 minute or more, and the length of the period TW and the length of the period TA are preferably 0.5 seconds or more.

In addition, the lengths of these periods TW, TA, and TH may not be determined in advance. For example, the control unit CO may control the cleaner 40 such that the injection of the liquid ends when the intensity of the radio wave EW2 indicated by the signal output from the sensor unit 20 during the injection of the liquid becomes equal to or less than a first predetermined value smaller than the intensity at the start of the injection of the liquid. The first predetermined value may be, for example, a predetermined value, and may be $7/10$ of an initial intensity that is the intensity at the start of injection of liquid, $1/2$ of the initial intensity, $1/10$ of the initial intensity, or the like. With such a configuration, for example, it is possible to suppress the injection of liquid in a state where the adhering substance of the outer cover 12 is removed. The control unit CO may cause the cleaner 40 to terminate the injection of the liquid and output a signal indicating an abnormality to the ECU in a case where the intensity of the radio wave EW2 is greater than the first predetermined value when the predetermined time has elapsed after the start of the injection of the liquid.

The control unit CO may control the cleaner 40 such that the injection of the gas ends when the intensity of the radio wave EW2 indicated by the signal output from the sensor unit 20 during the injection of the gas becomes equal to or less than a second predetermined value smaller than the intensity at the start of the injection of the gas. The second predetermined value may be, for example, a predetermined value, and may be $7/10$ of an initial intensity, which is the intensity at the start of injection of gas, $1/2$ of the initial intensity, $1/10$ of the initial intensity, or the like. With such a configuration, for example, it is possible to suppress the injection of gas in a state where the adhering substance of the outer cover 12 is removed. Further, in a case where the intensity of the radio wave EW2 when a predetermined time has elapsed after the start of the injection of the gas is greater than the second predetermined value, the control unit CO may cause the cleaner 40 to terminate the injection of the gas and output a signal indicating abnormality to the ECU, or may cause the cleaner 40 to terminate the injection of the gas and start the injection of the liquid. The period TW in the case of starting the injection of the liquid may be determined in advance. Alternatively, the control unit CO may cause the cleaner 40 to terminate the injection of the liquid when the intensity of the radio wave EW2 during the injection of the liquid becomes equal to or less than the first predetermined value as described above.

Further, the control unit CO may control the heater 30 so that the driving of the heater 30 ends when the intensity of the radio wave EW2 indicated by the signal output from the sensor unit 20 during the driving of the heater 30 becomes equal to or less than a third predetermined value smaller than the intensity at the start of the driving of the heater 30. The third predetermined value may be, for example, a predetermined value, and may be $7/10$ of an initial intensity, which is the intensity at the start of the driving of the heater 30, $1/2$ of the initial intensity, $1/10$ of the initial intensity, or the like. With such a configuration, for example, the driving of the heater 30 in a state where the adhering substance of the outer cover 12 is removed can be suppressed. The control unit CO may stop the heater 30 and output a signal indicating an abnormality to the ECU in a case where the intensity of the radio wave EW2 is greater than the third predetermined value when the predetermined time has elapsed after the start of the driving of the heater 30.

Further, for example, during the second operation illustrated in FIG. 18 or the third operation illustrated in FIG. 21, the control unit CO controls the cleaner 40 so that the injection of the liquid ends when the intensity of the radio wave EW2 during the injection of the liquid becomes equal to or less than the first predetermined value as described above, whereby the injection of the liquid ends and the injection of the gas is started when the intensity becomes equal to or less than the first predetermined value. That is, the control unit CO controls the cleaner 40 so that the injection of the liquid is switched to the injection of the gas when the intensity of the radio wave EW2 during the injection of the liquid becomes equal to or less than the first predetermined value. The period TA in this case may be determined in advance. Alternatively, the control unit CO may cause the cleaner 40 to terminate the injection of the liquid when the intensity of the radio wave EW2 during the injection of the gas becomes equal to or less than the second predetermined value as described above, and the second predetermined value in this case is smaller than the first predetermined value.

Further, the control unit CO may control the cleaner 40 so that the injection of the gas is switched to the injection of the liquid when the intensity of the radio wave EW2 during the injection of the gas becomes equal to or less than the second predetermined value. The period TW in this case may be determined in advance. Alternatively, the control unit CO may cause the cleaner 40 to terminate the injection of the liquid when the intensity of the radio wave EW2 during the injection of the liquid becomes equal to or less than the first predetermined value as described above, and the first predetermined value in this case is smaller than the second predetermined value. Examples of the operation in which the control unit CO performs such control include the first operation illustrated in FIG. 23.

The control unit CO may stop the cleaner 40 and drive the heater 30 when the intensity of the radio wave EW2 during the injection of the liquid is less than or equal to the first predetermined value or when the intensity of the radio wave EW2 during the injection of the gas is less than or equal to the second predetermined value. The period TH in this case may be determined in advance. Alternatively, the control unit CO may control the heater 30 so that the driving ends when the intensity of the radio wave EW2 being driven becomes equal to or less than the third predetermined value as described above, and the third predetermined value in this case is smaller than the first predetermined value or the second predetermined value. Examples of the operation in which the control unit CO performs such control include the third operation illustrated in FIG. 19. The control unit CO may stop the heater 30 and cause the cleaner 40 to start injecting liquid or gas when the intensity of the radio wave EW2 during driving of the heater 30 becomes equal to or less than the third predetermined value. The period TW and the period TA in this case may be determined in advance. Alternatively, as described above, the control unit CO may cause the cleaner 40 to terminate the injection of the liquid based on the intensity of the radio wave EW2 during the injection of the liquid, or cause the cleaner 40 to terminate the injection of the gas based on the intensity of the radio wave EW2 during the injection of the gas.

Fifth Embodiment

A fifth embodiment as a fourth aspect of the present invention will be described. Note that the same or equivalent components as those of the first embodiment are denoted by the same reference numerals and redundant description is omitted unless otherwise specified. Since a configuration of a vehicle lamp VL of the present embodiment is the same as the configuration of the vehicle lamp VL of the first embodiment, the description thereof will be omitted.

Figure 25:
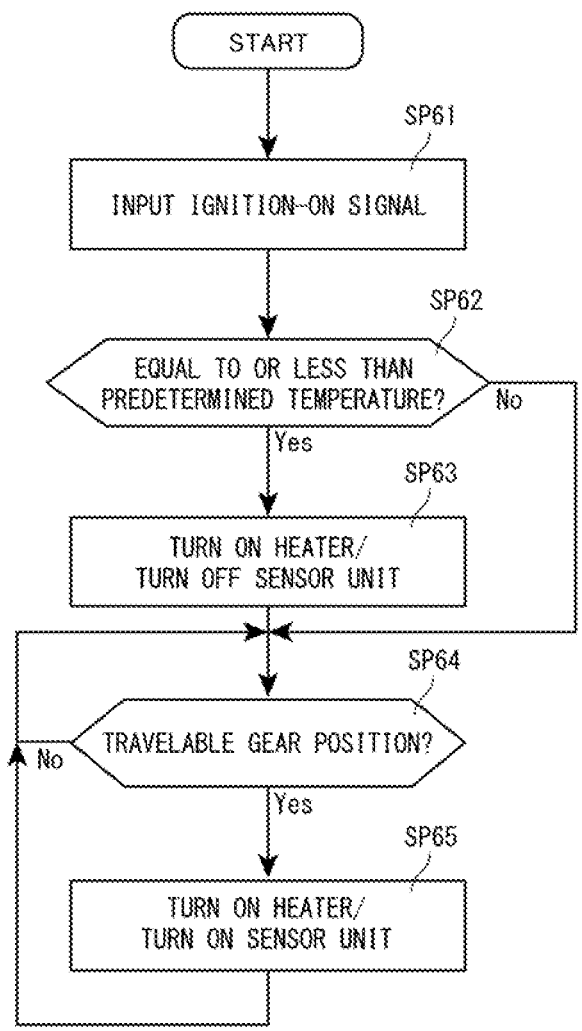
FIG. 25 is a flowchart illustrating an operation of a control unit in a fifth embodiment as a fourth aspect of the present invention.

Next, an operation of a vehicle sensor device 1 of the present embodiment will be described. In the following description, it is assumed that an electromagnetic wave is transmitted and received by a sensor unit 20. FIG. 25 is a flowchart illustrating an operation of a control unit CO.
<Step SP61>

At the start of the example described with reference to FIG. 25, a vehicle VE is parked in a parking lot or the like, and the engine is stopped. When a driver uses the vehicle VE in this state, first, in this step, the driver turns on the ignition of the vehicle VE. When the ignition is turned on, an ignition-on signal is input from an ECU 100 of the vehicle VE to the control unit CO.
<Step SP62>

When the ignition-on signal is input to the control unit CO, a signal related to the outside air temperature of the vehicle VE is input from a temperature sensor 50 to the control unit CO. When a signal related to the outside air temperature is input, the control unit CO determines whether the outside air temperature indicated by the signal is equal to or less than a predetermined temperature or higher than the predetermined temperature in this step. When the outside air temperature indicated by the signal is equal to or less than the predetermined temperature, the control unit CO advances the control flow to Step SP63. The predetermined temperature is, for example, 3° C. Meanwhile, when the outside air temperature indicated by the signal is higher than the predetermined temperature, the control unit CO advances the control flow to Step SP64.
<Step SP63>

In this step, the control unit CO controls a power supply circuit 32 of a heater 30 to apply a predetermined voltage to an electric heating wire 31. The predetermined voltage may be a constant voltage or a voltage that changes with time. Therefore, a current flows through the electric heating wire 31, and the electric heating wire 31 generates heat. Therefore, even when frost or the like adheres to an outer surface 12o of an outer cover 12, the frost or the like can be melted. In addition, in this step, the control unit CO does not operate the sensor unit 20. Therefore, the electromagnetic wave is not input from the sensor unit 20 to the control unit CO, and the control unit CO does not output a detection signal Sd of an object. Alternatively, the control unit CO may operate the sensor unit 20 to emit the electromagnetic wave from the transmission unit 25 and receive the electromagnetic wave from the reception unit 26, and the signal Se related to the electromagnetic wave may be input from the sensor unit 20 to the control unit CO. However, in this step, even when the signal Se related to the electromagnetic wave is input from the sensor unit 20 to the control unit CO, the control unit CO does not output the detection signal Sd of the object. Alternatively, the control unit CO controls the sensor unit 20 to cause the transmission unit 25 and the reception unit 26 to transmit and receive the electromagnetic wave as described above, but does not need to cause the sensor unit 20 to output the signal Se relating to the electromagnetic wave.
<Step SP64>

In this step, the control unit CO determines whether a signal of a gear position input from the ECU 100 is a signal indicating a state in which the vehicle VE can travel. The state in which the vehicle VE can travel is a state in which the vehicle VE can travel when the brake is not applied, and is, for example, a state in which the gear position is drive or reverse. When the signal indicating that the vehicle VE can travel is not input from the ECU 100, the control unit CO repeats this step. Meanwhile, when the signal input from the ECU 100 is a signal indicating a state in which the vehicle VE can travel, the control unit CO advances the control flow to Step SP65.
<Step SP65>

Figure 26:
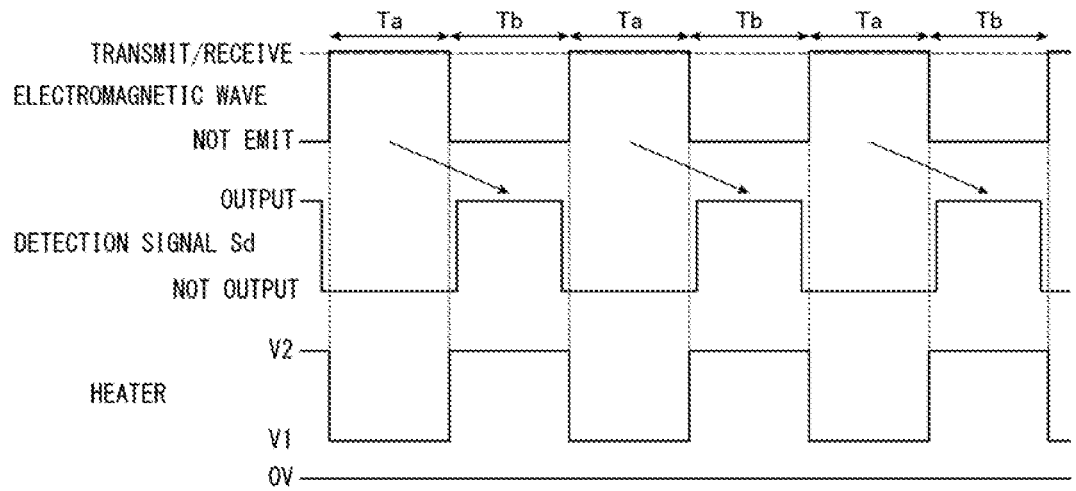
FIG. 26 is a timing chart illustrating a relationship between the electromagnetic wave transmitted and received by the sensor unit, the detection signal output by the control unit, and the operation of the heater in Step SP65 in FIG. 25.

In this step, the gear position is set to, for example, drive or reverse. In the present embodiment, in this state, the brake does not need to operate and the vehicle VE does not move, and the vehicle VE may start moving. In this step, the sensor unit 20 and the heater 30 are operated. FIG. 26 is a timing chart illustrating a relationship between the electromagnetic wave transmitted and received by the sensor unit 20, the detection signal Sd output by the control unit CO, and the operation of the heater 30 in this step. In FIG. 26, as indicated by a solid line, the sensor unit 20 periodically transmits and receives an electromagnetic wave. This cycle is, for example, 5 milliseconds to 200 milliseconds. When receiving the electromagnetic wave, the sensor unit 20 outputs the signal Se related to the electromagnetic wave, and the signal Se is input to the control unit CO. In this example, the signal Se is periodically input from the sensor unit 20 to the control unit CO.

The control unit CO processes the signal Se input from the sensor unit 20, and periodically outputs the detection signal Sd of the object located outside the outer cover 12 at predetermined time intervals. A cycle in which the control unit CO outputs the detection signal Sd is the same as a cycle in which the sensor unit 20 transmits and receives the electromagnetic wave. However, as indicated by an arrow in FIG. 26, the timing at which the control unit CO outputs the detection signal Sd is delayed from the timing at which the sensor unit 20 transmits and receives the electromagnetic wave. In each cycle, the length of the period during which the control unit CO outputs the detection signal Sd is different from the length of the period during which the sensor unit 20 transmits and receives the electromagnetic wave as illustrated in FIG. 26. However, the length of the period during which the control unit CO outputs the detection signal Sd and the length of the period during which the sensor unit 20 transmits and receives the electromagnetic wave may be the same.

As described above, the detection signal Sd output from the control unit CO uses the electromagnetic wave periodically transmitted and received from the sensor unit 20 indicated by a solid line in FIG. 26. Therefore, the transmission/reception period Ta in which the electromagnetic wave used for the detection signal Sd output by the control unit CO is transmitted and received by the sensor unit 20 is a periodic period in which the electromagnetic wave indicated by the solid line in FIG. 26 is transmitted and received.

Note that the sensor unit 20 may or may not transmit and receive the electromagnetic wave in the period Tb sandwiched by the transmission/reception period Ta. For example, as indicated by a broken line in FIG. 26, electromagnetic waves may be continuously transmitted and received in the sensor unit 20. Even in this case, since the detection signal Sd is output from the control unit CO at predetermined time intervals, not all the electromagnetic waves received by the sensor unit 20 are used for the detection signal Sd, and the electromagnetic waves used for the detection signal Sd are periodically transmitted and received by the sensor unit 20. Therefore, in this case, in the sensor unit 20, the electromagnetic wave used for the detection signal Sd and the electromagnetic wave not used for the detection signal Sd are alternately transmitted and received. Therefore, even in this case, the transmission/reception period Ta is a periodic period illustrated in FIG. 26. In the example indicated by the broken line in FIG. 26, even when the signal Se related to the electromagnetic wave is output from the sensor unit 20 to the control unit CO in the period Tb, the control unit CO does not output the detection signal Sd using the signal Se. Alternatively, the sensor unit 20 may not output the signal Se related to the electromagnetic wave received in the period Tb. As described above, in the period Tb, the electromagnetic wave transmitted and received by the sensor unit 20 becomes an electromagnetic wave that is not used for the detection signal Sd.

The control unit CO controls the power supply circuit 32 of the heater 30 to apply a voltage to the electric heating wire 31. In this case, the control unit CO sets the voltage applied to the electric heating wire 31 in at least a part of the transmission/reception period Ta as the first voltage V1, sets the voltage applied to the electric heating wire 31 in at least a part of the period Tb sandwiched between the transmission/reception periods as the second voltage V2, and sets the first voltage V1 to a voltage less than the second voltage V2. In the example illustrated in FIG. 26, the control unit CO sets the voltage applied to the electric heating wire 31 to the first voltage V1 in the entire transmission/reception period Ta, and sets the voltage applied to the electric heating wire 31 to the second voltage V2 in the entire period Tb. Therefore, in the present example, the period in which the voltage applied to the electric heating wire 31 is the first voltage V1 coincides with the transmission/reception period Ta, and the period in which the voltage applied to the electric heating wire 31 is the second voltage V2 coincides with the period Tb.

In this way, a current flows through electric heating wire 31, and electric heating wire 31 generates heat. Due to this heat, even when snow or ice adheres to the outer cover 12, these can be melted. Even when moisture adheres to the outer cover 12, the moisture can evaporate.

In the present embodiment, even when the vehicle VE subsequently travels, the control unit CO continues this step. That is, in the present example, the control unit CO continues this step in all the states in which the vehicle VE is traveling. In the present embodiment, the control unit CO may perform Step SP65 in at least a part of the state in which the vehicle VE is traveling. That is, in a part of the state in which the vehicle VE is traveling, the control unit CO may not perform Step SP65. As an example of such control, the control unit CO performs Step SP65 in a state where the vehicle VE is traveling at 5 km/h or more, and does not perform Step SP65 in a state where the vehicle VE is traveling at a speed less than 5 km/h.

Examples of the heater that melts ice and snow and frost adhering to the cover of the vehicle sensor device include an electric heating wire provided on the cover. When a voltage is applied to the electric heating wire and a current flows, a magnetic field is generated around the electric heating wire. This magnetic field affects the sensitivity of the radar device, and there is a concern that the accuracy of object detection decreases.

Therefore, in the vehicle sensor device 1 of the present embodiment, the control unit CO outputs the detection signal Sd of the object located outside the outer cover 12 at predetermined time intervals based on the signal Se related to the electromagnetic wave from the sensor unit 20, and sets the first voltage applied to the electric heating wire 31 in at least a part of the transmission/reception period Ta in which the electromagnetic wave used for the detection signal Sd is transmitted and received by the sensor unit 20 to a voltage less than the second voltage applied to the electric heating wire 31 in at least a part of the period Tb sandwiched between the transmission/reception periods.

Therefore, the intensity of the magnetic field generated from the electric heating wire in at least a part of the transmission/reception period Ta in which the first voltage V1 is applied to the electric heating wire is less than the intensity of the magnetic field generated from the electric heating wire 31 in at least a part of the period Tb sandwiched between the transmission/reception periods in which the second voltage V2 is applied to the electric heating wire. Therefore, as compared with a case where the second voltage V2 is continuously applied to the electric heating wire 31, it is possible to suppress the influence of the magnetic field generated from the electric heating wire 31 on the sensitivity of the sensor unit 20. Therefore, according to the vehicle sensor device 1 of the present embodiment, it is possible to suppress a decrease in accuracy of object detection.

In the vehicle sensor device 1 of the present embodiment, the control unit CO sets the voltage applied to the electric heating wire 31 to the first voltage V1 in the entire transmission/reception period Ta. Therefore, as compared with a case where the voltage applied to the electric heating wire 31 in a part of the transmission/reception period Ta is set to the first voltage V1 and the voltage applied to the electric heating wire 31 in another part of the transmission/reception period Ta is set to the second voltage V2, it is possible to suppress the influence of the magnetic field generated from the electric heating wire 31 on the sensitivity of the sensor unit 20.

In addition, in the vehicle sensor device 1 of the present embodiment, the control unit CO stops the outputting of the detection signal Sd and applies a voltage to the electric heating wire 31 in a period from when an ignition-on signal is input to the control unit CO to when a signal indicating a state in which the vehicle VE can travel is input to the control unit CO. In a period from when the ignition is turned on to when the vehicle VE starts to move, concerns about safety are generally low. Therefore, in a period from when the ignition is turned on to the state where the vehicle VE can travel, applying a voltage to the electric heating wire 31 to melt snow and the like adhering to the outer cover is prioritized over detection of an object around the vehicle VE. As a result, the amount of snow deposited on the outer cover and the like can be reduced, and a decrease in the accuracy of object detection by the vehicle sensor device 1 after the vehicle VE starts to move can be suppressed. Then, in a state where the vehicle VE is traveling, the control unit CO performs Step SP65. Therefore, in a state where the vehicle VE is traveling, as compared with a case where the second voltage V2 is continuously applied to the electric heating wire 31, it is possible to suppress the magnetic field generated from the electric heating wire 31 from affecting the sensitivity of the sensor unit 20, and to suppress a decrease in the accuracy of object detection.

In the present embodiment, the outputting of the detection signal Sd may be stopped and the voltage may be applied to the electric heating wire 31 in a partial period instead of the entire period from the input of the ignition-on signal to the control unit CO to the input of the signal indicating the state in which the vehicle VE can travel to the control unit CO. In addition, in the vehicle sensor device 1, the control unit CO may stop the outputting of the detection signal Sd and apply the voltage to the electric heating wire 31 in at least a part of the period in which the vehicle VE is stopped, not limited to the period from the input of the ignition-on signal to the control unit CO until the input of the signal indicating the state in which the vehicle VE can travel. For example, in a period in which a signal indicating that the speed is zero is input to the control unit CO from the speed sensor, the ECU 100, or the like, the control unit CO may stop the outputting of the detection signal Sd and apply a voltage to the electric heating wire 31. In a state where the vehicle VE is stopped, the concern for safety tends to be less than that in a state where the vehicle VE is moving. Therefore, by the control unit CO operating in this manner, the amount of snow deposition on the outer cover and the like can be reduced while the vehicle VE is stopped, and a decrease in the accuracy of object detection of the vehicle sensor device 1 after the vehicle VE starts to move can be suppressed.

In the present embodiment, Step SP62 may be omitted. In this case, regardless of the outside air temperature, the control unit CO proceeds to Step SP63 after Step SP61.

Next, modifications of the above embodiment will be described.

First Modification

Figure 27:
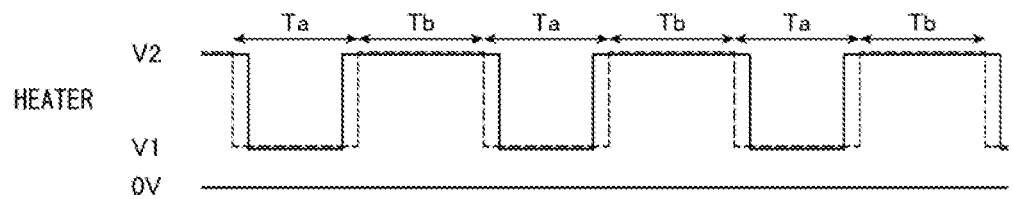
FIG. 27 is a diagram illustrating operation of a heater according to a first modification of the fifth embodiment.

FIG. 27 is a diagram illustrating the operation of the heater 30 according to the present modification. In FIG. 27, the operation of the heater 30 in FIG. 26 is indicated by a broken line. As indicated by a solid line in FIG. 27, the present modification is different from the above embodiment in that a period during which the first voltage V1 is applied to the electric heating wire 31 is shorter than a period during which the first voltage V1 is applied to the electric heating wire 31 in the above embodiment. In the above embodiment, the period in which the voltage applied to the electric heating wire 31 is the first voltage V1 coincides with the transmission/reception period Ta. Therefore, in the present modification, the control unit CO sets the voltage applied to the electric heating wire 31 to the first voltage V1 in a part of the transmission/reception period Ta.

According to the present modification, since the period during which the first voltage V1 that is a voltage less than the second voltage V2 is applied is shorter than the transmission/reception period Ta, the power amount applied to the electric heating wire 31 is greater than that in the above embodiment, so that snow melting or the like can be more efficiently performed.

Second Modification

Figure 28:
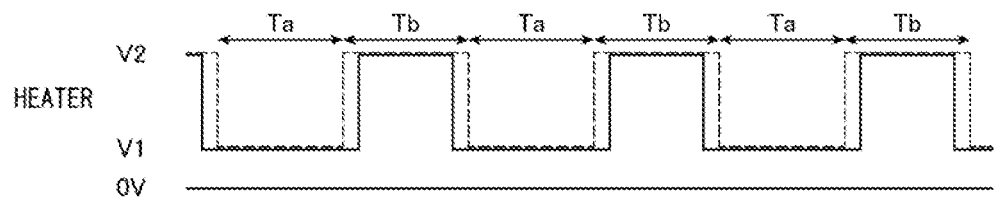
FIG. 28 is a diagram illustrating an operation of a heater in a second modification of the fifth embodiment.

FIG. 28 is a diagram illustrating the operation of the heater 30 according to the present modification. In FIG. 28, the operation of the heater 30 in FIG. 26 is indicated by a broken line similarly to FIG. 27. As indicated by a solid line in FIG. 28, the present modification is different from the above embodiment in that a period during which the first voltage V1 is applied to the electric heating wire 31 is longer than a period during which the first voltage V1 is applied to the electric heating wire 31 in the above embodiment. In the present modification, the control unit CO sets the voltage to be applied to the electric heating wire 31 in a longer period including the transmission/reception period Ta as the first voltage V1. In the example of FIG. 28, the control unit CO changes the voltage applied to the electric heating wire 31 from the second voltage V2 to the first voltage V1 before the start of the transmission/reception period Ta, and changes the voltage applied to the electric heating wire 31 from the first voltage V1 to the second voltage V2 after the end of transmission/reception period Ta. However, the control unit CO may change the voltage applied to the electric heating wire 31 from the second voltage V2 to the first voltage V1 at the start of the transmission/reception period Ta. Alternatively, the control unit CO may change the voltage applied to the electric heating wire 31 from the first voltage V1 to the second voltage V2 at the end of the transmission/reception period Ta.

According to the present modification, since the first voltage V1 that is a voltage less than the second voltage V2 is applied to the electric heating wire in at least one of the start or the end of the transmission/reception period Ta, the influence of the magnetic field generated from the electric heating wire 31 on the sensitivity of the sensor unit 20 can be more appropriately suppressed than in the above embodiment.

Third Modification

Figure 29:
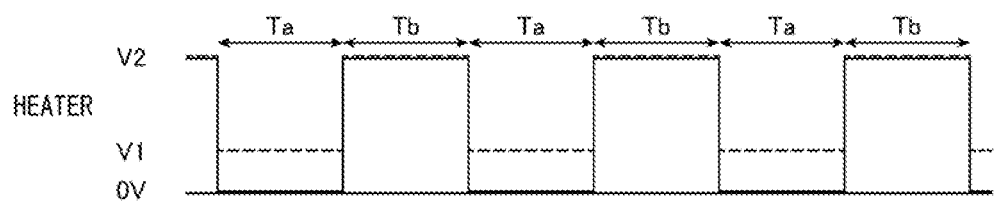
FIG. 29 is a diagram illustrating an operation of a heater in a third modification of the fifth embodiment.

FIG. 29 is a diagram illustrating the operation of the heater 30 according to the present modification. In FIG. 29, the operation of the heater 30 in FIG. 26 is indicated by a broken line similarly to FIG. 27. As indicated by a solid line in FIG. 29, the present modification is different from the above embodiment in that the first voltage V1 applied to the electric heating wire 31 in the transmission/reception period Ta is zero. The first voltage V1 applied to the electric heating wire 31 being zero means that no voltage is applied to the electric heating wire 31. That is, in the present modification, the control unit CO does not apply a voltage to the electric heating wire 31 in the transmission/reception period Ta.

According to the present modification, the voltage is not applied to the electric heating wire 31 during transmission/reception period Ta. Therefore, the radiation of the magnetic field from the electric heating wire in the transmission/reception period Ta can be suppressed as compared with the above embodiment, and the influence of the magnetic field generated from the electric heating wire 31 on the sensitivity of the sensor unit 20 can be further suppressed.

Note that the third modification may be applied to the first modification and the second modification. When the third modification is applied to the first modification, the control unit CO applies the first voltage V1 having the magnitude of zero to the electric heating wire 31 in a part of the transmission/reception period Ta. In a case where the third modification is applied to the second modification, the control unit CO applies the first voltage V1 having the magnitude of zero to the electric heating wire 31 in a longer period including the transmission/reception period Ta.

Fourth Modification

Figure 30:
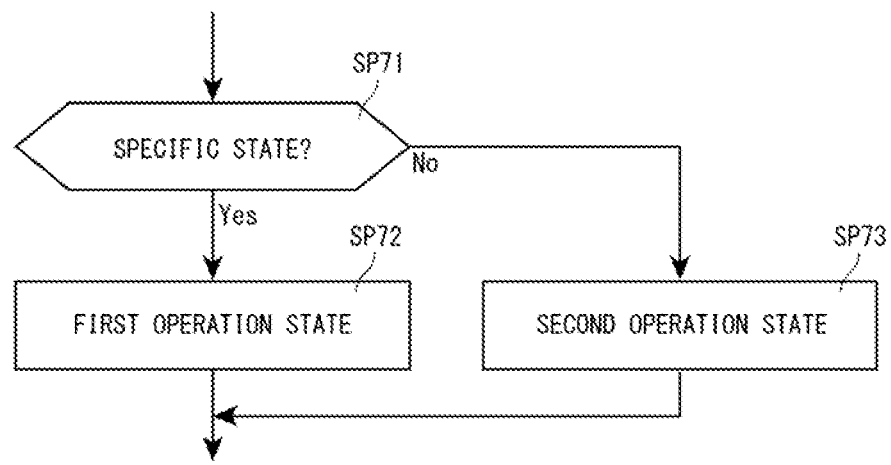
FIG. 30 is a flowchart illustrating the operation of the control unit in Step SP65 in fourth to seventh modifications of the fifth embodiment.

FIG. 30 is a flowchart illustrating the operation of the control unit CO in Step SP65 in a seventh modification described later from the present modification. Step SP71 is a step of determining whether to proceed to Step SP72 or Step SP73 depending on whether the vehicle VE is within a specific state. In the present modification, this specific state is a state in which the vehicle VE is greater than a predetermined speed. Therefore, in Step SP71 of the present modification, based on the signal indicating the speed of the vehicle VE input from the ECU 100 or the like to the control unit CO, the control unit CO determines whether the speed of the vehicle VE indicated by the signal is greater than the predetermined speed. When the signal indicating the speed of the vehicle VE indicates a state in which the speed is greater than the predetermined speed, the control unit CO advances the control flow to Step SP72, and controls the power supply circuit 32 of the heater 30 to set the heater 30 to the first operation state. Meanwhile, when the signal indicating the speed of the vehicle VE does not indicate the state of being greater than the predetermined speed, that is, when it is indicated that the signal is equal to or less than the predetermined speed, the control unit CO advances the control flow to Step SP73 and sets the heater 30 to the second operation state. This speed is, for example, 5 km/h.

In the present modification, the control unit CO applies a voltage to the electric heating wire 31 in the first operation state as in, for example, the second modification illustrated in FIG. 27 or the third modification illustrated in FIG. 29, and applies a voltage to the electric heating wire 31 in the second operation state as in, for example, the above-described embodiment illustrated in FIG. 26 or the first modification illustrated in FIG. 27. In addition, the control unit CO applies a voltage to the electric heating wire 31 in the first operation state, for example, as in the above-described embodiment, the second modification, or the third modification, and applies a voltage to the electric heating wire 31 in the second operation state, for example, as in the first modification illustrated in FIG. 27. That is, in the present modification, the control unit CO makes the magnitude of the first voltage V1 in a state where the speed of the vehicle VE is greater than the predetermined speed smaller than the first voltage in a state where the speed of the vehicle VE is equal to or less than the predetermined speed. Alternatively, the control unit CO makes the period during which the first voltage V1 is applied in a state where the speed of the vehicle VE is greater than the predetermined speed longer than the period during which the first voltage V1 is applied in a state where the speed of the vehicle VE is equal to or less than the predetermined speed.

Fifth Modification

In the present modification, the specific state illustrated in FIG. 30 is a state in which the distance between the vehicle VE and the object detected outside the vehicle is smaller than a predetermined distance. Therefore, in Step SP71 of the present modification, the control unit CO determines whether the distance of the object indicated by the detection signal Sd is smaller than the predetermined distance. In a case where the distance to the object indicated by the detection signal Sd is smaller than the predetermined distance, the control unit CO advances the control flow to Step SP72, and controls the power supply circuit 32 of the heater 30 to bring the heater 30 into the first operation state described in the fourth modification. Meanwhile, when the distance to the object indicated by the detection signal Sd is equal to or more than the predetermined distance, the control unit CO advances the control flow to Step SP73, and sets the heater 30 to the second operation state described in the fourth modification. The predetermined distance is, for example, 5 m. That is, in the present modification, the control unit CO makes the magnitude of the first voltage V1 in a state where the distance to the object indicated by the detection signal Sd is smaller than the predetermined distance smaller than the first voltage V1 in a state where the distance to the object indicated by the detection signal Sd is equal to or more than the predetermined distance. Alternatively, the control unit CO makes the period during which the first voltage V1 is applied in a state where the distance to the object indicated by the detection signal Sd is smaller than the predetermined distance longer than the period during which the first voltage V1 is applied in a state where the distance to the object indicated by the detection signal Sd is equal to or more than the predetermined distance.

Sixth Modification

In the present modification, the specific state illustrated in FIG. 30 is a state in which the vehicle VE is in rain. Therefore, in Step SP71 of the present modification, the control unit CO determines whether the signal is a signal indicating rain based on the signal input from the rain sensor 51 to the control unit CO. In a case where the signal indicating rain is input to the control unit CO, the control unit CO advances the control flow to Step SP72, and controls the power supply circuit 32 of the heater 30 to set the heater 30 to the first operation state described in the fourth modification. Meanwhile, in a case where the signal indicating rain is not input to the control unit CO, the control unit CO advances the control flow to Step SP73, and sets the heater 30 to the second operation state described in the fourth modification. That is, in the present modification, the control unit CO makes the magnitude of the first voltage V1 in the state where the signal indicating rain is input to the control unit CO smaller than the first voltage V1 in the state where the signal indicating rain is not input. Alternatively, the control unit CO makes a period during which the first voltage V1 is applied in the state where the signal indicating rain is input to the control unit CO longer than a period during which the first voltage V1 is applied in the state where the signal indicating rain is not input.

Seventh Modification

In the present modification, the specific state illustrated in FIG. 30 is a state in which the vehicle VE turns on a headlight. Therefore, in Step SP71 of the present modification, the control unit CO determines whether the signal indicates that the headlight of the vehicle VE is turned on based on the signal input from the ECU 100 or the like to the control unit CO. In a state where the signal indicating that the headlight is turned on is input, a low beam or a high beam is emitted from the lamp unit LU. In a case where the signal indicating that the headlight is turned on is input to the control unit CO, the control unit CO advances the control flow to Step SP72, and controls the power supply circuit 32 of the heater 30 to set the heater 30 to the first operation state described in the fourth modification. Meanwhile, when the signal indicating that the headlight of the vehicle VE is turned on is not input to the control unit CO, the control unit CO advances the control flow to Step SP73, and sets the heater 30 to the second operation state described in the fourth modification. That is, in the present modification, the control unit CO makes the magnitude of the first voltage V1 in the state where the signal indicating that the headlight is turned on is input to the control unit CO smaller than the first voltage V1 in the state where the signal indicating that the headlight is turned on is not input. Alternatively, the control unit CO makes the period during which the first voltage V1 is applied in the state in which the signal indicating that the headlight is turned on is input to the control unit CO longer than the period during which the first voltage V1 is applied in a state in which the signal indicating that the headlight is turned on is not input.

The state in which the speed of the vehicle VE is high, the state in which the distance from the vehicle VE to the object is small, the state in which the weather is rainy, and the state in which the headlight is turned on described in the fourth to seventh modifications are states in which an occupant needs more information around the vehicle VE by a method other than visual observation. In these states, by reducing the magnitude of the first voltage V1 to reduce the magnetic field generated from the electric heating wire 31, or by lengthening the period during which the first voltage V1 is applied to lengthen the period during which the magnetic field generated from the electric heating wire 31 is suppressed, the vehicle sensor device 1 can suppress a decrease in the accuracy of object detection, and can contribute to more safety.

Although the fourth aspect of the present invention has been described with reference to the fifth embodiment as an example, the present invention is not limited to the above description.

For example, in the fifth embodiment, the control unit CO performs Step SP65 in at least a part of the state in which the vehicle VE is traveling. However, in the present invention, the control unit CO may perform Step SP65 in at least a part of a state where the vehicle VE is stopped and at least a part of a state where the vehicle VE is traveling. Therefore, for example, the control unit CO may perform Step SP65 in at least a part of the state where the vehicle VE is stopped. However, the state in which the vehicle VE is traveling is a state in which the occupant requires information around the vehicle VE by a method other than visual observation than the state in which the vehicle VE is stopped. Therefore, it is preferable that the control unit CO perform Step SP65 in at least a part of the state in which the vehicle VE is traveling.

Further, for example, Step SP62 to Step SP64 of the fifth embodiment may be omitted, and the control unit CO may perform Step SP61 after Step SP65. In this case, for example, the control unit CO performs Step SP65 in all the states in which the vehicle VE is stopped and all the states in which the vehicle VE is traveling.

In addition, in the fifth embodiment, the vehicle sensor device 1 only needs to include at least the outer cover 12, the sensor unit 20, the electric heating wire 31, and the control unit CO, and for example, the lamp unit LU may not be arranged in the accommodation space 13 of the case 10. In this case, the lamp unit LU is arranged in a case different from the case 10.

In the fifth embodiment, the cleaner 40 is not an essential component, and the cleaner 40 may not be provided. Alternatively, when the cleaner 40 is provided as in the above embodiment, the cleaner 40 may be operated when a predetermined voltage is applied to the electric heating wire 31 in Step SP63 of FIG. 25. For example, the liquid may be injected from the injection nozzle 41c of the liquid unit 41 to the transmission region AR before the voltage is applied to the electric heating wire 31.

As described above, the present invention has been described by taking the above-described embodiments and modifications as examples, but the present invention is not limited thereto.

For example, in the above embodiments, the vehicle sensor device 1 provided in the vehicle lamp VL that is the headlight has been described as an example. However, the vehicle sensor device 1 may be provided in a turn lamp, a brake lamp, or the like which is a vehicle lamp. Further, the vehicle sensor device 1 may not be provided in the vehicle lamp. Examples of the configuration of such a vehicle sensor device 1 include a configuration in which the vehicle lamp VL in the above embodiments does not include the lamp unit LU.

According to a first aspect of the present invention, there is provided a vehicle sensor device capable of suppressing wasteful consumption of power while suppressing a decrease in detection accuracy. According to a second aspect of the present invention, there is provided a vehicle sensor device capable of reducing a load on a control unit. According to third and fourth aspects of the present invention, there is provided a vehicle sensor device capable of suppressing a decrease in object detection accuracy. The vehicle sensor device can be used in the field of automobiles and the like.

The invention claimed is:

1. A vehicle sensor device comprising:
   an outer cover;
   a sensor unit that is disposed inside a vehicle with respect to the outer cover, transmits and receives an electromagnetic wave through the outer cover, and outputs a signal related to the electromagnetic wave incident on an inner side of the outer cover;
   a heater that is provided in the outer cover and heats a transmission region of the outer cover through which the electromagnetic wave emitted from the sensor unit passes; and
   a control unit,
   wherein the control unit outputs a detection signal of an object located outside the outer cover based on the signal from the sensor unit in at least a part of a period in which a heater is OFF, and stops outputting of the detection signal in at least a part of a period in which the heater is ON;

the sensor unit emits the electromagnetic wave toward an outside of the vehicle via the outer cover, receives the electromagnetic wave incident on an inside of the vehicle from the outside of the vehicle through the outer cover, and outputs a signal related to the electromagnetic wave to the control unit, in the period in which the heater is ON; and the control unit stops outputting of the detection signal in at least a part of a period in which the signal related to the electromagnetic wave is input in the period in which the heater is ON.

2. The vehicle sensor device according to claim 1, wherein, in the period in which the heater is ON, the control unit stops the outputting of the detection signal when an intensity of the electromagnetic wave indicated by the signal is more than a first threshold and the intensity of the electromagnetic wave indicating that an adhesion amount of adhering substances adhering to the transmission region is equal to or more than a second threshold indicating that the amount of adhering substances adhering to the transmission region is more than the amount of adhering substances at the first threshold, and outputs the detection signal when the intensity is equal to or more than the first threshold and less than the second threshold.

3. The vehicle sensor device according to claim 1, wherein, in the period in which the heater is ON, the control unit stops the outputting of the detection signal when a signal output from a temperature sensor that measures a temperature of the transmission region indicates a temperature less than a predetermined temperature, and outputs the detection signal when the signal output from the temperature sensor indicates a temperature equal to or more than the predetermined temperature.

4. The vehicle sensor device according to claim 1, wherein the control unit outputs the detection signal in the period in which the heater is ON and in a period in which a light source unit that emits light toward an outside of the vehicle via the outer cover is ON.

5. The vehicle sensor device according to claim 1, wherein the control unit controls the heater to be ON in at least a part of a period in which the vehicle is stopped and stops the outputting of the detection signal in at least a part of the period in which the heater is ON.

* * * * *